US011539520B2

(12) United States Patent
Zimny et al.

(10) Patent No.: US 11,539,520 B2
(45) Date of Patent: Dec. 27, 2022

(54) EMERGENCY LOCKDOWN IN A LOCAL NETWORK OF INTERCONNECTED DEVICES

(71) Applicant: Delphian Systems, LLC, Buffalo Grove, IL (US)

(72) Inventors: Arkadiusz Zimny, Hampshire, IL (US); Ashok Hirpara, Carol Stream, IL (US); Thomas D. Johnson, Poplar Grove, IL (US)

(73) Assignee: Delphian Systems, LLC, Buffalo Grove, IL (US)

( * ) Notice: Subject to any disclaimer, the term of this patent is extended or adjusted under 35 U.S.C. 154(b) by 820 days.

(21) Appl. No.: 15/724,915

(22) Filed: Oct. 4, 2017

(65) Prior Publication Data
US 2019/0103966 A1  Apr. 4, 2019

(51) Int. Cl.
*H04L 9/30* (2006.01)
*G07C 9/00* (2020.01)
(Continued)

(52) U.S. Cl.
CPC ............ *H04L 9/30* (2013.01); *G07C 9/00571* (2013.01); *H04L 9/006* (2013.01); *H04L 9/0833* (2013.01);
(Continued)

(58) Field of Classification Search
CPC ......... H04L 9/30; H04L 9/006; H04L 9/0833; H04L 2209/80; H04L 2463/062;
(Continued)

(56) References Cited

U.S. PATENT DOCUMENTS 4,845,490 A * 7/1989 Ward ................. G07C 9/00103
340/5.27
6,530,020 B1 * 3/2003 Aoki ......................... H04L 9/16
380/278
(Continued)

FOREIGN PATENT DOCUMENTS

WO  2012116037 A1  8/2012
WO  2016019474 A1  2/2016

OTHER PUBLICATIONS

E-5600 & E-3600 Series Locks CSI Specifications. Copyright 2014. Kaba ADS Americas. www.kaba-adsamericas.com.
(Continued)

*Primary Examiner* — Cheng-Feng Huang
(74) *Attorney, Agent, or Firm* — Banner & Witcoff, Ltd.

(57) ABSTRACT

Systems, methods, and devices are described herein for executing a lockdown of electronic locks deployed in a local network of interconnected devices. In example implementations, each electronic lock is provided with a unique encryption key specific to that electronic lock and is provided with a shared encryption key. To execute a lockdown of all electronic locks in the local network, a server generates a locking instruction and encrypts it using the shared encryption key. The server then transmits the encrypted locking instruction to the gateway devices of the local network which, in turn, transmit it to each of the electronic locks. Upon receipt of the encrypted locking instruction, the electronic locks attempt to decrypt it using the shared encryption key. Upon successful decryption of the encrypted locking instruction, an electronic lock toggles to a lock state.

32 Claims, 17 Drawing Sheets

(51) Int. Cl.
*H04W 12/06* (2021.01)
*H04L 9/00* (2022.01)
*H04W 12/08* (2021.01)
*H04L 9/08* (2006.01)
*H04W 12/04* (2021.01)
*H04W 84/18* (2009.01)

(52) U.S. Cl.
CPC ..... *H04W 12/04033* (2019.01); *H04W 12/06* (2013.01); *H04W 12/08* (2013.01); *G07C 2009/00825* (2013.01); *H04L 2209/80* (2013.01); *H04L 2463/062* (2013.01); *H04W 84/18* (2013.01)

(58) Field of Classification Search
CPC ............... H04W 12/06; H04W 12/08; H04W 12/04033; H04W 84/18; H04W 12/0433; G07C 9/00571; G07C 2009/00825
See application file for complete search history.

(56) References Cited

U.S. PATENT DOCUMENTS

| | | | | |
|---|---|---|---|---|
| 6,986,044 | B1* | 1/2006 | Inada | H04L 9/0822 380/282 |
| 7,495,543 | B2* | 2/2009 | Denison | G07C 9/00309 340/5.23 |
| 7,716,486 | B2* | 5/2010 | Libin | G07C 9/00103 713/176 |
| 8,427,297 | B1 | 4/2013 | Markey et al. | |
| 8,943,187 | B1* | 1/2015 | Saylor | G06F 21/6209 709/223 |
| 9,322,194 | B2 | 4/2016 | Cheng et al. | |
| 9,326,094 | B2 | 4/2016 | Johnson et al. | |
| 9,359,794 | B2 | 6/2016 | Cheng | |
| 9,613,476 | B2 | 4/2017 | Johnson | |
| 9,624,695 | B1 | 4/2017 | Cheng et al. | |
| 9,644,400 | B1 | 5/2017 | Cheng et al. | |
| 9,647,996 | B2 | 5/2017 | Johnson et al. | |
| 9,683,392 | B1 | 6/2017 | Cheng et al. | |
| 9,685,018 | B2 | 6/2017 | Johnson | |
| 9,704,320 | B2 | 7/2017 | Johnson et al. | |
| 9,706,365 | B2 | 7/2017 | Johnson et al. | |
| 9,727,328 | B2* | 8/2017 | Johnson | G06F 8/65 |
| 10,231,128 | B1* | 3/2019 | Ziraknejad | H04L 9/0825 |
| 10,388,094 | B2* | 8/2019 | Johnson | G07C 9/00174 |
| 2002/0178385 | A1* | 11/2002 | Dent | G07C 9/00309 726/27 |
| 2003/0217263 | A1* | 11/2003 | Sakai | H04L 9/30 713/154 |
| 2004/0025039 | A1* | 2/2004 | Kuenzi | G07C 9/00309 713/193 |
| 2004/0103287 | A1* | 5/2004 | Newby | G07C 9/00023 713/184 |
| 2005/0088279 | A1* | 4/2005 | Denison | G07F 9/026 340/5.23 |
| 2005/0210283 | A1* | 9/2005 | Kato | G07C 9/00309 340/5.61 |
| 2006/0129848 | A1* | 6/2006 | Paksoy | G06F 21/78 713/193 |
| 2009/0051486 | A1* | 2/2009 | Denison | G06F 21/6209 340/5.25 |
| 2009/0302995 | A1 | 12/2009 | Park | |
| 2010/0217972 | A1* | 8/2010 | Lohiniva | G07C 9/00103 713/153 |
| 2010/0220857 | A1* | 9/2010 | Kawamura | H04L 9/0844 380/44 |
| 2011/0099362 | A1* | 4/2011 | Haga | H04L 9/0822 713/2 |
| 2011/0289123 | A1* | 11/2011 | Denison | G07C 9/00571 707/812 |
| 2012/0096909 | A1* | 4/2012 | Hart | G08C 17/02 70/278.1 |
| 2012/0280783 | A1* | 11/2012 | Gerhardt | H04W 12/08 340/5.6 |
| 2012/0280790 | A1* | 11/2012 | Gerhardt | H04L 63/0428 340/5.61 |
| 2013/0061055 | A1* | 3/2013 | Schibuk | G06Q 20/40 713/172 |
| 2013/0080672 | A1* | 3/2013 | Tal | G06F 9/526 710/200 |
| 2013/0346333 | A1 | 12/2013 | Hassler et al. | |
| 2014/0049366 | A1* | 2/2014 | Vasquez | G07C 9/00857 340/5.54 |
| 2015/0039892 | A1* | 2/2015 | Fujita | H04L 9/3226 713/171 |
| 2015/0117619 | A1 | 4/2015 | Carpenter et al. | |
| 2015/0194002 | A1* | 7/2015 | Kaczmarz | G07C 9/00174 340/5.2 |
| 2015/0204109 | A1 | 7/2015 | Ergenbright | |
| 2015/0264626 | A1* | 9/2015 | Perdomo | H04L 5/00 370/216 |
| 2015/0339913 | A1 | 11/2015 | Lyman et al. | |
| 2016/0055692 | A1 | 2/2016 | Trani | |
| 2016/0189453 | A1* | 6/2016 | Johnson | H04N 7/181 340/5.61 |
| 2016/0232729 | A1* | 8/2016 | Engel-Dahan | G07C 9/00571 |
| 2016/0232774 | A1 | 8/2016 | Noland et al. | |
| 2016/0261425 | A1 | 9/2016 | Horton et al. | |
| 2016/0267738 | A1* | 9/2016 | Carstens | E05B 43/005 |
| 2016/0343187 | A1 | 11/2016 | Trani | |
| 2016/0364927 | A1 | 12/2016 | Barry et al. | |
| 2017/0069190 | A1 | 3/2017 | Hansen et al. | |
| 2017/0078283 | A1* | 3/2017 | Unagami | H04L 9/3273 |
| 2017/0192827 | A1* | 7/2017 | Ghafourifar | G06F 9/543 |
| 2017/0223712 | A1* | 8/2017 | Stephens | H04W 72/08 |
| 2017/0263065 | A1* | 9/2017 | Johnson | G07C 9/00309 |
| 2017/0345237 | A1* | 11/2017 | Kuenzi | G07C 9/00119 |
| 2017/0353450 | A1* | 12/2017 | Koved | H04L 63/045 |
| 2018/0069699 | A1* | 3/2018 | Bowman | H04L 9/0841 |
| 2018/0083955 | A1* | 3/2018 | Tuli | G06F 21/32 |
| 2018/0114387 | A1* | 4/2018 | Klink | G07C 9/00571 |
| 2018/0123784 | A1* | 5/2018 | Gehrmann | H04L 9/0833 |
| 2019/0035188 | A1* | 1/2019 | Kuenzi | G07C 9/00182 |
| 2019/0036689 | A1* | 1/2019 | Schiffman | H04L 9/0844 |
| 2020/0100108 | A1* | 3/2020 | Everson | H04W 12/068 |

OTHER PUBLICATIONS

Stanley Security Launches Responsive Wireless Lockdown Solution at 2016 ISC West. Apr. 4, 2016. Murphy Knott Public Relations, Inc.

* cited by examiner

EMERGENCY LOCKDOWN IN A LOCAL NETWORK OF INTERCONNECTED DEVICES

TECHNICAL FIELD

This application is generally related to cryptography. More particularly related to a communication system that uses cryptography to protect the transmission and reception of information.

INCORPORATION BY REFERENCE

This application incorporates by reference commonly-owned U.S. Pat. No. 9,407,624 entitled "User-Selectable Security Modes for Interconnected Devices" which issued on Aug. 2, 2016, as well as commonly-owned U.S. patent application Ser. No. 15/223,243 entitled "Invitations for Facilitating Access to Interconnected Devices" which was filed on Jul. 29, 2016.

BACKGROUND

The proliferation of network-enabled devices continues to grow in terms of both volume and type. The "Internet of Things" (or IoT) refers to the collection of devices (e.g., "smart devices"), objects (e.g., "smart objects"), and sensors having networking capabilities. IoT principles are applied in a variety of areas such as, for example, home automation. It is estimated that within a few years, the average household will include dozens of network-enabled devices and the worldwide total of network-enabled devices will reach tens of billions.

As with traditional computing, the security of such devices is a concern. The introduction of new types of network-enabled devices introduces new challenges with respect to securing those devices. Such challenges include, among others, determining which individuals are authorized to interact with a device and determining what interactions an individual is authorized to perform. Furthermore, different types of devices may implicate different security concerns. While some devices may only transmit information read and/or collected by other devices (e.g., sensor-type devices) thus implicating relatively minor security concerns, other devices may provide and/or house sensitive information or be user-controlled thus implicating relatively major security concerns. As a result, new solutions to provide security for network-enabled devices are needed.

SUMMARY

To overcome the challenges described above, systems, methods, and devices are described herein for transmitting an encrypted instruction to the device nodes of a local network of interconnected devices. In one example scenario, the device nodes may be electronic locks that can toggle between a lock state and an unlock state to lock and unlock a door. In this scenario, the encrypted instruction transmitted to the electronic locks may be a locking instruction that, when executed by the electronic locks, cause the electronic locks to toggle to the lock state. The disclosures provided herein also disclose techniques for transmitting an encrypted locking instruction all of the electronic locks deployed throughout a local network of interconnected devices so as to achieve a global lockdown of the electronic locks.

A global lockdown of all electronic locks may be desirable in an emergency situation, for example, when an intruder has entered a building. Accordingly, in some situations, it may be desirable to execute the global lockdown as fast as possible. As described in further detail below, device-specific encryption keys may be employed to encrypt messages intended to be consumed by only a particular device node of the local network of interconnected devices. In this way, a secure exchange of communications with the device node may be achieved. In an emergency situation, however, encrypting individual messages with the locking instruction using individual device-specific encryption keys and delivering those individual message to individual electronic locks may cause unwanted delay in executing a global lockdown. Accordingly, the present disclosures provide techniques for achieving a fast global lockdown while still maintaining the security of the messages exchanged with the device nodes of the local network of interconnected devices.

In some example implementations, each electronic lock of a local network of interconnected devices are provided with a shared encryption key for storage. The electronic lock thus stores the shared encryption key in addition to its device-specific encryption key. A server also stores the shared encryption key and generates a locking instruction (e.g., in response to receipt of a lock command from a user) and encrypts the locking instruction using the shared encryption key. In order to deliver the encrypted locking instruction to each electronic lock as fast as possible, the server, in this example, broadcasts the encrypted locking instruction to each gateway of the local network. The gateways of the local network, in turn, broadcasts the encrypted locking instruction to each device node they are associated with. In this way, the server and gateways avoid the need to transmit individual, device-specific messages with a locking instruction encrypted using the respective device-specific encryption keys for the individual device nodes. Instead, each device node of the local network, in this example, receives an encrypted locking instruction that has been encrypted using the shared encryption key. Each electronic lock then uses the shared encryption key it has received to decrypt the encrypted instruction, obtain the locking instruction, and execute the locking instruction by toggling to its lock state. Any device node of the local network that does not possess the shared encryption key (or does not have locking capabilities) may simply disregard the encrypted instruction or the locking instruction obtained upon successful decryption.

Upon review of the disclosures below, it should be appreciated that a global lockdown of all electronic locks in a local network of interconnected devices is but one use case for the techniques described herein. The techniques described herein may also be employed, for example, to carry out a global unlock of all electronic locks in the local network. In addition, lock groups may be defined that include multiple electronic locks of the local network (e.g., a subset of all electronic locks deployed). Each electronic lock may be provided with a shared group encryption key in addition to a shared global encryption key. The server may thus broadcast an encrypted instruction, encrypted using the shared group encryption key, to all device nodes of the local network in which only those electronic locks belonging to the lock group and possessing the shared group encryption key can successfully decrypt the encrypted instruction. Furthermore, the techniques described herein may be more generally employed to deliver global messages or group-specific messages to other types of device nodes of a local network of interconnected devices in addition to electronic locks. Additional implementations, use cases, and scenarios in which the teachings provided herein may be employed will be appreciated upon review of the disclosures set forth in further detail below.

This summary is not intended to identify critical or essential features of the disclosures herein, but instead merely summarizes certain features and variations thereof. Other details and features will also be described in the sections that follow.

BRIEF DESCRIPTION OF THE DRAWINGS

Some features herein are illustrated by way of example, and not by way of limitation, in the figures of the accompanying drawings and in which like reference numerals refer to similar elements. It is to be appreciated that the figures, as shown herein, are not necessarily drawn to scale, wherein some of the elements may be drawn merely for the purpose of clarity. Also, reference numerals may be repeated among the various figures to show corresponding or analogous elements.

DETAILED DESCRIPTION

Figure 1:
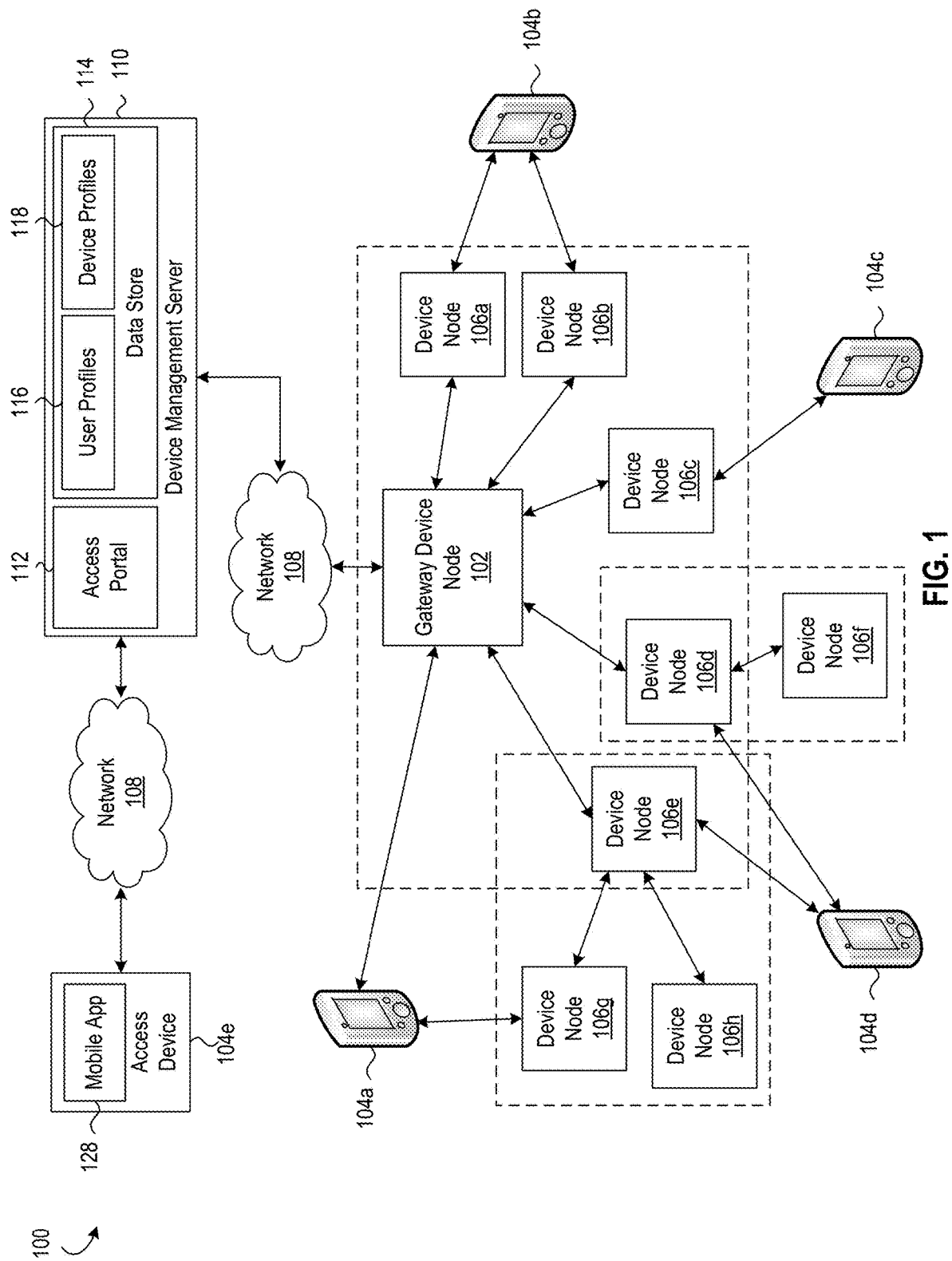
FIG. 1 depicts an example of an implementation of a local network of interconnected devices in accordance with aspects described herein.

The disclosures below provide techniques for providing securing messages to multiple devices that are interconnected via a local network in the context of physical building security and physical access control. Commonly-owned U.S. Pat. No. 9,407,624 entitled "User-Selectable Security Modes for Interconnected Devices" describes various types of wireless networking devices that may be interconnected on a local network such as a wireless mesh network. Such devices include lock-type devices that may be utilized to secure doors at entryways, exitways, and throughways of buildings and other structures. Accordingly, multiple lock-type devices may be deployed to establish physical building security and access control at schools, offices, business, and other enterprises. Interconnecting the lock-type devices via a local network provides various advantages including the ability to lock and unlock the devices from a remote location and to provide other types of remote instructions or requests.

The above-referenced commonly owned patent also describes various techniques for securing messages consumed by the devices on the network. For example, device-specific encryption keys are generated for each individual device on the network and used to encrypt messages respectively addressed to particular devices. A backend device management server stores the device-specific encryption keys and delivers them to authorized end-user devices (e.g., smartphones) for use when communicating with the devices on the local network. The device management server also utilizes the device-specific encryption keys to encrypt messages transmitted to the devices on the local network, which may be routed to the appropriate device via a gateway device and using wireless mesh networking techniques. Device-specific encryption keys help to ensure that only the device to which a message is addressed can read that message. In this way, bad actors can be prevented from gaining unauthorized access to the local network of interconnected devices and issuing unauthorized commands to the devices on the local network.

In some circumstances, however, using device-specific encryption keys might not be the best approach to secure messages transmitted to the devices on the local network. Such circumstances may include those whereby a high-priority message needs to be delivered to multiple devices of a local network of interconnected devices and as fast as possible. In the context of physical building security, these types of circumstances may arise, for example, in emergency situations where it would be desirable to lockdown all lock-type devices (e.g., in response to an intruder) or unlock all lock-type devices (e.g., in response to a fire). While it would be possible to generate individual lock/unlock commands for each device using each device-specific encryption key, such an approach might delay the delivery of the lock/unlock commands in a time-sensitive situation. Transmitting unencrypted lock/unlock commands to the devices on the local network is also possible, but exposes the device to potential unauthorized access by bad actors. Accordingly, there is a need for an approach to broadcast or multicast a message to multiple devices of a local network of interconnected devices while maintaining the security of those messages and while maintaining the ability to secure messages addressed to specific devices of the local network.

The techniques described in further detail below provide, in addition to device-specific encryption keys, general encryption keys used to secure messages intended for consumption by multiple devices on the local network. For convenience, a message intended for consumption by all device nodes of a local network of interconnected devices is referred to herein as a global message. A global encryption key may be utilized to secure messages intended for consumption by all device nodes on the local network of interconnected devices, and a group encryption key may be utilized to secure messages intended for consumption by a logical grouping of some of the devices on the local network. Again for convenience, a messages intended for consumption by a subset of all device nodes of a local network of interconnected devices (e.g., a defined grouping of device nodes), is referred to herein as a group-specific message. By using a global or group encryption key to encrypt a message intended for consumption by multiple devices on the local network of interconnected devices, it is possible to quickly generate, encrypt, and transmit a secure command to those devices. In an intruder situation, for example, an administrator may issue a "lockdown all" command to toggle each lock-type device on the local network to its lock state. A single lockdown message may be generated, encrypted using the global or group encryption key, and broadcast or multicast to multiple devices on the local network to quickly secure the building. In some instances, broadcasting a single encrypted message to all devices of a local network of interconnected devices may allow the message to be delivered faster than other, more refined approaches, such as those that first determine which devices should receive the message and then transmitting the encrypted message to only those devices. By providing an emergency encryption key to some or all of the devices, the step of first determining which devices should receive the message may be unnecessary and thus eliminated. As described in further detail below, any device that cannot decrypt the message (e.g., if the device lacks the necessary encryption key) may simply discard the encrypted message. Eliminating the step of first determining which devices should receive a message may allow the message to be delivered to the devices of the local network more quickly. As noted above, delivering messages to the device nodes as fast as possible is desirable in emergency situations. Individual unlock messages may be generated for individual lock-type devices, encrypted using a device-specific encryption key, and transmitted to a particular device as needed. Once more for convenience, a message intended for consumption by only one particular device node of a local network of interconnected devices is referred to herein as a device-specific message. In implementations where the device-specific message is intended to be consumed by a particular electronic lock, the message may also be referred to as a lock-specific message. The techniques described herein thus provide a fast and efficient means for communicating messages to multiple devices of a local network of interconnected devices while maintaining the security of those messages as well as those intended for specific devices. Additional benefits and advantages will be recognized upon review of the disclosures below.

For convenience the following terminology is adopted herein. A local network of interconnected devices as used herein refers to at least two devices that are in signal communication with each other using at least one of a short-range wireless communication standard or a low-power wireless communication standard. The local network of interconnected devices may also include additional devices in signal communication with one or more devices of the network and configured to employ other wired and/or wireless communication standards. A device node as used herein refers to one of the devices of a local network of interconnected devices. A gateway device node as used herein refers to a device of a local network of interconnected devices that is configured for communicating via a wide area network (WAN)—such as the Internet and/or a cellular network—and for communicating with another one of the device nodes of the network. The gateway device node may also function as the hub of the local network of interconnected devices. The gateway device node may also be referred to as a bridge device node in view of the functionality it provides to bridge the local network and a WAN.

The device nodes of the network may be categorized based on their physical proximity to a gateway device node of the network. A zero-level device node as used herein refers to a device node that is located within the wireless range of the gateway device node, i.e., capable of receiving wireless communications transmitted from the gateway device node and/or capable of transmitting wireless communications that will be received at the gateway device node. A first-level device node as used herein refers to a device node that is located outside the wireless range of a gateway node but is located within the wireless range of a zero-level device node. A second-level device node as used herein refers to a device node that is located outside of the wireless range of a gateway device node and the wireless range of a zero-level device node but is located within the wireless range of a first-level device node. Zero-level device nodes are thus in direct signal communication with a gateway device node and may exchange point-to-point wireless communications. First-level device nodes and second-level device nodes are thus in indirect signal communication with a gateway device node, and communications may be routed to first-level device nodes and second-level device nodes via other device nodes of the network.

The device nodes of a local network of interconnected devices may also be deployed in a master/slave configuration. A master device node as used herein refers to a device node that issues commands to another device node. A slave device node as used herein refers to a device node that receives commands from a master device node. A relay device node as used herein refers to a device node that routes a communication between two other device nodes. Although the network of interconnected devices is referred to as a local network of interconnected devices, a device node that is located remotely relative to another device node of the network may communicate with that device node via a WAN (such as the Internet) as described in further detail below.

The device nodes of the local network of interconnected devices are configured to utilize one or more of the following communication standards: wired LAN communication standards; wireless LAN communication standards; cellular communication standards; short-range wireless communication standards; and low-power wireless communication standards. Examples of wired LAN standards include the IEEE 802.3 family of Ethernet standards. Examples of wireless LAN standards include the IEEE 802.11 family of wireless LAN standards commonly known as "Wi-Fi." Examples of cellular communication standards include any of the 2G, 3G, or 4G generation of cellular communication standards. Examples of short-range communication standards include the IEEE 802.15 family of wireless communication standards which include implementations commonly known as Bluetooth Classic developed by the Bluetooth Special Interest Group (SIG), ZigBee developed by the ZigBee Alliance, and any of the near-field communication (NFC) standards developed by the NFC Forum. Short-range wireless communication standards may permit maximum wireless ranges of about 1 meter (m) to about 100 m (i.e., about 3.3 feet (ft) to about 330 ft) depending on transmission power. Examples of low-power wireless communication standards include Bluetooth low energy (also known as Bluetooth LE, BLE, and Bluetooth Smart) also developed by the Bluetooth SIG and include ANT developed by Dynastream Innovations Inc. Accordingly low-power wireless communication standards include those that exhibit a peak power consumption of about 10 milliamps (mA) to about 30 mA when employed to transmit and/or receive wireless communications.

One or more device nodes of the local network of interconnected devices may also be referred to as a low-power device. As used herein, low-power devices include those that, when active and consuming at least some power, are configured to toggle between a sleep mode and an awake mode where the device consumes significantly less power while in the sleep mode relative to the power consumed while in the awake mode. In some example implementations, the power consumed by an example low-power device during a sleep mode may differ from the power consumed during an awake mode by an order of magnitude—e.g., the device may consume power on a scale of microamps ($\mu A$) during a sleep mode and consume power on a scale of milliamps during an awake mode. In one particular example, a low-power device may receive a power supply voltage of 3 volts (V) and exhibit the following power consumption characteristics. While in a sleep mode, this example low-power device may exhibit a power consumption of about 0.6 $\mu A$ with no retention of data in volatile memory, a power consumption of about 1.2 $\mu A$ with 8 kilobytes (kB) of data retention in volatile memory, and a power consumption of about 1.8 $\mu A$ with 16 kB of data retention in volatile memory. While in an awake mode, this example low-power device may exhibit a power consumption of about 2.6 $\mu A$ during periods of relatively low activity at a controller, a power consumption of about 10.5 mA during transmission of a wireless signal at about 0 dBm, and a peak power consumption of about 13 mA during reception of a wireless signal. It will be appreciated that the values provided above are provided by way of example only and that other low-power devices may exhibit different power consumption profiles.

A dual-mode device node as used herein refers to a device node configured to wirelessly communicate using at least two low-power wireless communication standards (e.g., both ANT and BLE). A multi-mode node as used herein refers to a device node configured to wirelessly communicate using at least two low-power wireless communication standards (e.g., both ANT and BLE) as well as at least one other wired or wireless communication standard (e.g., a short-range wireless communication standard, a cellular communication standard, a wired LAN communication standard, and/or a wireless LAN communication standard). It will be recognized that the local network of interconnected devices may, in some circumstances, be or include a personal area network (PAN) where the device nodes of the network are logically associated with an individual user and communicate over relatively short distances. A local area network of interconnected devices may thus include multiple PANs each respectively associated with a particular user, e.g., each the individual of a household.

An access device as used herein refers to a user-operated device node that is configured to interact with other device nodes in the local network of interconnected devices. Examples of access devices include computing devices (e.g., mobile cellular telephones, palmtop computing devices, tablet computing devices, laptop computing devices, desktop computing devices, video game machines, network-enabled televisions, and the like), miniature remotes (e.g., keyfobs), and other types of devices having at least one communication interface configured for communicating with one or more types of devices nodes of a local network of interconnected devices either directly or indirectly via one or more device nodes and/or via local and/or remote computing devices. As described in further detail below, access devices include instructions that, when executed at the access device, cause the access device to wirelessly communicate with device nodes of a local network of interconnected devices. Some of the instructions cause the access device to accept input from the user such that the access device initiates communications to device nodes responsive to and based on that input. Other instructions cause the access device to provide output to the user responsive to and based on communications received from devices nodes. The instructions may reside in non-volatile memory at the access device, and those instructions may or may not be updatable. In some examples, those instructions may be implemented as an application installed at the access device.

As described in further detail below device nodes may pair and bond with each other when in direct signal communication. As used herein, pairing refers to the process of discovering a device, exchanging device information, and exchanging communications during a temporary communication session. As also used herein, bonding refers to the process of exchanging long-term keys between paired devices such that those devices may subsequently pair automatically when those devices are within their respective wireless ranges.

As noted above, messages may be broadcast or multicast to multiple devices of the local network of interconnected devices. As used herein, broadcasting a message includes sending a message to all device nodes of a local network of interconnected devices. Broadcasting a message also includes sending a message to all device nodes of a subset of the device nodes of the local network such as device nodes of a particular type (e.g., all lock-type device nodes, all sensor-type device nodes). As also used herein, multicasting a message includes sending a message to all device nodes of a logical grouping of device nodes of the local network. As described by way of example below, lock-type device nodes may be grouped based on the type of doorways they are used to secure, e.g., interior doors and exterior doors. Accordingly, examples of logical grouping of lock-type device nodes include an "interior door" group and an "exterior door" group. It should be appreciated that, because all lock-type device nodes may be considered both a logical grouping of device nodes by type and may be a subset of all device nodes on a local network, the terms broadcasting and multicasting may be used interchangeably in some scenarios.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a "set" as used in this description refers to a collection of one or more elements. Furthermore non-transitory computer-readable storage media refer to all types of computer-readable media with the sole exception being a transitory propagating signal. Finally, "or" as used herein should not be interpreted as an exclusive or unless expressly indicated.

Networks of Interconnected Devices

Referring now to FIG. 1, an example of an implementation of a local network of interconnected devices 100 ("network") is shown. As seen in FIG. 1, the network 100 includes multiple device nodes of different types in signal communication with each other. In particular, the network 100, in this example, includes a gateway device node 102 ("gateway"), access devices 104a, 104b, 104c, 104d, and 104e (generally access device 104 and collectively access devices 104a-e), and device nodes 106a, 106b, 106c, 106d, 106e, 106f, 106g, and 106h (generally device node 106 and collectively device nodes 106a-h). It will be appreciated that the network 100 depicted in FIG. 1 is illustrated by way of example only and that other implementations of a local network of interconnected devices may include more or fewer devices nodes in signal communication with each other.

As also seen in FIG. 1, the gateway 102 and the access device 104e are each in signal communication, via a network 108, with a device management server 110. The network 108 may be a WAN that includes one or more wired and/or wireless networks such as, e.g., the Internet, a cellular network, a satellite network, and the like. In this way, the access device 104e may communicate with the gateway 102 or any of the other device nodes 106 of the network 100 even though that access device is located remotely relative to the other device nodes.

The device management server 110, in this example, includes an access portal 112 and a data store 114 storing user profiles 116 and device profiles 118. The access portal 112 is configured to facilitate the communications between the access device 104e and the gateway 102. Accordingly, in some example implementations, the access portal 112 may be implemented as a web server that utilizes the HyperText Transport Protocol (HTTP) to communicate with the access device 104e and the gateway 102. In particular, the access portal 112 may receive HTTP requests from the access device 104e and gateway 102 and transmit HTTP responses to the access device 104e and gateway 102. In addition, the access portal 112 may be configured to push communications to the access device 104e and the gateway 102. In some example implementations, the access portal 112 may utilize HyperText Transport Protocol Secure (HTTPS) to encrypt and thus secure the communications. The content (i.e., the payload) of the communications may be formatted according to an Extensible Markup Language (XML) format and/or a JavaScript Object Notation (JSON) format. Content may thus be submitted to the access portal 112, for example, in HTTP POST requests. The content of the communications may also be encrypted using a key associated with the device node receiving the communications. Encrypting communications between device nodes of a local network of interconnected devices is discussed in further detail below. The access portal 112 of the device management server 110 may thus act as a relay for communications between the gateway 102 and device nodes 106 and the remotely-located access device 104e. Various configurations and arrangements may be employed to implement the device management server 110. In some example implementations, the access portal 112 and data store 114 may reside at the same machine while in other example implementations an access portal and data store may reside at different machines that are in signal communication with each other. A publish-subscribe-based messaging protocol may also be employed to deliver messages between the device management server 110 and the gateway 102. The messages transmitted using such a protocol likewise may be XML- or JSON-formatted messages. Suitable publish-subscribed-based messaging protocols that may be employed include Message Queue Telemetry Transport (MQTT) messaging protocol.

The user profiles 116 stored at the data store 114 include individual user profiles for users each having established respective local networks of interconnected devices. Individual user profiles 116, in this example, include data corresponding to a unique identifier for the user (e.g., a user account number, a username, an email address, a phone number, and the like). Individual user profiles 116 may also include data corresponding to login credentials (e.g., a username and a salted and hashed password). The device profiles 118, in this example, include two types of device profiles: i) device profiles corresponding to the gateway 102 and device nodes 106 of the network 100, and ii) device profiles corresponding to the access devices 104 that communicate with the device nodes 106. Individual device profiles 118 for device nodes include data corresponding to a unique identifier for the device node (e.g., a serial number), a device type, a default or user-specified description of the device, a security token associated with the device, one or more keys associated with the device (e.g., public and private digital signature keys), and a status of the device. In some example implementations, device nodes may be associated with multiple serial numbers, e.g., a 16 byte serial number and a 4 byte serial number. The serial numbers, security token, and keys may be generated at the time of manufacture and associated with the device throughout its lifetime. The keys may be, e.g., 128-bit keys. A device node may utilize one or more of its keys with one or more encryption algorithms to encrypt at least a portion of the communications transmitted and with one or more decryption algorithms to decrypt at least a portion of the communications received.

Individual device profiles 118 for device nodes also include data identifying the user profile 116 the device node is associated with (e.g., the user account number, username, email address, and the like). Individual device profiles for the access devices 104 may likewise include data corresponding to a unique identifier for the access device (e.g., a serial number, a device address such as a media access control (MAC) address, and the like), a type of the access device (e.g., mobile cellular telephone, tablet computing device, keyfob, and the like), a manufacturer of the access device, a model number of the access device, an operating system of the access device, and the like. The device profiles for gateways may also include a command queue corresponding to a list of commands that have been transmitted to the device management server from access devices located remotely relative to the local network of interconnected devices. As described in further detail below, the device management server transmits to a gateway the commands included in its corresponding command queue. Individual user profiles 116 may also include or be otherwise associated with invitations to other access devices authorized to communicate with, and thus access, the device nodes 106 of the network 100. Invitations will be discussed in further detail below. In addition, the data included in the user profiles 112 and device profiles 118 discussed above is described by way of example only. Accordingly other implementations of the user and device profiles may include additional or alternative data corresponding to additional or alternative aspects or characteristics of the users, device nodes, and access devices.

The data store 114 may include a database (not shown) that implements a data model for storing the data of the user profiles 116 and the device profiles 118. The database may store the data of the user profiles 116 and the device profiles 118 according to that data model. The database may thus include one or more tables respectively corresponding to users and device nodes, e.g., a USER table, a DEVICE table, and an INVITATION table. The rows of the USER table may correspond to records of the user profiles 116, and the rows of the DEVICE table may correspond to records of the device profiles 118. The rows of the INVITATION table may correspond to records of invitations that have been generated for access devices. The columns of the tables may correspond to the particular data elements stored for the user profiles 116 and the device profiles 118. The database may associate records of individual user profiles 116 with records of device profiles 118 through the use of primary and/or foreign keys included in those records. The database may associate records of individual user profiles 116 with invitations in a similar fashion. Through the associations of their corresponding database records, users and user accounts are thus associated with access devices 104 and devices nodes 106 of the network 100. The device management server 110 may thus also include a database management system (DBMS, not shown) that manages the storage and retrieval of the data of the user profiles 116 and the device profiles 118, e.g., creating new records, querying for existing records, and deleting records from the database. The access portal 112 and the gateway 102, in this example, are in signal communication with the data store 114 and may store and retrieve the data of the user profiles 116 and the device profiles 118, e.g., via the DBMS.

The access portal 112, in this example, is also configured to authenticate the access device 104e based on login credentials provided by to the access device by the user and subsequently transmitted to the access portal. Upon successful authentication, the access portal 112 may provide a dashboard interface ("dashboard") at which the user may access and manage the devices of the network 100 that are associated with the user account of the user. The access device 104e may present the dashboard to the user and accept input from the user. Through the dashboard, the user may, for example, check the status of device nodes 106 in the network 100, issue commands to device nodes, toggle activation of the device nodes, add device nodes to the network, remove device nodes from the network, view audit logs associated with the device nodes, view access devices currently authorized to communicate with the device nodes, view invitations to other access devices, resend invitations to access devices, create new invitations, and engage in other activities associated with the device nodes that will be appreciated with the benefit of this disclosure. These activities will be discussed further below.

The access devices 104, in this example, are configured with instructions for receiving input from a user and providing output to a user and for communicating with the device management server 110, gateway 102, and device nodes 106. The instructions may be implemented for example, as a device monitoring and control mobile application ("mobile application") installed at an access device such as the mobile application 128 installed at the access device 104e. As discussed in further detail below, the mobile application 128 provides functionality for viewing the status of the device nodes, pairing and/or bonding with those device nodes, and issuing commands to those device nodes.

As noted above, some device nodes in a local network of interconnected devices may be in direct signal communication with each other while other devices nodes may be in indirect signal communication via a relay device node. Whether a device node is in direct or indirect signal communication with another device node depends on the wireless ranges of those device nodes. The network 100 shown by way of example in FIG. 1 illustrates device nodes that are both in direct and indirect signal communication with each other based on their wireless range. The dashed lines surrounding the gateway 102 and device nodes 106 in FIG. 1 demarcate the device nodes that are within their respective wireless range and thus in direct signal communication with each other. In particular, area 120 indicates that the gateway 102 and device nodes 106a-e are within wireless range; area 122 indicates that device nodes 106a-b are within wireless range; area 124 indicates that device nodes 106d and 106f are within wireless range; and area 126 indicates that device nodes 106e and 106g-h are within wireless range. FIG. 1 also illustrates respective access devices 104a-d that are within the wireless range of various device nodes 106 of the network. In particular, access device 104a is in direct signal communication with the gateway 102 and device node 106g, access device 104b is in direct signal communication with device nodes 106a-b, access device 104c is in direct signal communication with device node 106c, and access device 104d is in direct signal communication with device nodes 106*d-e*. As discussed in further detail below, the communications among the access devices 104, gateway 102, and devices nodes 106 may be secured using various security techniques.

The device nodes 106 may include different classes of device nodes, e.g., dual-mode device nodes and multi-mode device nodes. The device nodes 106 may also include different types of devices nodes within those classes of device nodes. Dual-mode and multi-mode device nodes may include the following types of device nodes: i) sensor-type device nodes that include sensors for measuring various parameters associated with the surrounding environment such as for example, acoustic and optical sensors, chemical sensors (e.g., oxygen, carbon dioxide, carbon monoxide, smoke, etc.), electric and magnetic sensors, electromagnetic radiation sensors, temperature sensors, force and pressure sensors, moisture and fluid flow sensors, air and air flow sensors, velocity and acceleration sensors, position and displacement sensors, proximity and motion sensors, and the like; and ii) activation-type device nodes that include actuators, solenoids, and/or output devices that are operable in response to receipt of commands such as, for example, locks for structures (e.g., doors, gates, and the like) and for containers (e.g., safes, drawers, cabinets, and the like), optical output devices (e.g., lights, display devices, and the like), audio output devices (e.g., speakers, alarms, and the like), automatic garage door openers, automatic gate openers, and the like. In some example implementations, device nodes may be configured to include audio data and/or image data in the communications transmitted to other device nodes, a gateway, the device management server, or an access device.

Figure 2:
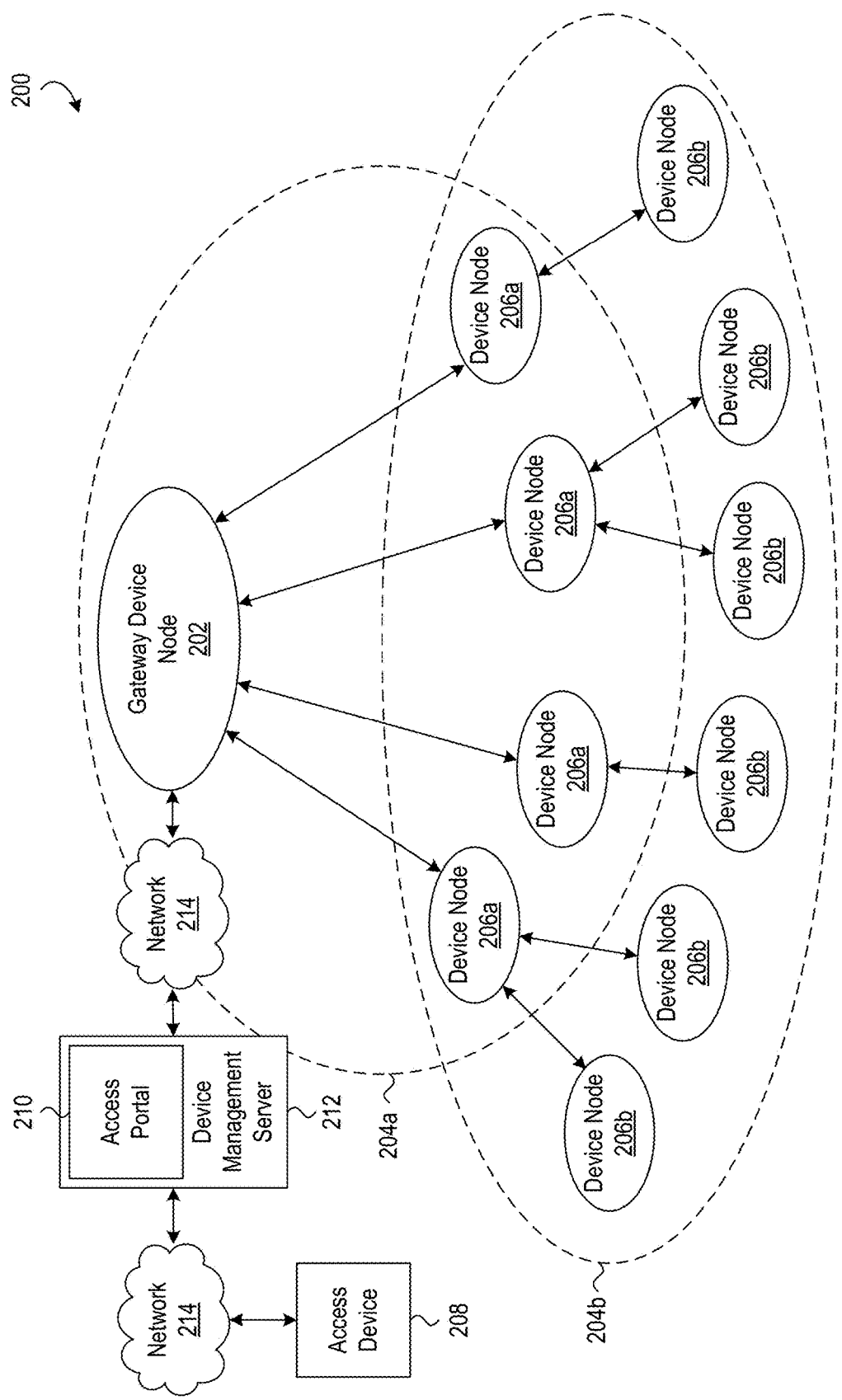
FIG. 2 depicts another example of an implementation of a local network of interconnected devices in accordance with aspects described herein.

Referring now to FIG. 2, another local network of interconnected devices 200 ("network") is shown. In FIG. 2, the hierarchical arrangement of the network 200 is depicted with respect to a gateway device node 202, a set 204*a* of zero-level device nodes 206*a*, and a set 204*b* of first-level device nodes 206*b* (collectively device nodes 206). In FIG. 2, the zero-level device nodes 206*a* and the gateway 202 are within their respective wireless ranges and thus in direct signal communication with each other. The first-level device nodes 206*b* are outside the wireless range of the gateway 202, but within the wireless range of one of the zero-level device nodes 206*a*. The first-level device nodes 206*b* are thus in direct signal communication with the zero-level device nodes 206*a* and in indirect signal communication with the gateway 202 via the zero-level device nodes. Second-level device nodes (not shown) may be in direct signal communication with the first-level device nodes 206*b* and in indirect signal communication with the gateway 202 via the first-level device nodes and the zero-level device nodes 206*a* in a similar fashion. Third-level device nodes, fourth-level device nodes, and so on, may be connected to upper-level device nodes in a similar fashion. Accordingly the number of levels of the local network of interconnected devices is not intended to be limited to the two example levels shown in FIG. 2. As also seen in FIG. 2 and noted above, the gateway 202 (and thus the device nodes 206) may be in signal communication with an access device 208 via an access portal 210 of a device management server 212 across a network 214, e.g., a WAN such as the Internet and/or a cellular network.

In this hierarchical arrangement, the gateway 202 and device nodes 206 may interact in a master-slave configuration. In other words, one device may be designated as a master device node, and another device may be configured as a slave device node relative to that master device node. The master device node may issue commands to the slave device node, and the slave device node may respond according to those commands. With respect to the network 200 shown by way of example in FIG. 2, the gateway 202 may be configured as a master device node, and at least one of the zero-level device nodes 206*a* may be configured as a slave device node to the gateway. Additionally or alternatively, one of the zero-level device nodes 206*a* may be configured as a master device node, and one of the first-level device nodes 206*b* may be configured as a slave device node relative to that zero-level device node. Commands transmitted from a master device node to a slave device node include a command to provide the current status of the slave device node (e.g., whether a lock-type device node is in a locked or unlocked state), a command to provide a measurement value measured by the slave device node (e.g., the current reading measured by a sensor-type device node), and a command to perform some action at the slave device node (e.g., perform a lock or unlock operation at a lock-type device node). Other examples of various command types and specific commands will be appreciated with the benefit of this disclosure.

By equipping the device nodes with multiple types of communication interfaces and configuring the device nodes to utilize multiple wireless communication standards, users advantageously derive the benefit of multiple types of network topologies. As an example, various short-range wireless communication standards may be suitable for establishing master/slave configurations in point-to-point networks, star networks, and tree networks but might not be suitable for establishing mesh networks. Various low-power wireless communication standards, however, may be suitable for establishing mesh networks. Accordingly, device nodes configured to utilize both short-range and low-power wireless communication standards may thus establish networks that include a combination of network topologies, e.g., networks exhibiting point-to-point, star, tree, and mesh topologies. The device nodes may advantageously utilize each of the respective features provided by the different technologies, e.g., the master/slave features available with the point-to-point, star, and tree network topologies as well as the relay features and multiple communication pathways available with the mesh network topology.

One or more of the device nodes of the local network of interconnected devices may receive updates with respect to its stored instructions. A device node may receive an update wirelessly or via a wired connection. As an example, a gateway device node may receive an update from the device management server via its wired connection to a wide area network (e.g., the Internet). The device management server may also send an update for one of the device nodes to the gateway device node, and the gateway device node may wirelessly transmit the update to the specified device node (i.e., an over-the-air update). If necessary, the update for the specified device node may be routed from the gateway device node via one or more other device nodes. A device node may also receive an update from an access device in signal communication with the device node. In some circumstances, the device management server may provide the gateway device node with an update to be applied at each device node of the local network of interconnected devices, and the gateway device node may broadcast the update to each of the device nodes.

Device Nodes

Figure 3:
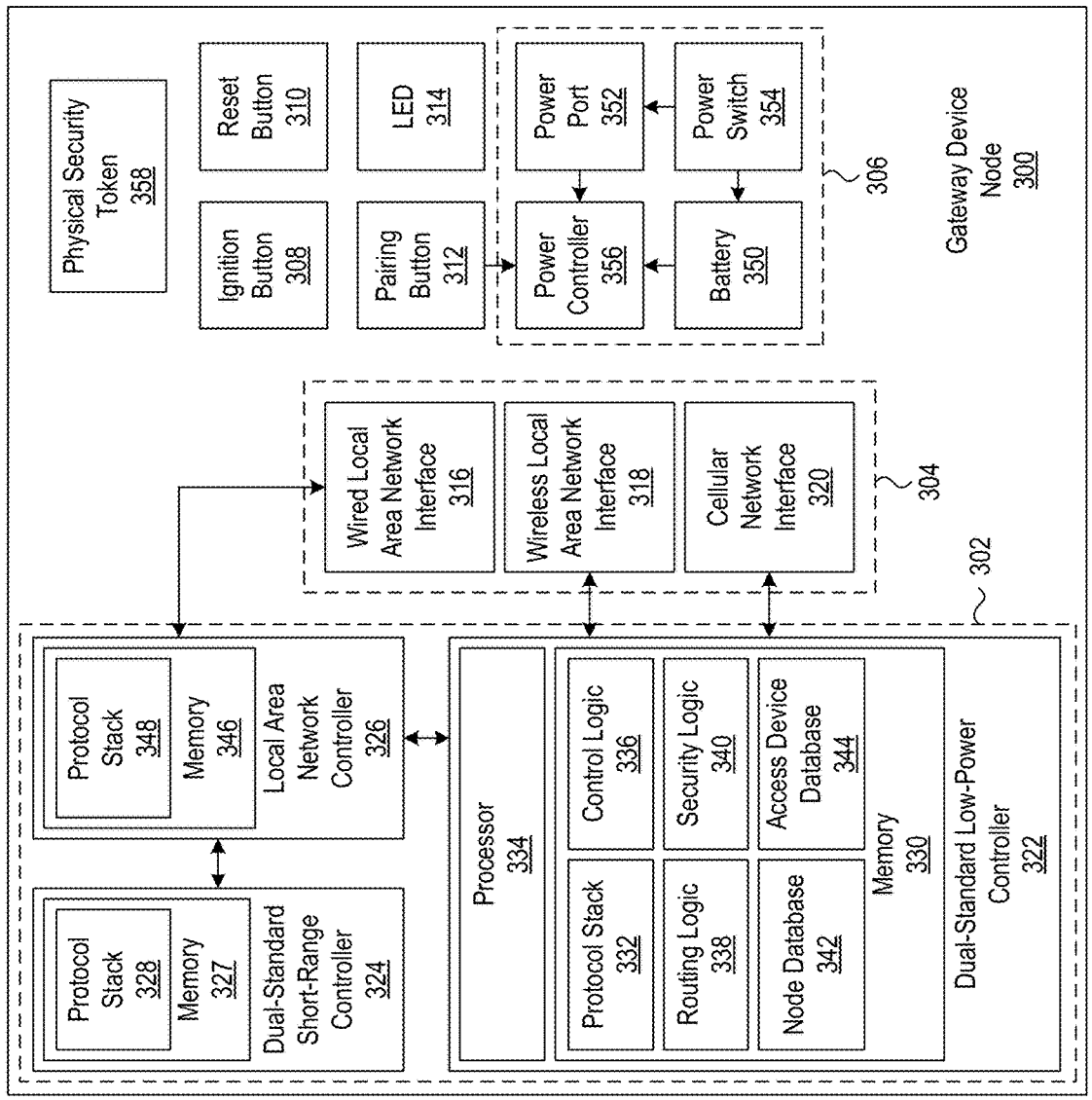
FIG. 3 depicts an example of an implementation of a gateway device node in accordance with aspects described herein.
Figure 5:
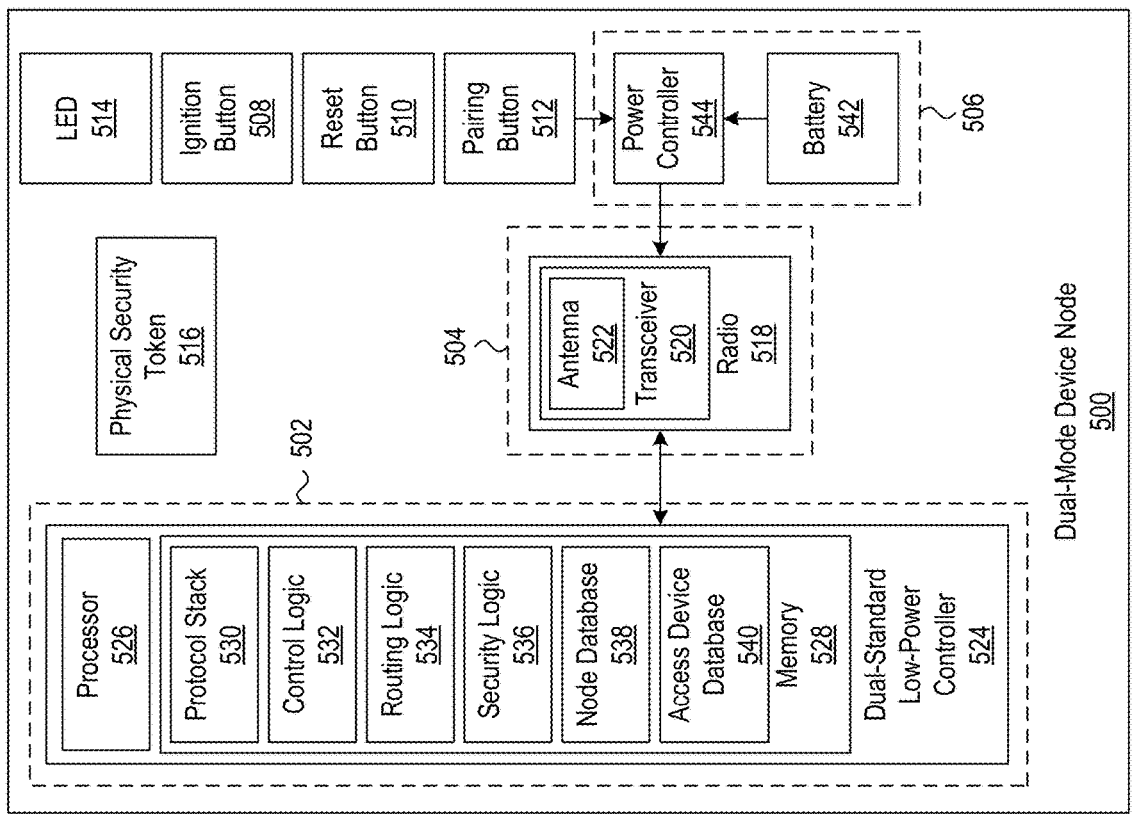
FIG. 5 depicts an example of an implementation of a dual-mode device node in accordance with aspects described herein.
Figure 4:
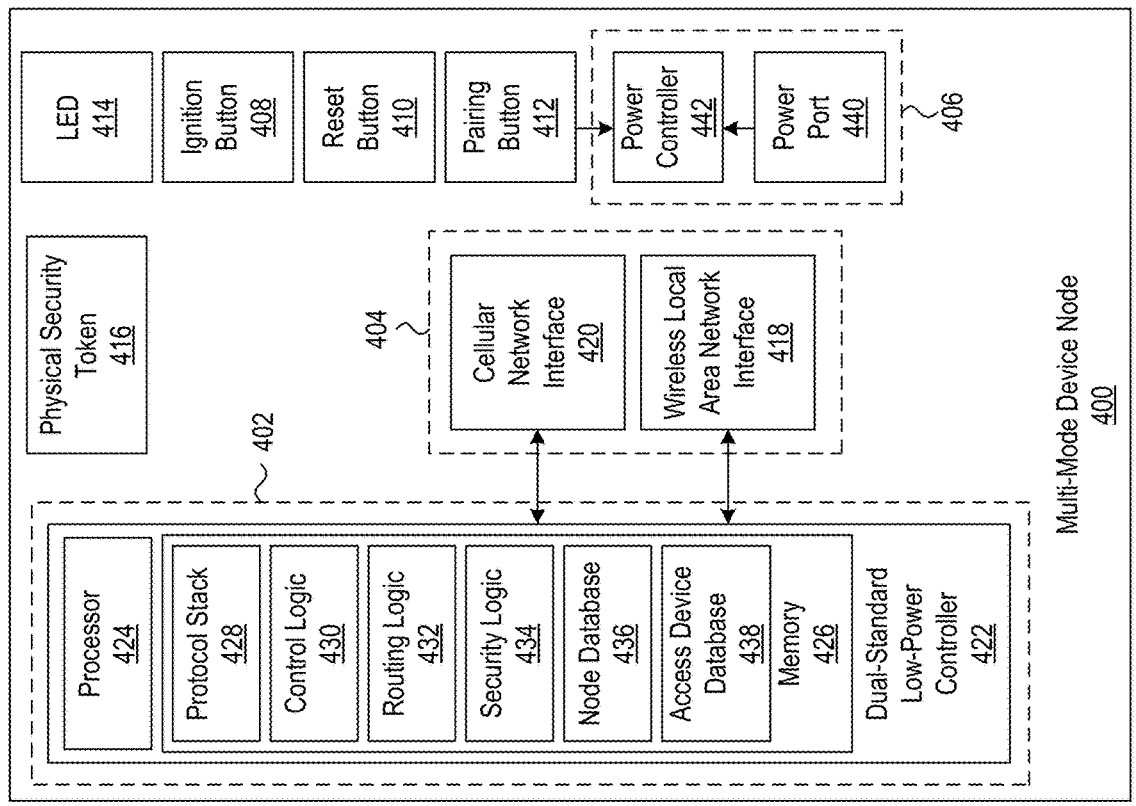
FIG. 4 depicts an example of an implementation of a multi-mode device node in accordance with aspects described herein.

Referring now to FIGS. 3-5 example types of device nodes are illustrated. In FIG. 3, an example of an implementation of a gateway device node is shown. In FIG. 4, an example of an implementation of a multi-mode device node is shown. In FIG. 5, an example of an implementation of a dual-mode device node is shown. The device nodes discussed above with reference to FIGS. 1-2 may respectively correspond to the example device nodes illustrated in FIGS. 3-5 and discussed in further detail below. A local network of interconnected devices may include one or more of each type of device node. In one example implementation of a local network of interconnected devices, a gateway node may serve as the hub of multiple dual-mode device nodes and multi-mode device nodes that are part of the network at various layers. FIGS. 3-5 include lines illustrating the signal paths between various components of the device nodes. It should be appreciated, however, that, for the sake of clarity, not every signal path between the components of the device nodes have been illustrated in the figures.

Device nodes—including gateway device nodes, dual-mode device nodes, and multi-mode device nodes—may each be assigned a serial number, a security token, and a set of keys (e.g., three keys) upon manufacture. This unique identification information is employed to recognize, authenticate, and authorize device nodes when added to a local network of interconnected devices and when communicating with other device nodes of the network and the device management server. The keys are also used to encrypt and decrypt portions of the communications exchanged between access devices and other device nodes. In particular, the device nodes may utilize the keys to encrypt and decrypt session identifiers of the communication sessions established between access devices and other device nodes as well as the content of those communications. Authorized access devices may also be provided with the keys associated with a device node and also utilize those keys to encrypt and decrypt portions of the communications exchanged with the device node.

With reference to FIG. 3, an example of an implementation of a gateway device node 300 ("gateway") is shown. The gateway 300, in this example, includes a control module 302, a communication module 304, a power module 306. The gateway 300, in this example, also includes multiple physical user interface elements including an ignition button 308, a reset button 310, a pairing button 312, and a light emitting diode (LED) 314.

The communication module 304 of the gateway 300 includes multiple communication interfaces. In particular, the communication module 304, in this example, includes a wired LAN interface 316, a wireless LAN interface 318, and a cellular network interface 320. The gateway 300 may thus exchange wired and wireless communications with access devices and device nodes of the local network of interconnected devices via one or more of the wired LAN interface 316, the wireless LAN interface 318, and the cellular network interface 320. Although not shown in FIG. 3 for the sake of clarity, the communication module 304 of the gateway 300 may also include one or more radios with corresponding transmitters, receivers, and/or transceivers having one or more antennas to receive and/or transmit wireless communications. Such radios may include radios configured to operate at one or more frequencies suitable for wireless LAN communications such as those frequencies in the ISM band (e.g., 2.4 GHz radios, 5 GHz radios, 60 GHz radios) as well as radios configured to operate at one or more frequencies suitable for cellular communications such as the frequency bands specified by various cellular network standards (e.g., the 1G, 2G, 3G, and 4G families of cellular network standards). In addition, the communication module 304 of the gateway 300 may also include a physical communication port (e.g., an Ethernet port) configured to communicate via the wired LAN interface 316 (e.g., using one or more of the IEEE 802.3 family of Ethernet standards). The wireless LAN interface 318 may likewise be configured to communicate using one or more of the IEEE 802.11 family of wireless LAN standards. The wired LAN interface 316 and the wireless LAN interface 318 thus facilitate communications at the gateway 300 via IP-based networks including LANs and/or WANs (e.g., the Internet). The cellular interface 320 likewise facilitates the communications to and from the gateway 300 via a cellular network. The cellular network interface 320 may thus include a cellular modem. Cellular modems suitable for use with the cellular network interface 320 include those available from Gemalto M2M GmbH of Munich, Germany such as the cellular machine-to-machine modules having model numbers PLS8, PXS8, PCS3, PVS8, PHS8, PGS8, PDS5, PDS6, PDS8, and the like. The various communication interfaces of the communication module 304 of the gateway 300 advantageously allow access devices that are located remotely relative to the local network of interconnected devices to communicate with the device nodes of the network for monitoring and control purposes.

The control module 302 of the gateway 300 includes multiple controllers for handling and responding to the communications received at and transmitted from the gateway 300. In particular, the control module 302 of the gateway 300, in this example, includes a dual-standard low-power controller 322 ("low-power controller"), a dual-standard short-range controller 324 ("short-range controller"), and a local area network controller 326 ("LAN controller"). As seen in FIG. 3, the LAN controller 326, in this example, is in signal communication with the wired LAN interface 316, the low-power controller 322, and the short-range controller 324. The low-power controller 322, in this example, is also in signal communication with the wireless LAN interface 318 and the cellular network interface 320. The low-power controller 322, wireless LAN interface 318, and cellular network interface 320 may be in respective signal communication with one or more radios (not shown) of the communication module 304.

The short-range controller 324, in this example, is configured to selectively utilize multiple short-range wireless communication standards to wirelessly communicate with access devices and device nodes of the local network of interconnected devices. In some example implementations, the short range controller 324 may be configured to wirelessly communicate using both the Bluetooth Classic and the BLE short-range wireless communication standards. In this way, the gateway 300 may wirelessly communicate with access devices and device nodes that are also configured to wirelessly communicate using the Bluetooth Classic and/or BLE short-range wireless communication standards. In this regard, the short-range controller 324 includes memory 327 storing instructions corresponding to a protocol stack 328 that is configured to handle and process multiple types of short-range wireless communications received at the gateway 300 (e.g., Bluetooth Classic communications and BLE communications) from the access devices or device nodes of the local network of interconnected devices. The protocol stack 328 may be any protocol stack suitable for use with a local network of interconnected devices including, for example, those protocol stacks designed for embedded systems (e.g., the Qualcomm® Bluetopia™ protocol stack available from Qualcomm Atheros, Inc. of San Jose, Calif.).

The low-power controller 322, in this example, is configured to selectively utilize multiple low-power wireless communication standards to wirelessly communicate with access devices and device nodes of the local network of interconnected devices. In some example implementations, the low-power controller 322 may be configured to utilize both the BLE and the ANT low-power wireless communication standards. In this way, the gateway 300 may wirelessly communicate with access devices and device nodes that are also configured to wirelessly communicate using the BLE and/or ANT low-power wireless communication standards. In this regard, the low-power controller 322 likewise includes memory 330 storing instructions corresponding to a protocol stack 332 that is configured to handle and process multiple types of low-power wireless communications received at the gateway 300 (e.g., BLE communications and ANT communications) from the access devices or device nodes of the local network of interconnected devices.

As seen in FIG. 3, the low-power controller 322 is in signal communication with the wired LAN interface 316 (via the LAN controller 326), the wireless LAN interface 318, and the cellular network interface 320. In this way, the gateway 300 may advantageously route communications received via any of these interfaces to device nodes of the local network of interconnected devices, the access devices, and the device management server. The cellular network interface 320 may employ an AT command structure and/or a machine-to-machine command structure for communicating with the low-power controller 322. The wired LAN interface 316 and the wireless LAN interface 318 may likewise employ a serial command structure for communicating with the low-power controller 322. As an example, the wired LAN interface 316 may communicate with the low-power controller 322 via the LAN controller 326 using universal asynchronous receiver/transmitter (UART) communications.

The low-power controller 322 may be a system-on-chip (SoC). Accordingly the low-power controller 322 may include, among other components, a processor 334 and logic stored at the memory 330 for controlling operation of the low-power controller. The low-power controller 322 may thus include other components common to a SoC (e.g., timing sources, peripherals, digital signal interfaces, analog signal interfaces, power management components, and the like) which have been omitted from FIG. 3 for the sake of clarity. Low-power controllers suitable for use as the low-power controller 322 include those available from Nordic Semiconductor of Oslo, Norway such as the Multiprotocol ANT+™/Bluetooth® low energy System on Chip having model number nRF51422. In addition, a suitable protocol stack for use as the protocol stack 332 may also be available from Nordic Semiconductor of Oslo, Norway such as the Concurrent ANT+™ and Bluetooth® Low Energy SoftDevice having model number S310 nRF51422.

The low-power controller 322, in this example, is also configured with instructions for communicating with access devices and device nodes in the local network of interconnected devices. As seen in FIG. 3, the memory 330 of the low-power controller 322 stores instructions corresponding to control logic 336, routing logic 338, and security logic 340 for controlling operational aspects of the gateway 300. As also seen in FIG. 3, the memory 330 of the low-power controller 322 additionally includes a node database 342 for storing records corresponding to the device nodes of the local network of interconnected devices and an access device database 344 for storing records corresponding to the access devices that are authorized to communicate with those device nodes. The records of the node database 342 thus corresponds to a list of the device nodes of the local network of interconnected devices, and the records of the access device database 344 thus corresponds to a list of access devices that are authorized to access the device nodes of the network.

The control logic 336 of the low-power controller 322 corresponds to instructions that handle various operational aspects of the gateway 300. In particular, the control logic 336, in this example, handles the initialization of the gateway 300 upon startup including the configuration of various operating parameters such as, e.g., the operating frequency for the gateway, the initial security mode for the gateway, and the like. The control logic 336 also initiates the periodic transmissions (e.g., every 500 milliseconds) from the gateway 300 announcing its presence to any devices that are within wireless range of the gateway. In addition, the control logic 336 maintains the list of device nodes of the network by creating new records at the node database 342 when new device nodes are added to the network and deleting records from the node database when device nodes are removed from the network. The control logic 336 additionally handles the pairing and bonding procedures performed with access devices. Furthermore the control logic 336 issues commands to the device nodes of the network (e.g., operations to perform) and polls the device nodes for status updates. Moreover the control logic 336, in this example, also sets a security mode of the gateway 300 in response to receipt of user input indicating a user-selected security mode. The control logic 336 additionally issues, to device nodes of the network, commands that instruct those device nodes to employ a user-selected security mode. Additional operational aspects associated with the gateway that the control logic 336 may handle will be appreciated with the benefit of this disclosure.

The routing logic 338 of the low-power controller 322 corresponds to instructions that route communications between device nodes of the local network of interconnected devices, between the device management server and those device nodes, and between the access devices and those device nodes. The routing logic 338 thus ports communications received at the gateway 300 via the low-power wireless communication standards to the other communication standards the gateway 300 is configured to use, e.g., the wired LAN and wireless LAN communication standards, the short-range communication standards, and the cellular communication standards. The routing logic 338 likewise ports communications received via these other communication standards to the low-power communication standards utilized by the low-power controller 322. The routing logic 338 may include routing tables that are utilized to route communications through the local network of interconnected devices. Those routing tables may be updated responsive to changes at the local network of interconnected devices, e.g., as device nodes are added to and removed from the network. The gateway 300 may also be configured to measure various metrics associated with the transmission environment surrounding the gateway (e.g., signal-to-noise ratio, parity check losses, and the like) and make routing decisions based on those metrics, e.g., determining whether to route a communication to a device node using one or more of a low-power wireless communication standard, a short-range wireless communication standard, a wireless LAN communication standard, and/or a wired LAN communication standard. As an example, the metrics measured by the gateway 300 may favor routing a communication via one device node over another device node depending on the environmental metric measurements. The routing logic may also make routing decisions based on the respective security modes set for the device nodes along potential routing pathways. As an example, the routing logic may not select a potential routing pathway where the security mode for a device node along that pathway is relatively less secure than the security mode set for the target device node. In other words, when routing a communication to a target device node, the routing logic may select a routing pathway where the respective security modes of each device node along that pathway is at least as secure as the security mode set for the target device node.

The security logic 340 of the low-power controller 322 corresponds to the instructions that control the manner in which the gateway 300 secures the communications (if at all) between access devices, other device nodes of the network, and the device management server. The security logic 340, in this example, includes respective sets of instructions that each correspond to a particular security mode. Each respective security mode may be configured to employ various techniques for securing the communications or, in some circumstances, permitting unsecured communications. Accordingly, example security modes included in the security logic 340 may include one or more security modes that require communications to be encrypted as well as one or more security modes that permit communications to be unencrypted. In addition, the security modes requiring encryption may each specify a particular encryption method to employ when encrypting the communications, e.g., security modes respectively requiring relatively more or less complex encryption methods. The security logic 340 stored at the memory of the low-power controller 322 may include one or more keys associated with the gateway device node 300 used to encrypt the content (i.e., the payload) and communications transmitted to the access devices as well as decrypt the content and communications received from access devices, the device management server, and other device nodes of the network. The security modes that do not require encryption may include security modes that require authentication of a security token in order to communicate as well as security modes that permit communication without authenticating a security token. The gateway 300 may be configured with a default security mode. As noted above, however, the security mode of the gateway 300 may be changed in response to receipt of user input identifying a security mode selected for the gateway by the user. User-selectable security modes will be discussed in further detail below.

The node database 342, in this example, stores records of the device nodes of the local network of interconnected devices. A device node record includes a set of information associated with one of the device nodes of the network. A device node record may include, for example, the serial number of the device node and a security token associated with the device node. A device node record may also include the local network address assigned to the device node upon joining the network, the serial number of its parent device node, the local network address assigned to its parent device node, and the layer number of the parent device node in the network. A device node record may also include identifications of the class of device node as well as the type of the device node—e.g., whether the device node is dual-mode or multi-mode device node, whether the device node is a sensor-type device node or an activation-type device node, and the particular type of sensor or activatable device. In addition, a device node record may include an indication of the security mode set for the device node. Furthermore a device node record may include an indication of whether the device node is powered via an internal power source (e.g., a battery) or via an external power source (e.g., an AC or DC power supply). In some example implementations, the device class, device type, and power profile may be encoded in the serial number of the device node. A device node record may also include one or more of the keys associated with the device node and used by the low-power controller 322 to encrypt and decrypt content and communications transmitted to and received from the device node corresponding to that device node record.

The access device database 344, in this example, stores records of the access devices that are authorized to exchange communications with device nodes of the local network of interconnected devices. The low-power controller 322 may create a new record for an access device when the gateway 300 successfully bonds with that access device during a pairing and bonding procedure. In this way, the low-power controller 322 may engage in subsequent low-power communication sessions with that access device without repeating the pairing and bonding process. An access device record includes a set of information associated with an access device including information used to secure communications between the gateway 300 and the access device. An access device record may include, for example, a unique identifier for the access device (e.g., a MAC address) and one or more keys exchanged between the gateway 300 and the access device during a bonding procedure (e.g., LTK, EDIV, and Rand keys). The keys exchanged may include, e.g., a key to secure communications exchanged between the gateway 300 and the access device during a communication session as well as a key associated with the access device that is used to verify digital signatures received from the access device and sign content transmitted to the access device. An access device record may also include an invitation code generated for an invited access device that has been authorized to communicate with the gateway 300. The short-range controller 324 may also include an access device database similar to the access device database 344 of the low-power controller 322. In this way, the short-range controller 324 may likewise store records of access devices that have bonded with the gateway 300 which the short-range controller may utilize for subsequent short-range communication sessions with the access device.

The LAN controller 326 handles and processes the communications received at and transmitted from the gateway 300 via the wired LAN interface 316. Such communications may be received from and transmitted to the device management server via an IP-based WAN such as the Internet. Accordingly, the LAN controller 326, in this example, likewise includes memory 346 storing instructions corresponding to a protocol stack 348 that is configured to handle and process IP-based communications received at the gateway 300 from the device management server. Protocol stacks suitable for use as the protocol stack 348 of the LAN controller 326 include those designed for use in embedded systems (e.g., the open source "lightweight IP" protocol stack, the open source "micro IP" protocol stack, and the like). As seen in FIG. 3, the LAN controller 326 is in signal communication with both the short-range controller 324 and the low-power controller 322. Accordingly the LAN controller 326, in this example, is configured to port communications between the wired LAN interface and the short-range controller 324, between the wired LAN interface and the low-power controller, and between the short-range controller and the low-power controller. In addition, some implementations of the gateway device node may store the device node database and access device database in local memory rather than the memory of a low-power controller. The low-power controller, in these example implementations, may thus be in signal communication with the local memory of the gateway device node to access the device node database and access node database.

In some example implementations, the short-range controller 324 and/or the LAN controller 326 may also be SoCs and thus include their own respective processors, timing devices, control logic, and the like. In other example implementations, the gateway 300 itself may include, e.g., one or more processors, timing devices, and memory storing instructions corresponding to control logic (also omitted from FIG. 3 for the sake of clarity) which the short-range controller 324 and/or the LAN controller 326 may utilize for operation.

The power module 306 of the gateway 300 includes components for supplying power to the gateway 300 and configuring how power is supplied to the gateway. The power module 306, in this example, includes both an internal power source, a battery 350, and a power port 352 for connecting to an external power source (e.g., an AC or DC power source). The battery 350 may be a battery (e.g., an alkaline battery, a lithium-ion battery, a nickel-cadmium battery, lead-acid battery, and the like) and may be recharged when an external power source supplies power to the gateway 300 via the power port 352. The power module 306 also includes a power switch 354 for controlling whether the gateway 300 is powered by the battery 350 or an external power source via the power port 352. A user may thus toggle the switch to selectively control whether the internal or external power source provides power to the gateway 300.

The power module 306, in this example, also includes a power controller 356 connected to the battery 350 and the power port 352. The power controller 356 may, in turn, be connected to one or more of the radios (not shown) of the gateway 300 to control the power supplied to the radios and thus control the transmission power of the wireless communications transmitted from the gateway. The power controller 356 may thus control the wireless range of the gateway 300 by controlling the transmission power of its radios. Furthermore the power controller 356 may automatically adjust the power supplied to a radio based on whether the gateway 300 is currently powered by an internal power source (e.g., the battery 350) or an external power source. If currently powered externally, the power controller 356 may provide full power to a radio of the gateway in order to maximize the wireless range of the gateway (e.g., up to about 100 m). In some example implementations, full power to a radio of the gateway 300 may result in transmission power between about 18 decibels (dB) and about 23 dB. If currently powered internally, however, the power controller 356 may provide less than full power to a radio of the gateway in order to reduce or minimize power consumption at the gateway at the expense of a wireless range that is less than the maximized wireless range.

As seen in FIG. 3, the gateway 300, in this example, also includes a paring button 312 connected to the power controller 356. A user may press the pairing button 312 to temporarily reduce the transmission power of the gateway 300 such that its wireless range is minimized (e.g., up to about 1 m). As described in further detail below, the user may press the pairing button to reduce the wireless range of the gateway 300 as a security measure when pairing and bonding an access device with the gateway. In this way, the user may ensure that no other devices can receive the communications exchanged between the gateway and the access device during the pairing and bonding process. In some example implementations, the pairing button 312 may be configured such that the transmission power of the gateway 300 is reduced until the pairing button is again pressed by the user. In other example implementations, the pairing button 312 may be configured to initiate a temporary reduction of the transmission power of the gateway for a predetermined time period (e.g., about 1-2 minutes) such that, at the end of that time period, the transmission power of the gateway returns to the previous transmission power.

The ignition button 308 of the gateway 300, in this example, triggers an initialization procedure at the gateway 300. In some example implementations, the control logic 336 of the low-power controller 322 is configured to carry out the initialization procedure. The initialization procedure may include, for example, setting various operating parameters (e.g., selecting an operating frequency channel), confirming signal communication with the device management server via the wired LAN interface 316, confirming signal communication with a cellular network via the cellular network interface 320, clearing any existing records from the node database 342 and the access device database 344, and transmitting announcements indicating the gateway is present and available to accept requests to join the local network of interconnected devices. Forming the local network of interconnected devices is discussed in further detail below. The reset button 310 of the gateway 300, in this example, triggers re-initialization of the gateway 300. The LED 314 of the gateway 300, in this example, may indicate one or more statuses of the gateway 300, e.g., via the on/off status of the LED or via its blink pattern. One or more respective blink patterns of the LED may indicate, for example, that an error has occurred during the initialization procedure (e.g., the gateway could not connect to the device management server or the cellular network), that an access device has successfully paired and bonded with the gateway, that a device node has been added to or removed from the local network of interconnected devices, and the like.

Finally, the gateway 300, in this example, includes a physical security token 358 that is affixed to the gateway 300 and accessible to a user. As an example, the physical security token 358 may be affixed to a housing of the gateway 300. The physical security token 358 may be a barcode (e.g., a QR code) that encodes information associated with the gateway 300. The encoded information may include, e.g., the serial numbers of the gateway 300, the device class and device type, the default security level for the gateway, and the security token associated with the gateway. This information may also be encrypted, and the barcode may encode the encrypted information. The information may be encrypted using an encryption algorithm suitable for embedded systems such as, e.g., the tiny-AES128-C encryption algorithm. An access device may scan the barcode (e.g., using an optical input device such as a camera) to obtain the encoded information. The access device may also store a key (e.g., as part of the mobile application), and use the key to decrypt the encrypted information obtained from the barcode.

Referring now to FIG. 4, an example of an implementation of a multi-mode device node 400 is shown. Similar to the gateway device node 300, the multi-mode device node 400, in this example, includes a control module 402, a communication module 404, and a power module 406. The multi-mode device node 400, in this example, also includes an ignition button 408, a reset button 410, a pairing button 412, and an LED 414. The multi-mode device node 400 may also include a physical security token 416 affixed to the device node, e.g., to a housing of the device node.

The ignition button 408, the reset button 410, and the pairing button 412 may be the same as or at least similar to the ignition button 308, the reset button 310, and the pairing button 321 respectively discussed above with reference to FIG. 3. In some example implementations, the multi-mode device node 400 may be configured to enter into a sleep mode if it is unable to connect to a local network of interconnected devices after a user presses the ignition button 408. Engaging the reset button 410 may cause the multi-mode device node to awake from the sleep mode and reattempt the process of locating a network to connect to. The physical security token 416 may also be the same as or at least similar to the physical security token 358 discussed above with reference to FIG. 3 and encode the same type of information associated with the multi-mode device node 400.

The communication module 404 of the multi-mode device node 400, in this example, likewise includes multiple communication interfaces. In particular, the communication module 404, in this example, includes a wireless LAN interface 418 and a cellular network interface 420. The multi-mode device node 400 may thus exchange wireless communications with a access devices, a gateway device node, and other device nodes of the local network of interconnected devices via one or more of the wireless LAN interface 418 and the cellular network interface 420. The wireless LAN interface 418 may be the same as or at least similar to the wireless LAN interface 318 discussed above with reference to FIG. 3, and the cellular network interface 420 may be the same as or at least similar to the cellular network interface 320 also discussed above with reference to FIG. 3. In addition, although again not shown in FIG. 4 for the sake of clarity, the communication module 404 of the multi-mode device node 400 may also likewise include one or more radios with corresponding transmitters, receivers, and/or transceivers having one or more antennas to receive and/or transmit those wireless communications. The radios of the multi-mode device node 400 may likewise be the same as or at least similar to the radios of the gateway device node 300 discussed above with reference to FIG. 3.

The control module 402 of the multi-mode device node 400, in this example, includes a single controller 422 for handling and responding to the wireless communications received at and transmitted from the multi-mode device node. The controller 422, in this example, is also a dual-standard low-power controller ("low-power controller") configured to selectively utilize multiple low-power wireless communication standards to wirelessly communicate with access devices, a gateway device node, the device management server, and other device nodes of the local network of interconnected devices. In some example implementations, the low-power controller 422 may be configured to utilize both the BLE and ANT low-power wireless communication standards. As seen in FIG. 4, the low-power controller 422 is in signal communication with both the wireless LAN interface 418 and the cellular network interface 420. The low-power controller 422 may also be in signal communication with one or more of the radios of the multi-mode device node 400. In this way, the multi-mode device node 400 may likewise route communications received via any of these interfaces to access devices, the gateway device node, the device management server, and other device nodes of the network.

The low-power controller 422 may be the same as or at least similar to the low-power controller 322 discussed above with reference to FIG. 3, e.g., an SoC. In this regard, the low-power controller 422 likewise includes a processor 424 and memory 426 storing instructions that are executed by the processor for controlling operational aspects associated with the multi-mode device node 400. The instructions stored at the memory 426 of the low-power controller 422, in this example, include instructions corresponding to a protocol stack 428 that is configured to handle and process multiple types of low-power wireless communications received at and transmitted from the multi-mode device node 400 (e.g., BLE communications and ANT communications) from access devices, a gateway device node, the device management server, or other device nodes of the local network of interconnected devices. The protocol stack 428 of the low-power controller 422 may thus be the same as or at least similar to the protocol stack 332 of the low-power controller 322 discussed above with reference to FIG. 3.

In some example implementations, a device node may also include a signal processor situated between the low-power controller and the radio. The signal processor may intercept the output sent from the low-power controller to the radio and likewise intercept input received at the radio to be sent to the low-power controller. Processing the input and output may include filtering and/or amplifying the signals. As an example, it may be desirable to amplify the signals output from the low-power controller to increase the wireless transmission range of the device node. The extent to which those signals may be amplified might be limited, however, due to distortion that occurs when the signals are amplified beyond a certain power level, e.g., −5 dBm. In order to further amplify the signals and avoid distortion, the signal processor may intercept the signals output by the low-power controller and filter and amplify those signals before passing the signals to the radio for transmission. Suitable signal processors include the 2.4 GHz ZigBee®/802.15.4 Front-End Module having model number SE2431L available from Skyworks Solutions, Inc. of Woburn, Mass.

The memory 426 of the low-power controller 422, in this example, also stores instructions corresponding to control logic 430, routing logic 432, and security logic 434 also for controlling operational aspects of the multi-mode device node 400. The routing logic 432 and the security logic 434 may be the same as or at least similar to the routing logic 338 and security logic 340 discussed above with reference to the gateway 300 in FIG. 3. The routing logic 432 may thus also route communications to an access device, a gateway device node, a device management server, or other device nodes of the local network of interconnected devices.

Depending on the device node type of a multi-mode device node, however, the security logic 434 may include instructions corresponding to a subset of the security modes available at a gateway device node. As an example, the security logic of multi-mode device nodes that are configured to secure buildings, structures, and containers (e.g., lock-type device nodes), may include instructions corresponding to security modes that are relatively more secure than other security modes. The security logic of multi-mode device nodes that are not at risk for unauthorized access may include instructions corresponding to both relatively less secure and relatively more secure security modes. Where the multi-mode device node is a sensor-type device node, for example, the risk or costs of unauthorized access may be relatively small. Accordingly, the security logic of one or more sensor-type multi-mode device nodes may include instructions corresponding to one or more relatively less secure security modes. In addition, as noted above, the security logic 434 of the multi-mode device node 400 may be configured to employ a default security mode or a user-selected security mode.

The control logic 430 of the low-power controller 422 may depend on the device node type of the multi-mode device node 400. For activation-type multi-mode device nodes, the control logic 430 may include instructions for receiving and processing commands from a gateway device node, the device management server, or other device nodes of the local network of interconnected devices. For activation-type multi-mode device nodes, commands may include commands to activate a motor, an actuator, solenoid, optical output device or unit, audio output device or unit, and the like. For lock-type multi-mode device nodes, in particular, commands may include commands to toggle a lock status, i.e., commands to lock or unlock. For sensor-type multi-mode device nodes, commands may include commands to, e.g., activate or deactivate one or more sensors, adjust one or more sensor parameters (e.g., sensitivity), take a new measurement, and provide a most recent measurement, the previous x number of measurements, or a measurement obtained at a specified date and/or time or within a specified date range or time period.

The control logic 430 of the low-power controller 422 may also include instructions that are not dependent on the device node type. In particular, the control logic 430 for each type of multi-mode device node may include instructions for initializing the multi-mode device node upon startup, searching for and connecting to a local network of interconnected devices to join (e.g., a gateway device node or another device node), responding to polling commands (e.g., transmitted by a gateway device node), adding a new device node to the network, registering that new device node with a gateway device node, removing a device node from the network, establishing a master/slave relationship with another device node, and exchanging communications with an access device. The control logic 430 of the low-power controller 422 may also include instructions for toggling between a sleep mode and an awake mode during which the multi-mode device node 400 transmits announcements at periodic intervals (e.g., every 10-50 ms) for a predetermined time period (e.g., for 30-60 seconds). If the multi-mode device node 400 receives a pairing request while awake—e.g., from an access device or another device node—then the multi-mode device node may pair and communicate with that access device or device node. The control logic 430 may also include instructions that terminate the connection if a communication (e.g., a command request) is not received for a predetermined time period (e.g., 60 seconds). Furthermore the control logic 430 may include instructions to reenter a sleep mode upon termination of a connection and upon failing to receive a pairing request while awake during the predetermined time period.

As also seen in FIG. 4, memory 426 of the low-power controller 422 also stores a device node database 436 and an access device database 438. The access device database 438 may be the same as or at least similar to the access device database 344 discussed above with reference to FIG. 3. In this regard, the access device database 438, in this example, may store records corresponding to the access devices that have paired and bonded with the multi-mode device node 400 and are thus authorized to access the multi-mode device node. As noted above, an access node record may also include one or more keys associated with the access device and used by the low-power controller 422 to encrypt and decrypt content and communications transmitted to and received from the access device corresponding to that access device record. An access node record may also store an invitation code for an invited access device that has been authorized to communicate with the multi-mode device node 400.

The device node database 436, in this example, stores records of the next-level device nodes that are connected to the multi-mode device node 400 in the local network of interconnected devices. For a zero-level device node, the device node database 436 may thus store records corresponding to its child device nodes, i.e., the first-level device nodes in signal communication with that zero-level device node as well as the corresponding child device nodes of each of its child device nodes, i.e., the second-level device nodes in signal communication with those first-level device nodes. For a first-level device node, the device node database 436 may likewise store records corresponding to its child device nodes, i.e., the second-level device nodes in signal communication with that first-level device node. Accordingly, a device node record may include: the serial number of the child node and the network address assigned to the child node, the serial number of the parent node and the network address assigned to the parent node, the layer number of the parent node, and a registration status of the child node. The registration status of the child node may indicate whether the child node has been registered with an upper level device node. As an example, the device node record stored at a first-level device node for a second-level device node may indicate whether that second-level device node has been registered with a zero-level device node and/or a gateway device node.

The power module 406 of the multi-mode device node 400, in this example, includes a power port 440 for receiving power from an external power source and a power controller 442 for controlling the power supplied to one or more of the radios (not shown) of the multi-mode device node. As seen in FIG. 4, the power controller 442 is connected to the pairing button 412. Accordingly, like the pairing button 312 discussed above with reference to FIG. 3, the pairing button 412, when pressed by a user, may cause the power controller 442 to reduce the transmission power of the multi-mode device node 400 thus reducing its wireless range.

It will be appreciated that some implementations of multi-mode device nodes may also include an internal power source such as a battery in addition to a power port for receiving power from an external power source. Multi-mode device nodes having both an internal and an external power source may also include a power switch for toggling whether the multi-mode device node is powered internally or externally as described above with reference to FIG. 3. In addition, a multi-mode device node may also include a wired LAN interface and corresponding wired LAN controller similar to those of the gateway device node 300 discussed above. In addition, other implementations of a multi-mode device node may store its node database and access device database in local memory rather than the memory of the low-power controller.

With reference now to FIG. 5, an example of an implementation of a dual-mode device node 500 is shown. Similar to the gateway device node 300 and the multi-mode device node 400, the dual-mode device node 500, in this example, includes a control module 502, a communication module 504, and a power module 506. The dual-mode device node 500, in this example, also includes an ignition button 508, a reset button 510, a pairing button 512, and an LED 514. The dual-mode device node 500 may also include a physical security token 516 affixed to the device node, e.g., to a housing of the device node.

The ignition button 508, the reset button 510, and the pairing button 512 may be the same as or at least similar to, respectively, the ignition button 308, the reset button 310, and the pairing button 321 discussed above with reference to FIG. 3. In some example implementations, the dual-mode device node 500 may be configured to enter into a sleep mode if it is unable to connect to a local network of interconnected devices after a user presses the ignition button 508. Engaging the reset button 510 may cause the dual-mode device node to awake from the sleep mode and reattempt the process of locating a network to connect to. The physical security token 516 may also be the same as or at least similar to the physical security token 358 discussed above with reference to FIG. 3 and encode the same type of information associated with the dual-mode device node 500.

The communication module 504 of the dual-mode device node 500, in this example, includes one communication interface. In particular, the communication module 504, in this example, includes a radio having a transceiver 520 and corresponding antenna 522. The radio 518 may be configured to operate at one or more frequencies within the ISM radio band. Accordingly the radio 518 may be, e.g., a 2.4 GHz and/or 5 GHz radio. Other types of radios and frequency bands suitable for wireless communications may be selectively employed. The radios discussed above with reference to the gateway device node 300 and the multi-mode device node 400 may be the same as or at least similar to the radio 518 of the dual-mode device node 500.

The control module 502 of the dual-mode device node 500, in this example, also includes a single controller 524 for handling and responding to the wireless communications received at and transmitted from the dual-mode device node. The controller 524, in this example, is also a dual-standard low-power controller ("low-power controller") configured to selectively utilize multiple low-power wireless communication standards to wirelessly communicate with access devices, a gateway device node, and other device nodes of the local network of interconnected devices. In some example implementations, the low-power controller 524 is configured to utilize both the BLE and ANT low-power wireless communication standards. As seen in FIG. 5, the low-power controller 524 is in signal communication with the radio 518.

The low-power controller 524 may be the same as or at least similar to the low-power controller 322 discussed above with reference to FIG. 3, e.g., an SoC. In this regard, the low-power controller 524 likewise includes a processor 526 and memory 528 storing instructions that are executed by the processor for controlling operational aspects associated with the dual-mode device node 500. The instructions stored at the memory 528 of the low-power controller 524, in this example, include instructions corresponding to a protocol stack 530 that is configured to handle and process multiple types of low-power wireless communications received at and transmitted from the dual-mode device node 500 (e.g., BLE communications and ANT communications) from access devices, a gateway device node, or other device nodes of the local network of interconnected devices. The protocol stack 530 of the low-power controller 524 may thus be the same as or at least similar to the protocol stack 332 of the low-power controller 322 discussed above with reference to FIG. 3.

The memory 528 of the low-power controller 524, in this example, also stores instructions corresponding to control logic 532, routing logic 534, and security logic 536 for controlling operational aspects of the dual-mode device node 500. The routing logic 534 and the security logic 536 may be the same as or at least similar to the routing logic 338 and security logic 340 discussed above with reference to the gateway 300 in FIG. 3. The routing logic 534 may thus also route communications to an access device, a gateway device node, or other device nodes of the local network of interconnected devices.

Like the security logic 434 of the multi-mode device node 400, the security logic 536 may similarly depend on the device node type of a dual-mode device node. The security modes included in the security logic 536 of the low-power controller 524 may thus depend on the risk associated with unauthorized access to the dual-mode device node (e.g., sensor-type device nodes versus lock-type device nodes). Accordingly where relatively less risk is associated with the dual-mode device node 500, the security logic 536 may include instructions corresponding to relatively less secure security modes. Likewise where relatively more risk is associated with the dual-mode device node 500, the security logic 536 may include instructions only corresponding to relatively more secure security modes. The security logic 536 of the low-power controller 524 may also be configured to employ a default security mode or a user-selected security mode.

The control logic 532 of the low-power controller 524 may likewise depend on the device node type of the dual-mode device node 500. Accordingly, the control logic 532 of the low-power controller 524 may be similar to the control logic 430 discussed above, e.g., with respect to activation-type dual-mode device nodes and sensor-type dual-mode device nodes. The control logic 532 of the low-power controller 524 may likewise include instructions that are not dependent on the device node type. In particular, the control logic 532 for each type of dual-mode device node may include instructions for initializing the dual-mode device node upon startup, searching for and connecting to a local network of interconnected devices to join (e.g., a gateway device node or another device node), responding to polling commands (e.g., transmitted by a gateway device node), adding a new device node to the network, registering that new device node with a gateway device node, removing a device node from the network, establishing a master/slave relationship with another device node, and exchanging communications with an access device. The control logic 532 of the low-power controller 524 may thus also include instructions for toggling between a sleep mode and an awake mode during which the dual-mode device node 500 transmits announcements at periodic intervals for a predetermined time period. The control logic 532 may thus likewise include instructions to terminate a connection and reenter a sleep mode if a communication is not received within a predetermined time period or reenter a sleep mode if a pairing request is not received in response to an announcement transmitted within a predetermined time period.

The memory 528 of the low-power controller 524 likewise stores a device node database 538 and an access device database 540. The access device database 540 may be the same as or at least similar to the access device databases 344 and 438 discussed above with reference to FIGS. 3-4. In this regard, the access device database 540, in this example, may store records corresponding to the access devices that have paired and bonded with the dual-mode device node 500 and are thus authorized to access the dual-mode device node. As noted above, an access node record may also include one or more keys (e.g., a public key) associated with the access device and used by the low-power controller 524 to encrypt and decrypt content and communications transmitted to and received from the access device corresponding to that access device record as well as an invitation code generated for an invited access device that has been authorized to communicate with the dual-mode device node. The device node database 538 likewise stores records of the next-level device nodes that are connected to the dual-mode device node 500 in the local network of interconnected devices. Accordingly the device node database 538 and its corresponding device node records may be the same as or at least similar to the device node database 436 discussed above with reference to FIG. 4.

The power module 506 of the dual-mode device node 500, in this example, includes an internal power source, in particular, a battery 542 and a power controller 544 for controlling the power supplied to the radio 518. As seen in FIG. 5, the power controller 544 is connected to the pairing button 512. Accordingly, like the pairing button 312 discussed above with reference to FIG. 3, the pairing button 512, when pressed by a user, may cause the power controller 544 to reduce the transmission power of the dual-mode device node 500 thus reducing its wireless range.

It will be appreciated that some implementations of dual-mode device nodes may also include a power port for receiving power from an external power source in addition to a battery. Dual-mode device nodes having both an internal and an external power source may also include a power switch for toggling whether the dual-mode device node is powered internally or externally as described above with reference to FIG. 3. It will also be appreciated that in some implementations of gateway device nodes, multi-mode device nodes, and dual-mode device nodes one or more of the ignition button, the reset button, the pairing button, and the LED may be optional. In addition, other implementations of a dual-mode device node may store the device node database and access device database in local memory rather than in the memory of the low-power controller.

Figure 6A:
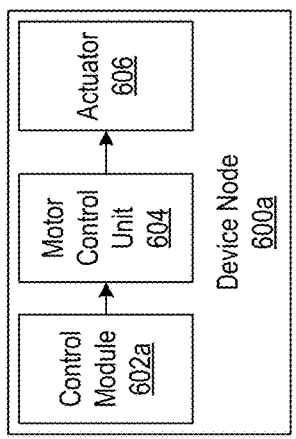
FIG. 6A depicts an example of an implementation of a first type of device node in accordance with aspects described herein.
Figure 6B:
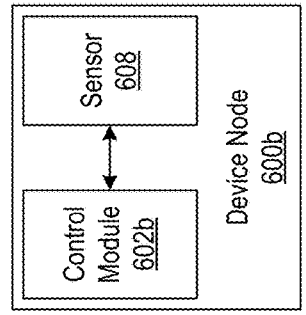
FIG. 6B depicts an example of an implementation of a second type of device node in accordance with aspects described herein.

Referring now to FIGS. 6A-B, respective examples of implementations of two types of device nodes 600a and 600b are shown. In FIG. 6A, an activation-type device node 600a is shown, and in FIG. 6B, a sensor-type device node 600b is shown. Like the device nodes discussed above, the activation-type device node 600a and the sensor-type device node 600b each include, respectively, a control module 602a and 602b. The control modules 602a and 602b may be the same as or similar to the control modules discussed above with respect to the gateway device node, the multi-mode device node, and the dual-mode device node. The control module 602a, in this example, is in signal communication with a motor control unit 604 (MCU) which is in turn in connected to an actuator 606. The control module 602a may issue commands to the MCU 604 which in turn triggers activation of the actuator 606 based on those commands. As noted above, activating the actuator 606 may include locking or unlocking a lock, automatically opening or closing a door (e.g., a garage door), and the like. Instead of an MCU 604 and actuator 606, other activation-type device nodes may include optical output devices (e.g., display screens, lights, etc.), audio output devices (e.g., speakers), solenoids, and the like that are connected to the control module 602a. The control module 602b, in this example, is in signal communication with a sensor 608. The control module 602a may thus issue commands to the sensor 608 as discussed above and/or receive data from the sensor (e.g., one or more sensor readings). Various types of sensors that may be employed will be appreciated with the benefit of this disclosure.

Figure 6C:
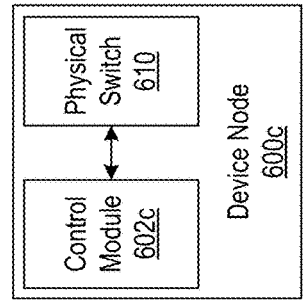
FIG. 6C depicts an example of an implementation of a device node in accordance with aspects described herein.

With reference to FIG. 6C, another example of an implementation of a device node 600c is shown. The device node 600c may correspond to any of the various types of device nodes described above. Like the device nodes 600a-b, the device node 600c includes a control module 602c. The device node 600c, in this example, also includes a physical switch 610 in signal communication with the control module 602c and accessible to a user. A user may engage the physical switch 610 to toggle the active/inactive status of the device node 600c and/or toggle the awake/asleep status of the device node. Accordingly, in some example implementations, the physical switch 610 may be the same as or at least similar to the ignition buttons or reset buttons discussed above. In an inactive state, the device node 600c may be completely powered down. In an active state, the device node may be powered up and either in an asleep state or an awake state. In the asleep state, the device node 600c may only listen for communications transmitted by other device nodes of the local network of interconnected devices. In response to receipt of a communication while in the asleep state, the device node 600c may enter the awake state and take some action, e.g., transmit a response to the communication received. In the awake state, the device node 600c may both listen for communications transmitted by other device nodes as well as transmit communications to other device nodes. The device node 600c may also perform other types of actions when in the awake state, e.g., trigger an actuator or obtain data measured by a sensor. If the device node 600c is in the inactive state, engaging the switch 610 activates the device node. A device node may be configured to enter either the asleep state or the awake state when activated, and the state the device node enters when activated may depend on the type of device. A keyfob, for example, may be configured to immediately enter the asleep state (i.e., power up and listen) when its physical switch is engaged. A door lock, however, may be configured to immediately enter the awake state when its physical switch is engaged and attempt to join the local network of interconnected devices (i.e., power up and transmit). In a similar fashion, a device node may be configured to either listen or immediately transmit when entering the awake state from the asleep state, i.e., wake up and listen versus wake up and transmit. Additional examples will be appreciated with the benefit of this disclosure.

As noted above, the control logic of the respective controllers at the gateway device nodes, multi-mode device nodes, and the dual-mode device nodes include instructions for forming a local network of interconnected devices, securing and routing communications along pathways through and to device nodes of the network, and responding to commands received in those communications. These functional aspects are discussed in further detail below.

Emergency Lockdown

As noted above, a local network of interconnected devices may be employed in access control scenarios to provide physical security for buildings and other structures. To illustrate the principles associated with the techniques described herein, the following disclosures are provided in the context of an emergency lockdown situation in which an administrator seeks to issue a "lockdown all" command to multiple lock-type device nodes of a local network of interconnected devices. It should be appreciated, however, that the principles associated with these techniques may be employed in other scenarios, for other purposes, and with other types of device nodes.

Figure 7B:
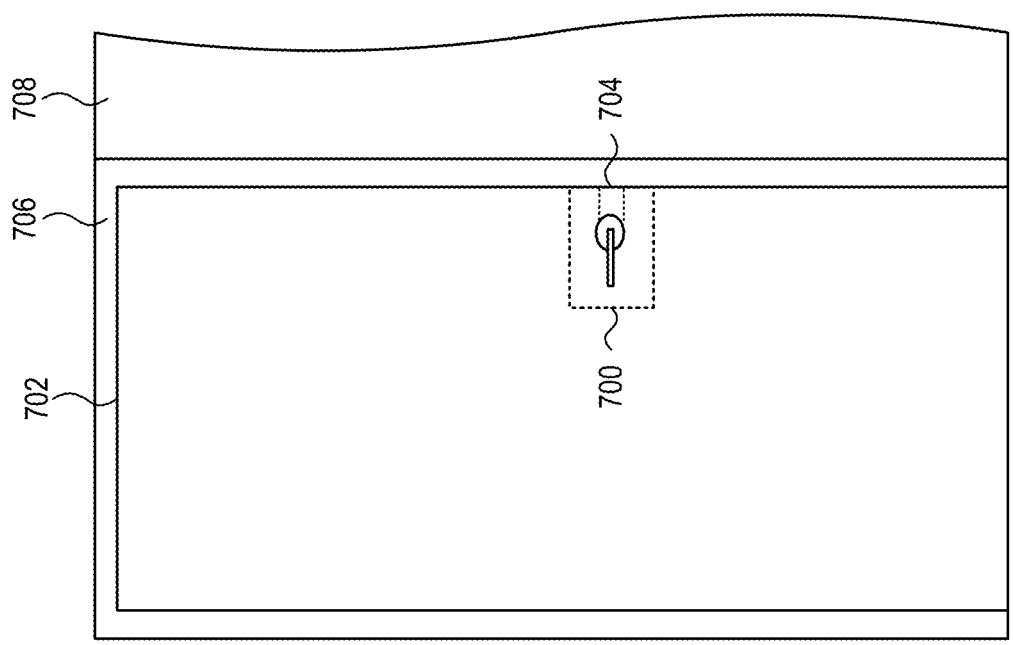
FIG. 7B depicts the example door lock-type device node of FIG. 7A in an unlocked state.
Figure 7A:
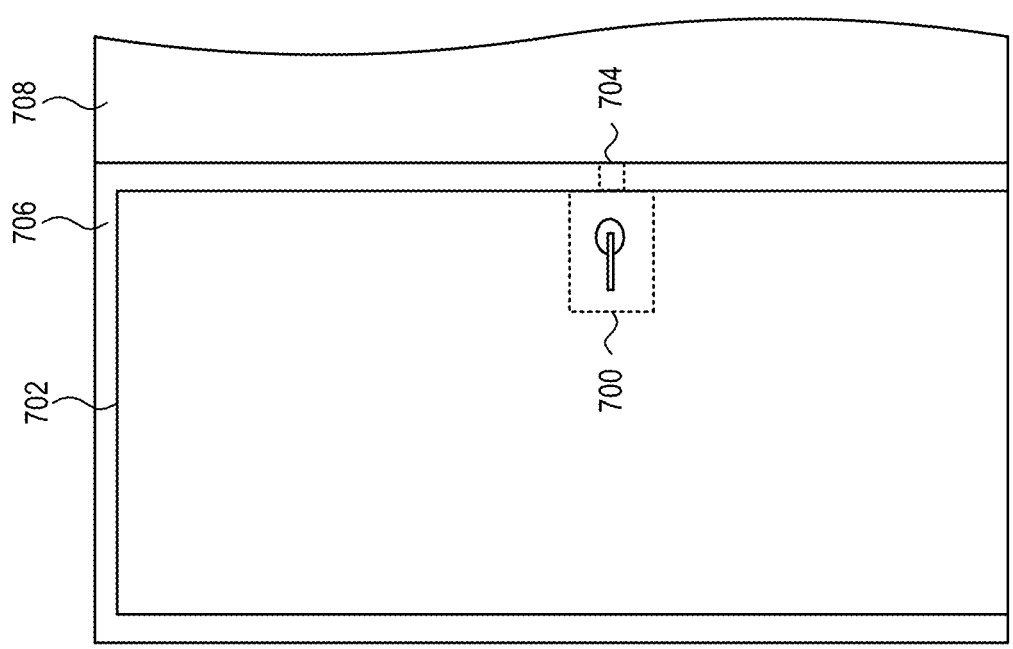
FIG. 7A depicts an example of a door lock-type device node installed at a door and in a locked state.

Referring now to FIGS. 7A-B, a block diagram of an example lock-type device node 700 is shown installed at a door 702 and in a locked state and an unlocked state, respectively. The lock-type device node 700 may be similar to the device node depicted in FIG. 6A and likewise includes a control module and actuator used to toggle between a lock and an unlocked state. The lock-type device node 700, in this example, utilizes a bolt 704 (e.g., a deadbolt) as its locking mechanism. As seen in FIG. 7A, the lock-type device node 700 is in a locked state with the bolt 704 engaging the door jamb 706 of the surrounding structure 708. FIG. 7B depicts the lock-type device node in its unlocked state. The lock-type device node 700 may be added to a local network of interconnected devices and receive lock/unlock commands from an access device, e.g., directly when the access device is within wireless range of the lock-type device node and/or via the backend device management server and gateway device node when the access device is beyond wireless range of the lock-type device node. In response to receipt of the lock/unlock commands, the lock-type device node 700 toggles between its locked and unlocked states. By adding the lock-type device node 700 to a local network of interconnected devices such as those described herein, a user (e.g., an administrator) may issue lock/unlock commands from remote locations (e.g., a back office) relative to the installation site of the lock-type device node.

The lock-type device node 700 and door 702 are discussed by way of example only. Other types of locking mechanisms may be selectively employed with other types of doors. Alternative types of locking mechanisms that may be employed include both mechanical and electronic locking mechanisms such as latches, crossbars, "maglocks" that utilize a magnet and an armature plate, electric strikes, and the like. In addition, the techniques described herein may be employed with single doors, double doors, opposing doors, revolving doors, sliding doors, rolling doors, overhead doors, trapdoors, garage doors, folding doors, gates, turnstiles, doors that provide ingress and egress to a room, doors that provide ingress and egress to a building or other structure, doors that control movement through a passageway (e.g., a hallway, tunnel, and the like), doors installed at conveyances (e.g., cars, trucks, vans, trains, and other landcraft, airplanes and other aircraft, boats and other watercraft, spacecraft, and the like), other types of doors, windows, and the like.

Furthermore, the lock-type device node may, in one sense, be considered a type of computing device insofar as it includes circuitry and hardware—e.g., a computer processor and memory storing executable instructions executed by the computer processor—which provides the functionality described herein. In this regard, the lock-type device node may be referred to as, for example, an electronic lock, a computerized lock, and/or a computing device having locking capabilities. In implementations where the electronic lock is configured to lock and unlock a door, it may also be referred to as an electronic door lock.

Figure 8B:
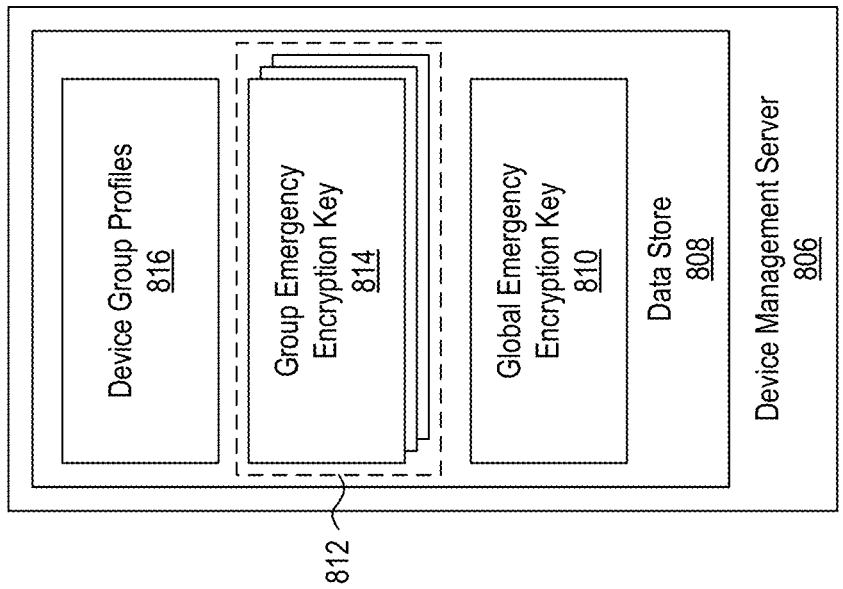
FIG. 8B depicts a second example of an implementation of a device management server in accordance with aspects described herein.
Figure 8A:
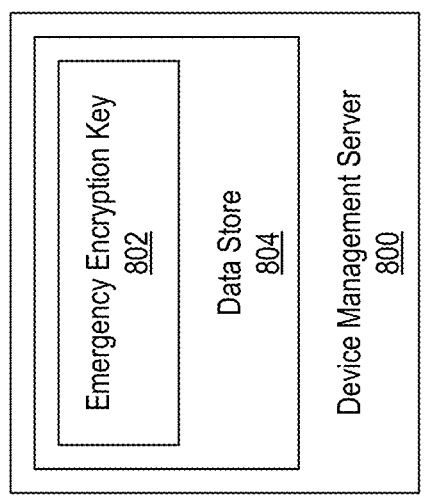
FIG. 8A depicts a first example of an implementation of a device management server in accordance with aspects described herein.

Turning now to FIG. 8A, a block diagram of an example of an implementation of a device management server 800 is shown. The device management server 800 may be the same as or at least similar to the device management server 110 discussed above with reference to FIG. 1. The device management server 800, in this example, stores an emergency encryption key 802 in its data store 804. The device management server 800 may utilize the emergency encryption key 802 to encrypt messages intended to be delivered to and consumed by multiple device nodes of a local network of interconnected devices during emergency situations. The encryption key 802 is referred to as an "emergency" encryption key simply to help illustrate various principles associated with the techniques described herein. It should be appreciated that the device management server 800 may store a general encryption key to encrypt messages to be delivered to and consumed by multiple device nodes of a local network of interconnected devices in other circumstances, situations, and scenarios.

The emergency encryption key 802 may be implemented using various techniques. In some example implementations, the emergency encryption key 802 may be a symmetric encryption key and thus used to both encrypt and decrypt the messages intended to be consumed by the device nodes of the local network of interconnected devices. In other example implementations, the emergency encryption key 802 may be a public-private key pair in which the device management server uses the private encryption key to encrypt messages intended to be consumed by the device nodes and the device nodes use the corresponding public encryption key to decrypt encrypted messages upon receipt. In implementations where a symmetric encryption key is employed as the emergency encryption key 802, the device management server may deliver the emergency encryption key to the device nodes such that the same emergency encryption key is stored at the device management server and the device nodes of the local network of interconnected devices. In implementations where a public-private key pair is employed as the emergency encryption key 802, the device management server may only deliver the public encryption key to the device nodes. Accordingly, where the disclosures herein describe encrypting a message using an emergency encryption key, it will be appreciated that the private key of the emergency encryption key is used to encrypt the message in implementations that use a public-private key pair for the emergency encryption key. Likewise, where the disclosures herein describe delivering an emergency encryption key to a device node and decrypting an encrypted message using the emergency encryption key, it will be appreciated that the public key of the emergency encryption key is delivered to the device node and used to decrypt an encrypted message in implementations that use a public-private key pair for the emergency encryption key. Using a public-private key pair for the emergency encryption key may be more secure than using a symmetric key. The emergency encryption key may be, in some example implementations, a 128-bit encryption key, although it should be appreciated that larger or smaller encryption keys may be selectively employed in other implementations (e.g., 64-bit encryption keys or 256-bit encryption keys).

As described in further detail below, the device management server 800 may deliver the emergency encryption key 802 to any new device node added to the local network of interconnected devices. In implementations that employ a public-private key pair for the emergency encryption key 802, the device management server 800 may store the private encryption key in a secure location at its data store 804. The emergency encryption key 802 may thus be used to send secure messages to multiple device nodes of a local network of interconnected devices. The device management server 800 may generate a message intended to be consumed by multiple device nodes, encrypt the message using the emergency encryption key 802, and transmit the encrypted message for delivery to the multiple device nodes. In turn, the multiple device nodes may use the previously received emergency encryption key 802 to decrypt the message and consume its contents. To provide a specific example, in response to an emergency, an administrator may issue a "lockdown all" command from an access device to toggle all lock-type device nodes to their locked state. The access device may transmit the "lockdown all" command to the device management server 800. The device management server may generate a message with a "lock" instruction and encrypt the message using the emergency encryption key 802. The device management server may then transmit the encrypted message to each gateway device node of the local network of interconnected device which, in turn, broadcasts the encrypted message to its child nodes. The encrypted message may be routed to the child nodes using mesh networking technologies as described above. Upon receipt of the encrypted message, the lock-type device nodes may utilize the emergency encryption key 802 to decrypt the message, read the "lock" instruction, and toggle to its locked state if needed. In implementations the employ a public-private key pair for the emergency encryption key 802, the ability to successfully decrypt the message using the public encryption key of the emergency encryption key also serves as a means of authenticating the message, i.e., confirming that the message originated at the device management server 800 and was encrypted using the private key of the emergency encryption key.

In FIG. 8B, a block diagram of another example of an implementation of a device management server 806 is shown. The device management server 806 likewise may be the same as or at least similar to the device management server 110 discussed above with reference to FIG. 1. The device management server 806, in this example, stores multiple emergency encryption keys in its data store 808. The emergency encryption keys include a global emergency encryption key 810 as well as a set 812 of group emergency encryption keys 814. The device management server 806 may utilize the global emergency encryption key 810 to encrypt messages intended to be consumed by all device nodes (or a subset of device nodes, e.g., all lock-type device nodes) of a local network of interconnected devices. In contrast, the device management server 806 may utilize each group emergency encryption key 814 to encrypt messages intended to be consumed by a logical grouping of device nodes of a local network of interconnected devices. As discussed in further detail below, examples of logical groupings of lock-type device nodes include a group of lock-type device nodes installed at room doors and another group of lock-type device nodes installed at hallway doors.

The device management server 806, in this example, also includes device group profiles 816 in its data store 808. A device group profile 816 may define a logical grouping of device nodes and indicate which devices nodes of the local network belong to that group. In some example implementations, a grouping of device nodes may include up to 16 total device nodes, although it should be appreciated that groupings of device nodes may be larger or smaller in other implementations. A user (e.g., an administrator) may define and manage device groups. Accordingly, in one example implementation, a device group profile may include a user-defined name (e.g., "Room Door") and include the unique device identifiers of the device nodes the user has selected to be included in the group. The device group profiles 816 may thus be related to or otherwise associated with the device profiles (118 in FIG. 1) by way of the unique device identifiers stored in each profile. A device group profile 816 may also indicate which group emergency encryption key 814 is associated with a particular device group thus enabling the device management server to select the appropriate group emergency encryption key to encrypt a message intended to be consumed by the device nodes of the corresponding device group. In some example implementations, the device group profiles 816 themselves may include the respective group emergency encryption keys 814, while in other implementations the device group profiles and the group emergency encryption keys may be stored separate from one another.

Like the emergency encryption key 802 of FIG. 8A, the global emergency encryption key 810 and the group emergency encryption keys 814 may likewise be implemented as symmetric keys or public-private key pairs. The global emergency encryption key 810 may be delivered to all device nodes of a local network of interconnected devices, and the group emergency encryption key 814 may be delivered to each device node belonging to the corresponding grouping of device nodes. The device management server 806 may dynamically create a group emergency encryption key 814 when a user (e.g., an administrator) creates a new grouping of device nodes. The user may define new groups of device nodes and manage existing groups via a dashboard accessible via a mobile platform (e.g., a mobile application) or a web platform (e.g., a web page). The device management server 806 may deliver the public encryption key of the group emergency encryption key 814 to a device node when the device node is added to the group. If a device node is removed from the group, then the device management server 806 may transmit an instruction to that device node to delete its group emergency encryption key. Alternatively, the device management server 806 may generate a new group emergency encryption key 814 for the group and deliver the new public encryption key of the new group emergency encryption key to each device node remaining in the group.

A device node may also belong to multiple groups and thus store multiple group emergency encryption keys. To illustrate by way of example, one lock-type device node may be installed at an interior door that provides access between a hallway and a room of a building while another lock-type device node may be installed at an exterior door that provides access between the room and the exterior of the building. In this example, both lock-type devices may belong to the "Room Door" group of lock-type device nodes since both provide access to the room. In addition, the first lock-type device node may also belong to the "Interior Door" group since it provides access to only the interior of the building, and the second lock-type device node may also belong to the "Exterior Door" group since it provides access to the exterior of the building. The device management server 806, in this example, may thus store at least three group emergency encryption keys, one each for the "Room Door" group, the "Interior Door" group, and the "Exterior Door" group.

Figure 9B:
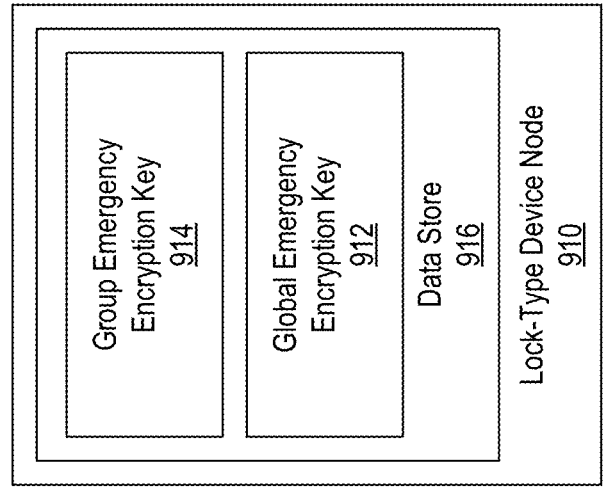
FIG. 9B depicts a second example of an implementation of a lock-type device node in accordance with aspects described herein.
Figure 9A:
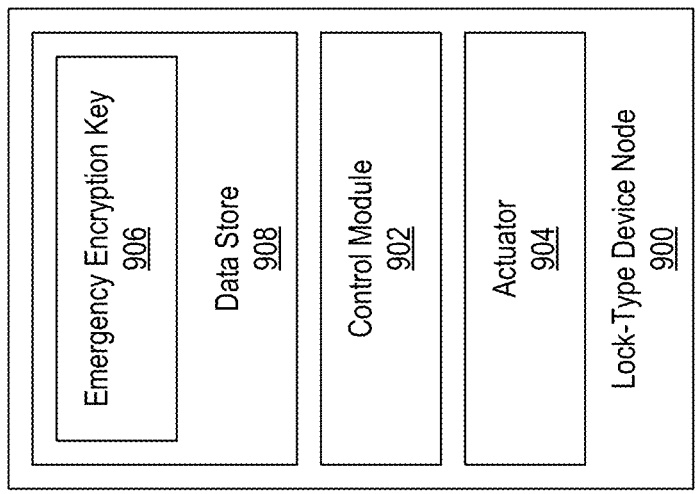
FIG. 9A depicts a first example of an implementation of a lock-type device node in accordance with aspects described herein.

Referring now to FIG. 9A, a block diagram of an example of an implementation of a lock-type device node 900 is shown. The lock-type device node 900 may be the same as or at least similar to the lock-type device node 600a depicted in FIG. 6A and thus likewise include a control module 902 and actuator 904. The lock-type device node 900, in this example, also stores an emergency encryption key 906 in its data store 908. The emergency encryption key 906, in this example, may be a global emergency encryption key or a group emergency encryption key delivered to it by a device management server. As described above, the emergency encryption key 906 stored at the lock-type device node may be a symmetric encryption key or the public encryption key of a public-private key pair. The emergency encryption key 906 may be delivered to the lock-type device node (e.g., by a device management server) when the lock-type device nodes is added to a local network of interconnected devices. The control module 902 may receive the encrypted messages transmitted to the lock-type device node 900 and attempt to decrypt them using the emergency encryption key 906. The control module 902 may also control operation of the actuator 904 to toggle the lock-type device node 900 between a locked state and an unlocked state, e.g., by moving a bolt, latch, or crossbar between an engaged or disengaged position or by energizing or de-energizing a magnet.

In FIG. 9B, a block diagram of another example of an implementation of a lock-type device node 910 is shown. The lock-type device node 910 likewise may be the same as or at least similar to the lock-type device node 600a depicted in FIG. 6A and/or the lock-type device node 900 depicted in FIG. 9A and thus include a control module and actuator (not shown). The lock-type device node 910, in this example, stores both a global emergency encryption key 912 and a group emergency encryption key 914 in its data store 916. As described above, each of the global emergency encryption key 912 and group emergency encryption key 914 may be a symmetric encryption key or the public encryption key of a public-key pair. As also described above, the lock-type device node 910, in this example, may include multiple group emergency encryption keys if the lock-type device node belongs to multiple groups. The global emergency encryption key 912 may be delivered to the lock-type device node 910 when it is added to the local network of interconnected devices, and the group emergency encryption key 914 may be delivered to the lock-type device node when it is added to a group. The lock-type device node 910 may thus utilize the global emergency encryption key 912 to decrypt messages intended to be consumed by all device nodes of a local network of interconnected devices (or a subset of the device nodes such as all lock-type devices) and utilize the group emergency encryption key 914 to decrypt messages intended to be consumed by only those device nodes belonging to the corresponding group. Decrypting messages using the emergency encryption keys will be discussed in further detail below.

Figure 10:
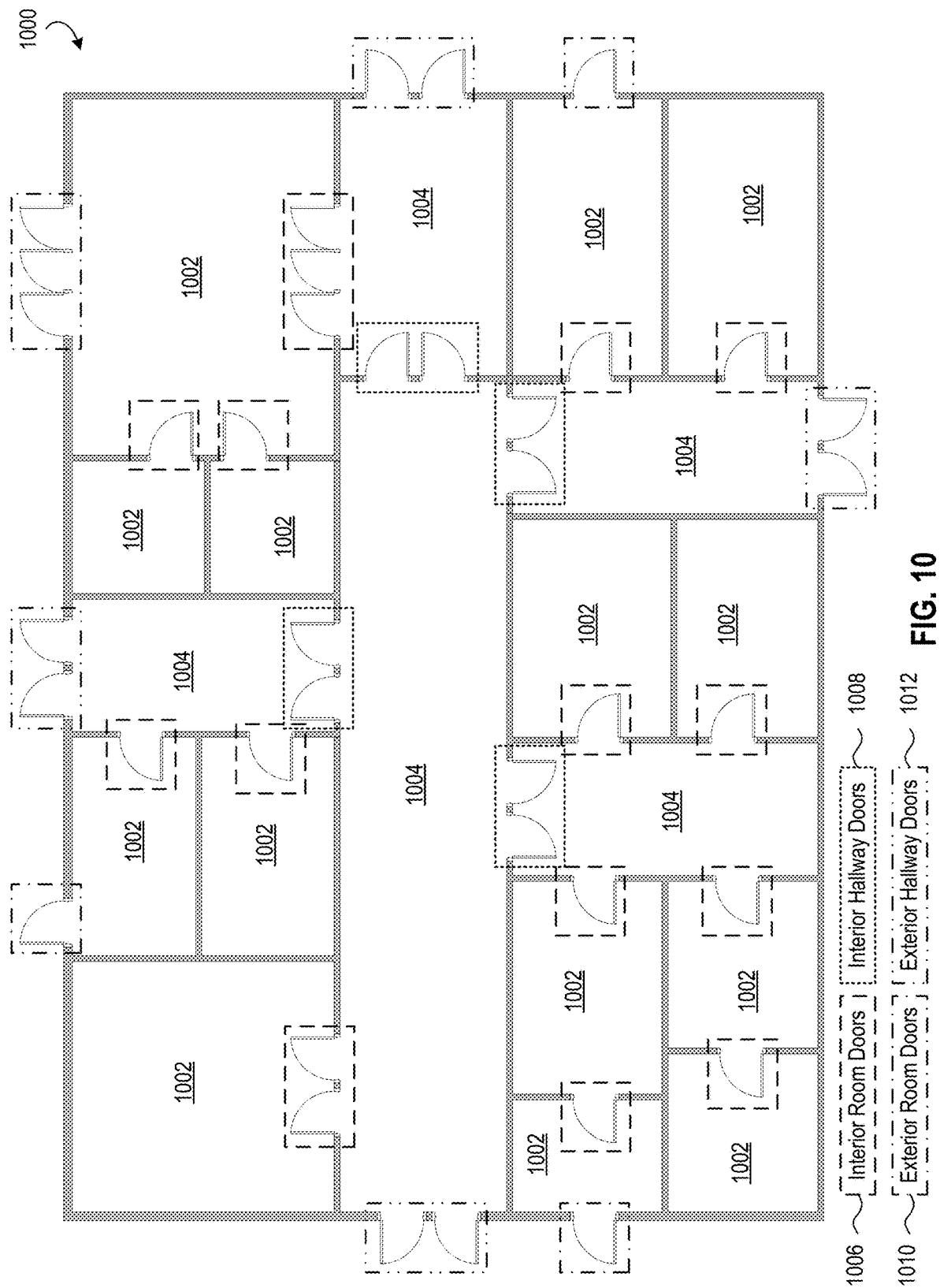
FIG. 10 depicts an example of a floorplan of a structure at which various principles disclosed herein may be implemented.

To help illustrate various principles associated with an emergency lockdown of lock-type device nodes in a local network of interconnected devices, an example floor plan 1000 of a structure is shown in FIG. 10. The structure, in this example, includes multiple rooms 1002 and hallways 1004. The structure also includes multiple doors that provide access to the rooms 1002, the hallways 1004, and the exterior of the structure. The doors in this example include different types of doors including interior room doors 1006 providing access to the rooms 1002 from the interior of the structure, interior hallway doors 1008 providing access to the hallways 1004 from the interior of the structure, exterior room doors 1010 providing access to the exterior of the structure from the rooms and vice versa, and exterior hallway doors providing access to the exterior of the structure from the hallways and vice versa. For convenience and clarity, these different types of doors are identified in FIG. 10 using different types of broken lines, e.g., a first type of broken line (----) for the interior room doors 1006, a second type of broken line (----) for the interior hallway doors 1008, a third type of broken line (-•-•-•-•) for the exterior room doors 1010, and a fourth type of broken lines (-••-••-••-••) for the exterior hallway doors 1012. One or more lock type-device nodes may thus be installed at these doors throughout the structure and added to a local network of interconnected devices deployed at the structure. The different types of doors may also serve as the basis for different groupings of the lock-type device nodes as discussed above, e.g., an "Interior Room Door" group, an "Interior Hallway Door" group, an "Exterior Room Door" group, and an "Exterior Hallway Door Group." A lock-type device node may be installed at some or all of the doors depicted in FIG. 10.

Figure 11:
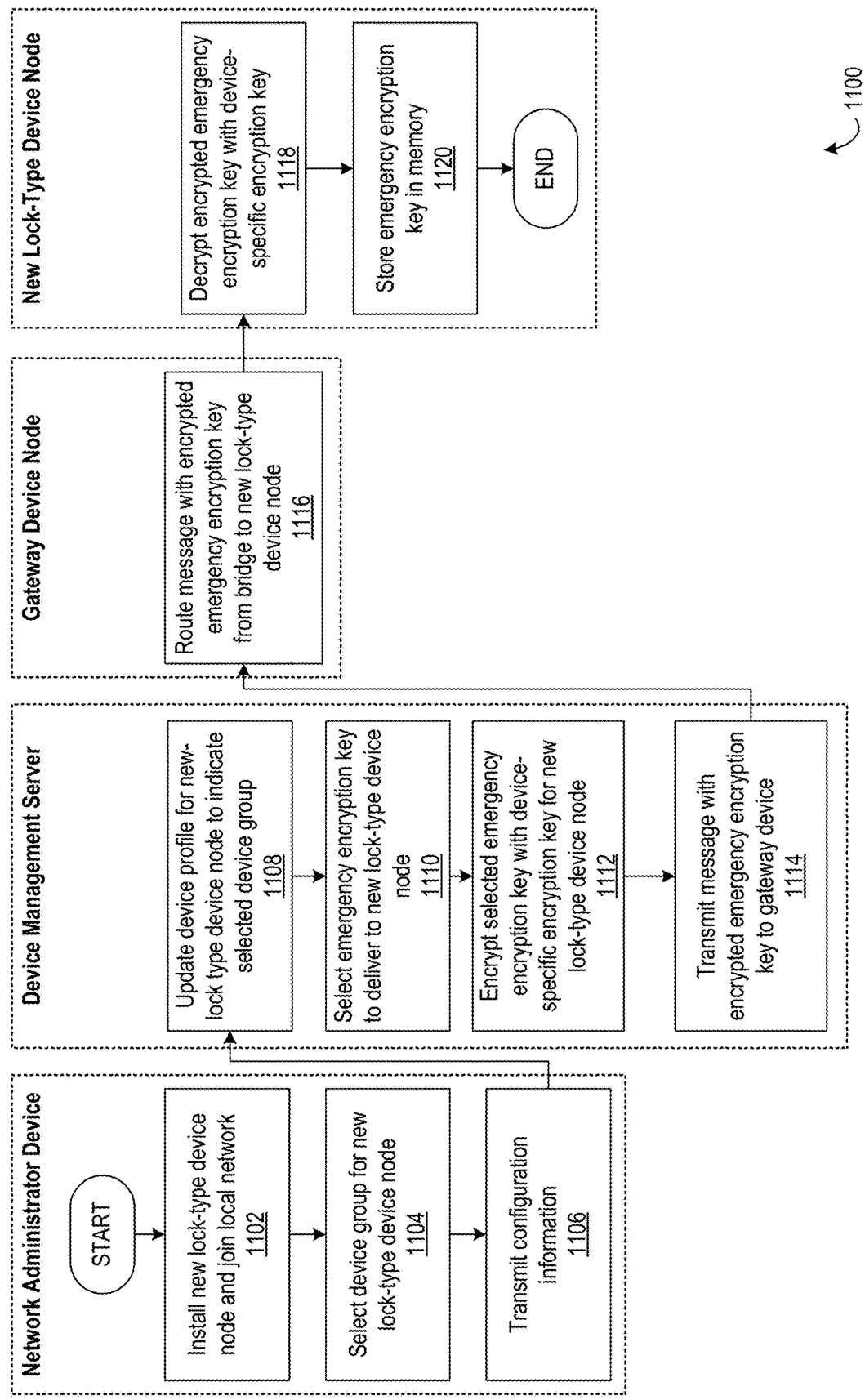
FIG. 11 depicts a flowchart of example method steps for adding a lock-type device node with lockdown capabilities to a local network of interconnected devices in accordance with aspects described herein.

Referring now to FIG. 11, a flowchart 1100 of example method steps for adding a new lock-type device node with lockdown capabilities to a local network of interconnected devices is shown. The end user is typically responsible for installing the new lock-type device node (e.g., at a door) and configuring the new lock-type device node for operation with the local network of interconnected devices. The end user may be, for example, a building administrator, security administrator, or network administrator. In some circumstances, third-parties may be responsible for installing and configuring the device nodes of a local network of interconnected devices. The end user may utilize a user-operated device node (e.g., a mobile phone or tablet computing device) to configure the new lock-type device node. Accordingly, simply for convenience, the end user and the user-operated device utilized to add the new lock-type device are referred to in this section as the administrator and the network administrator device, respectively.

Having installed the new lock-type device node, the administrator first utilizes the network administrator device to configure the new lock-type device node for the local network of interconnected devices (1102). This may include naming the new lock-type device node and associating the new lock-type device node with the user account for the local network of interconnected devices. Configuring the new lock-type device node may also include selecting a device group (1104) for the new lock-type device node. The administrator may select from an existing list of device groups or define a new device group using the network administrator device. More than one group may be selected in some example implementations. By way of example, the administrator may add the new lock-type device node to a "Room" device group, and an "Interior Room Door" device group. Having configured the new lock-type device node for the local network, the network administrator device transmits the configuration information to the device management server (1106), e.g., for storage in a device profile as described above. The configuration information may include, for example, the serial number of the device, the name selected for the device, and any device groups selected for the device. It should be appreciated that selecting a device group may be optional and that the new lock-type device node may be added to the local network of interconnected devices without adding it to a device group.

Upon receipt of the configuration information from the network administrator device, the device management server updates the device profile for the new lock-type device node which, in this scenario, includes indicating which device group was selected for the new lock-type device node (1108). If necessary, the device management server may also create a new device profile or a device group record based on the configuration information received from the network administrator device. Furthermore, adding a new device node to the local network of interconnected device may also include delivering the device-specific encryption keys to the new device node as discussed above. Relevant to the present workflow, however, the device management server selects an emergency encryption key to deliver to the new lock-type device node (1110). The emergency encryption key selected may be a global emergency encryption key or a group emergency encryption key associated with the device group selected for the new lock-type device node as described above. Having selected an emergency encryption key to deliver, the device management server encrypts the emergency encryption key with a device-specific encryption key associated with the new lock-type device node (1112). In this way, the security of the emergency encryption key may be preserved while it is in transit between the device management server and the new lock-type device node. The device management server may include the encrypted emergency encryption key in the payload of a message addressed to the new lock-type device node. The device management server then transmits the message with the encrypted emergency encryption key to the gateway device node associated with the new-lock type device node (1114).

Upon receipt of the message, the gateway device node routes the message to the new lock-type device node (1116). The gateway device node may route the message to the new lock-type device node using a wireless mesh networking protocol (e.g., ANT) as described above. Upon receipt of the message, the new lock-type device node may decrypt the encrypted emergency encryption key using its device-specific encryption key (1118) and store the emergency encryption key (1120) in its memory.

It should be appreciated that the device management server may repeat steps 1110-1114 to deliver additional emergency encryption keys to the new lock-type device node. For example, the device management server may iteratively perform steps 1110-1114 to deliver both a global emergency encryption key and a group emergency encryption key to a new lock-type device node. The device management server may also iteratively perform these steps to deliver multiple group emergency encryption keys to the new lock-type device node if the administrator selected multiple device groups for the new lock-type device node. It should also be appreciated that an emergency encryption key may be delivered to a lock-type device node without encrypting it using a device-specific encryption key.

Figure 12:
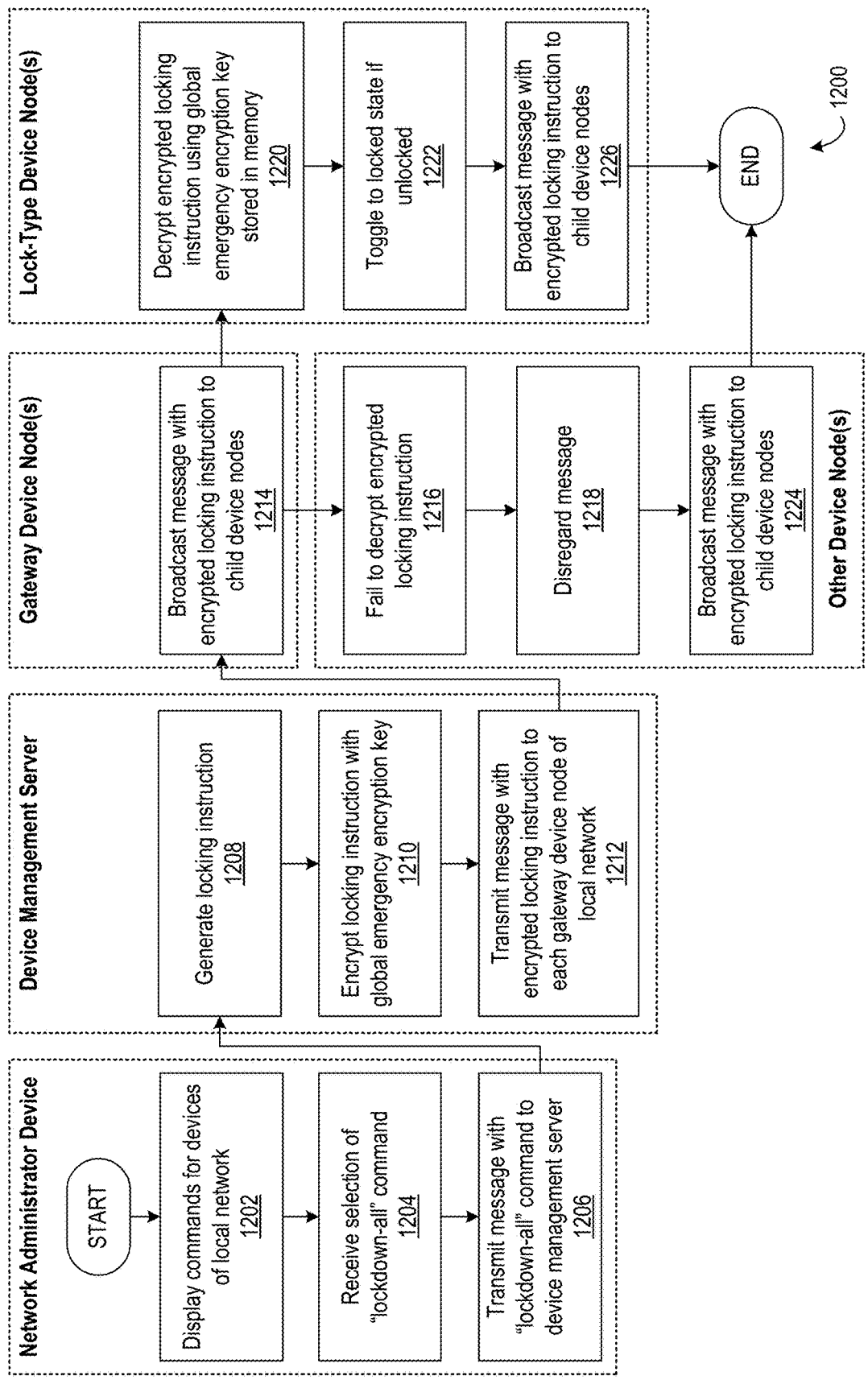
FIG. 12 depicts a flowchart of example method steps for transmitting a "lockdown-all" command in accordance with aspects described herein.

In FIG. 12, a flowchart 1200 for transmitting a "lockdown-all" command for locking all lock-type devices of a local network of interconnected devices is shown. The "lockdown-all" command, in this scenario, is intended to toggle all lock-type device nodes of the local network to their locked state. To begin, the network administrator device displays one or more commands available for the device nodes of the local network (1202), e.g., the "lockdown-all" command in this example. The network administrator device then receives, from the administrator, a selection of the "lockdown-all" command (1204). The network administrator device then transmits a message with the "lockdown-all" command to the device management server (1206). In some example implementations, the network administrator device may encrypt the "lockdown-all" command included in the message, e.g., using an encryption key associated with the user account of the local network.

Upon receipt of the "lockdown-all" command, the device management server generates a locking instruction (1208). Since the "lockdown-all" command is intended to lockdown all lock-type devices of the local network in this scenario, the device management server encrypts the locking instruction with the global emergency encryption key for the local network (1210). The device management server may include the encrypted locking instruction in the payload of a message to be broadcast to all device nodes of the local network. The device management server then transmits the message with the encrypted locking instruction to each gateway device node of the local network (1212). In accordance with the disclosures above, it should be appreciated that a local network may include multiple gateway device nodes or a single gateway device node depending on the particular implementation of the local network of interconnected devices.

Upon receipt of the message, each gateway device node broadcasts the message with the encrypted locking instruction to its child device nodes (1214). As described above, the gateway device nodes may route the message to its child nodes using a wireless mesh networking protocol (e.g., ANT). In this scenario, the global emergency encryption key may have been delivered only to the lock-type device nodes of the local network and not other types of device nodes (e.g., sensor-type device nodes). Accordingly, any device node that does not possess the global emergency encryption key would not be able to decrypt the encrypted locking instruction included in the message broadcast by the gateway device nodes. In this regard, other device nodes may fail to decrypt the encrypted locking instruction included the message they receive (1216) and thus disregard the message (1218). On the other hand, the lock-type device nodes can successfully decrypt the encrypted locking instruction included in the broadcast message using the global emergency encryption key stored in their memories (1220). Upon successful decryption of the encrypted locking instruction, the lock-type device nodes execute the instruction and, if in an unlocked state, toggle to a locked state (1222).

To ensure that the message is delivered to all device nodes of the local network of interconnected devices, each device node that receives the message broadcasts it to each of its own child device nodes, if any, regardless of whether that device node can decrypt encrypted locking instruction. For example, although the other device nodes disregard the message with the encrypted locking instruction (1218), in this scenario, they may nevertheless broadcast the message with the encrypted locking instruction to their own child device nodes (1224). Likewise the lock-type devices, which do decrypt the encrypted locking instruction in the message received (1220) and toggle to a locked state (1222), also broadcast the message with the encrypted locking instruction to their respective child device nodes (1226). The child device nodes, in turn, also attempt to decrypt the encrypted locking instruction and broadcast the message to any child device node of their own. A device node may broadcast the message to its child device nodes either before, after, or during (e.g., in parallel) its attempt to decrypt the locking instruction in the message received. As described above, the device nodes may utilize a wireless mesh networking protocol (e.g., ANT) to transmit the message to their respective child nodes.

The technique of broadcasting the message with the encrypted locking instruction to all device nodes of a local network of interconnected devices may deliver that instruction relatively faster than other approaches that first determine which device nodes of the local network are lock-type device nodes and then generate and transmit individual messages addressed to individual device nodes. Omitting these initial steps and simply transmitting a locking instruction to all device nodes of the local network of interconnected devices advantageously allows the locking instruction to reach the lock-type device nodes as fast as possible, e.g., in an emergency situation. Furthermore, minimal resources are utilized by device nodes that do not possess the encryption key to determine that the encrypted instruction cannot be decrypted and that the message should be disregarded. Although the scenario discussed above indicates that the emergency encryption key may be delivered to only lock-type device nodes, other scenarios may deliver a general global encryption key to all device nodes of a local network for scenarios in which it is desirable to deliver a message to all device nodes of the local network, e.g., a message that includes an instruction to report a current status of the device node. Likewise, other scenarios may deliver a group encryption key to a subset of device nodes of the local network of interconnected devices. The subset of device nodes may be assigned to a logical grouping of device nodes as described above, and the device groups may be groups of homogenous device types (e.g., all lock-type device nodes, all sensor device nodes) or groups of heterogeneous device types (e.g., all device nodes associated with a particular room or floor of a building regardless of device type). More generally, delivering a general global encryption key or group encryption key to various device nodes of a local network may be desirable to distinguish between messages intended to be consumed by a particular device node of the local network (in which case the corresponding device-specific encryption key would be used to encrypt the payload of the message) and messages intended to be consumed by multiple device nodes of the local network (in which case the global or group encryption key would be used to encrypt the payload of the message).

Figure 13:
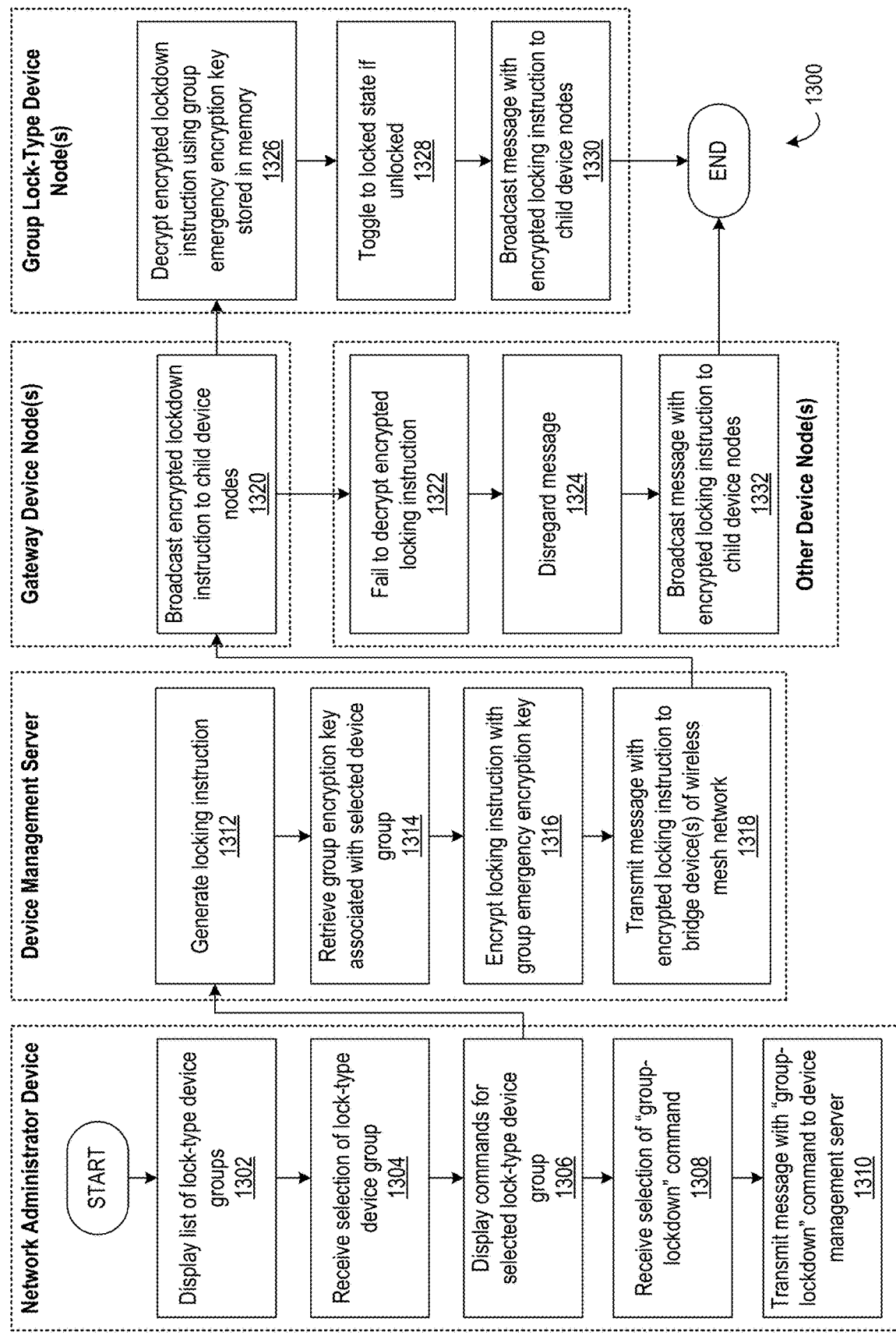
FIG. 13 depicts a flowchart of example method steps for transmitting a "group-lockdown" command in accordance with aspects described herein.

Turning to FIG. 13, a flowchart 1300 of example method steps for transmitting a "group-lockdown" command for locking a group of lock-type devices of a local network of interconnected devices is shown. The "group-lockdown" command, in this scenario, is intended to toggle some, but not all, of the lock-type device nodes of the local network to their locked state, specifically those lock-type device nodes that belong to a selected device group. To begin, the network administrator device displays a list of the lock-type device groups of the local network (1302). As described by way of example above, the list of lock-type device groups may include an "Interior Room Door" device group and an "Exterior Room Door" device group. The network administrator device may then receive from the administrator a selection of one of the lock-type device groups listed (1304) and, in response, display one or more commands available for the lock-type device nodes belonging to the selected group (1306), e.g., the "group-lockdown" command in this example. In this scenario, the network administrator device then receives a selection of the "group-lockdown" command (1308) and, in response, transmit a message with the "group-lockdown" command to the device management server (1310). The message, in this example, also includes an indication of the group selected (e.g., a group name, a group ID) so as to retrieve the appropriate group encryption key. As noted above, the network administrator device may encrypt the "group-lockdown" command included in the message sent to the device management server.

Upon receipt of the message with the "group-lockdown" command, the device management server generates a locking instruction (1312). Since the "group-lockdown" command is intended to lockdown only those lock-type device nodes of the selected group, in this scenario, the device management server retrieves the group emergency encryption key associated with the selected device group (1314) and encrypts the locking instruction with the group emergency encryption key (1316). The device management server may include the encrypted locking instruction in the payload of a message to be broadcast to all device nodes of the local network. The device management server then transmits the message with the encrypted locking instruction to each gateway device node of the local network (1318), which may include one or multiple gateway device nodes.

Upon receipt of the message, each gateway device node broadcasts the message with the encrypted locking instruction to its child device nodes (1320). As noted above, the gateway device nodes may route the message to its child nodes using a wireless mesh networking protocol (e.g., ANT). In this scenario, the group emergency encryption key has been delivered to only those lock-type device nodes that belong to the selected device group. As a result, any device node, regardless of type, that does not possess the group emergency encryption key would not be able to decrypt the encrypted locking instruction included in the message broadcast by the gateway device nodes. In this regard other device nodes that do not belong to the selected device group may fail to decrypt the encrypted locking instruction included in the message they receive (1322) and, again, disregard the message (1324). On the other hand, the lock-type device nodes that do belong to the selected device group can successfully decrypt the encrypted locking instruction included in the group emergency encryption key stored in their memories (1326). Upon successful decryption of the encrypted locking instruction, the lock-type device nodes belonging to the selected device group execute the instruction and, if in an unlock state, toggle to a locked state (1328).

As described above, each device node that receives the message may, in turn, broadcast the message to any of its own child device nodes, regardless of whether that device node successfully decrypted the locking instruction included in the message. This ensures that the message is delivered to all device nodes of the local network of interconnected device. Again, the device nodes may utilize a wireless mesh networking technology (e.g., ANT) to transmit the message to their respective child device nodes. In this scenario, both the lock-type device nodes that belong to the selected device group and the device nodes that do not belong to the selected device group may broadcast the message to their respective child device nodes (1330 and 1332).

Figure 14:
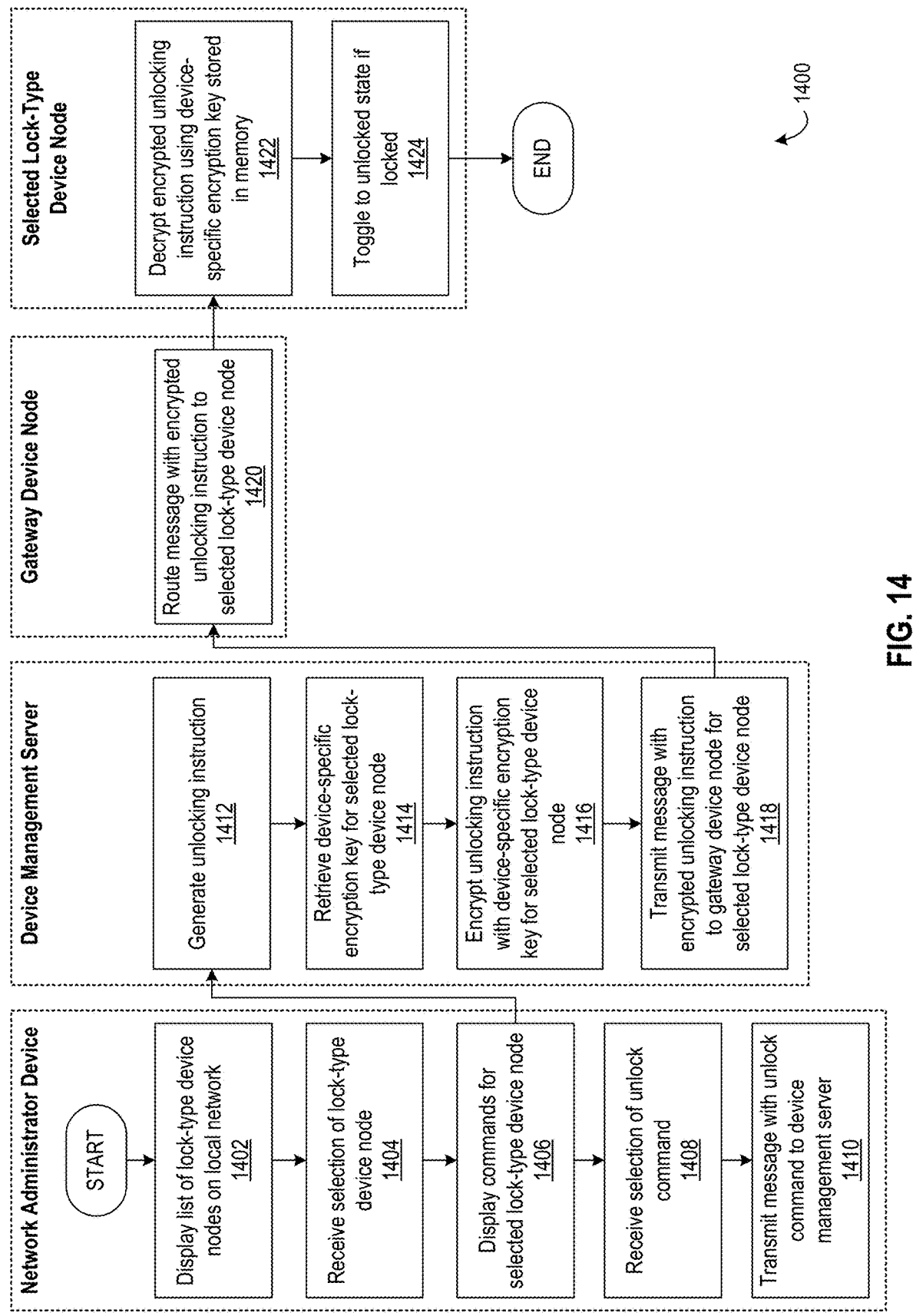
FIG. 14 depicts a flowchart of example method steps for executing an unlock command in accordance with aspects described herein.

In FIG. 14, a flowchart 1400 of example method steps for transmitting an unlocking instruction to a specific lock-type device of a local network of interconnected devices is shown. To begin, the network administrator device, in this scenario, displays a list of lock-type device nodes of the local network (1402). The list may include all lock-type device nodes of the local network or only a subset of the lock-type device nodes, e.g., the lock-type device nodes that belong to a selected device group. The network administrator device may then receive from the administrator a selection of one of the lock-type device nodes listed (1404) and, in response, display one or more commands available for the lock-type device node selected (1406). In this scenario, the network administrator device then receives a selection of the "unlock" command (1408) and, in response, transmit a message with the "unlock" command to the device management server (1410). The message, in this example, also includes an indication of the lock-type device node selected (e.g., a device ID or a device serial number) so as to retrieve the appropriate device-specific encryption key. The network administrator device may encrypt the "unlock" command included in the message sent to the device management server.

Upon receipt of the message with the "unlock" command, the device management server generates an unlocking instruction (1412). Since the "unlock" command is intended to unlock a specific lock-type device node, in this scenario, the device management server retrieves the device-specific encryption key associated with the selected lock-type device node (1414) and encrypts the unlocking instruction with the device-specific encryption key (1416). The device management server may include the encrypted unlocking instruction in the payload of a message to be transmitted (e.g., uncasted) to the selected lock-type device. The device management server then transmits the message with the encrypted locking instruction to the gateway device node associated with the selected lock-type device node (e.g., the gateway device node the lock-type device node is assigned to) (1418).

Upon receipt of the message, the gateway device node transmits the message with the encrypted unlocking instruction to the selected lock-type device node (1420). The gateway device node may utilize a wireless mesh networking protocol (e.g., ANT) to route the message to the selected lock-type device node which may include one or more hops at various other device nodes of the local network between the gateway device node and the selected lock-type device node. Having received the message, the selected lock-type device node decrypts the encrypted unlocking instruction using its device-specific encryption key (1422). Upon successful decryption of the encrypted unlocking instruction, the selected lock-type device node executes the instruction and, if in a locked state, toggles to an unlocked state (1424).

It should be recognized that the steps discussed above with reference to FIGS. 12-14 may be similarly performed to transmit corresponding unlock or locking instructions. For example, the steps discussed above with reference to FIG. 12 may likewise be performed to deliver an unlocking instruction to all lock-type device nodes of a local network in response to selection of an "unlock-all" command at the network administrator device. In the same fashion, the steps discussed above with reference to FIG. 13 may likewise be performed to deliver an unlocking instruction to a logical grouping of lock-type device nodes of a local network in response to a selection of a device group and a "group-lockdown" command at the network administrator device. Similarly, the steps discussed above with respect to FIG. 14 may likewise be performed to deliver an locking instruction to a particular lock-type device node of a local network in response to a selection of that lock-type device node and a "lock" command at the network administrator device. Moreover, alternative implementations of the local network are possible that deliver messages with encrypted instructions are possible. As set forth above, in some implementations, the message with the encrypted instruction is broadcast to all device nodes of the local network to ensure the message reaches the relevant devices (e.g., the lock-type device nodes) as fast as possible (e.g., in an emergency situation). However, other implementations may take a more measured approach that first identifies which device nodes of the local network should consume the message. These types of more measured approaches may be employed where time is a less important factor and the messages do not need to reach the device nodes as fast as possible.

For example, in one alternative implementation, the device management server may first identify which device nodes of the local network are lock-type device nodes and generate individual messages (e.g., with a lock or unlocking instruction) respectively addressed to the lock-type device nodes. The device management server, in this alternative example, may then identify which gateway device nodes are associated with the lock-type device nodes and transmit the respective messages to the appropriate gateway device node for routing to the lock-type device nodes. A similar approach may be employed to deliver individual messages with encrypted instructions to each device node of a selected device node group. In addition, some implementations of the local network may be configured to employ both techniques whereby the network administrator device may be configured to provide a selectable option (e.g., an "emergency" option) that allows an administrator to specify whether a command should be delivered to the device nodes of the local network as fast as possible—in which case the message may be broadcast to all device nodes of the local network—or not—in which case individual messages may be generated for consumption by particular device nodes (e.g., a selected group of device nodes). In another alternative implementation, the message transmitted to the gateway device node(s) of the local network may indicate whether the message should be broadcast to all device nodes or multicast to a subset of the device nodes, in which case the message may also include a list of the device nodes that should receive the multicast message. The gateway device node, in this alternative example, may thus be configured to generate and transmit the corresponding messages to the device nodes indicated in the message received from the device management server. In some example implementations, indicating whether a message should be broadcast to all device nodes or multicast to specific device nodes may be a configurable setting at the local network of interconnected devices.

Regarding the message with the encrypted instruction, a device node may be configured to employ various approaches to its attempt to decrypt the encrypted instruction. In some example implementations, the message may not specify that whether it is an emergency message intended to be consumed by multiple device nodes of the local network or a device-specific message intended to be consumed by only the device node itself. In other example implementations, the message may indicate whether it is an emergency message or a device-specific message, e.g., using an indicator flag or other parameter. In addition, an emergency message may indicate whether it is a global emergency message or a group emergency message also using, e.g., an indicator flag or other parameter. Furthermore, a group emergency message may indicate which device group the message is associated with by including an identifier (e.g., a group name, a group ID) in the group emergency message. This information may be included, for example, in the header of the message generated by the device management server. By specifying whether the message is a device-specific message, a global emergency message, or a group emergency message with an indication of the targeted group, the device node can select the appropriate encryption key for decrypting the encrypted instruction included in the message, e.g., the device-specific encryption key, the global emergency encryption key, or a group emergency encryption key. In implementations that do not specify whether the message is a device-specific message or an emergency message a device node may be configured to iteratively utilize whatever encryption keys it possesses to attempt to decrypt the encrypted instructions in the messages it receives. If the device node is successful in decrypting an encrypted instruction, it may execute that instruction. If the device node cannot decrypt the encrypted instruction using any of the encryption keys it possesses, it may simply discard the encrypted instruction.

Figure 15:
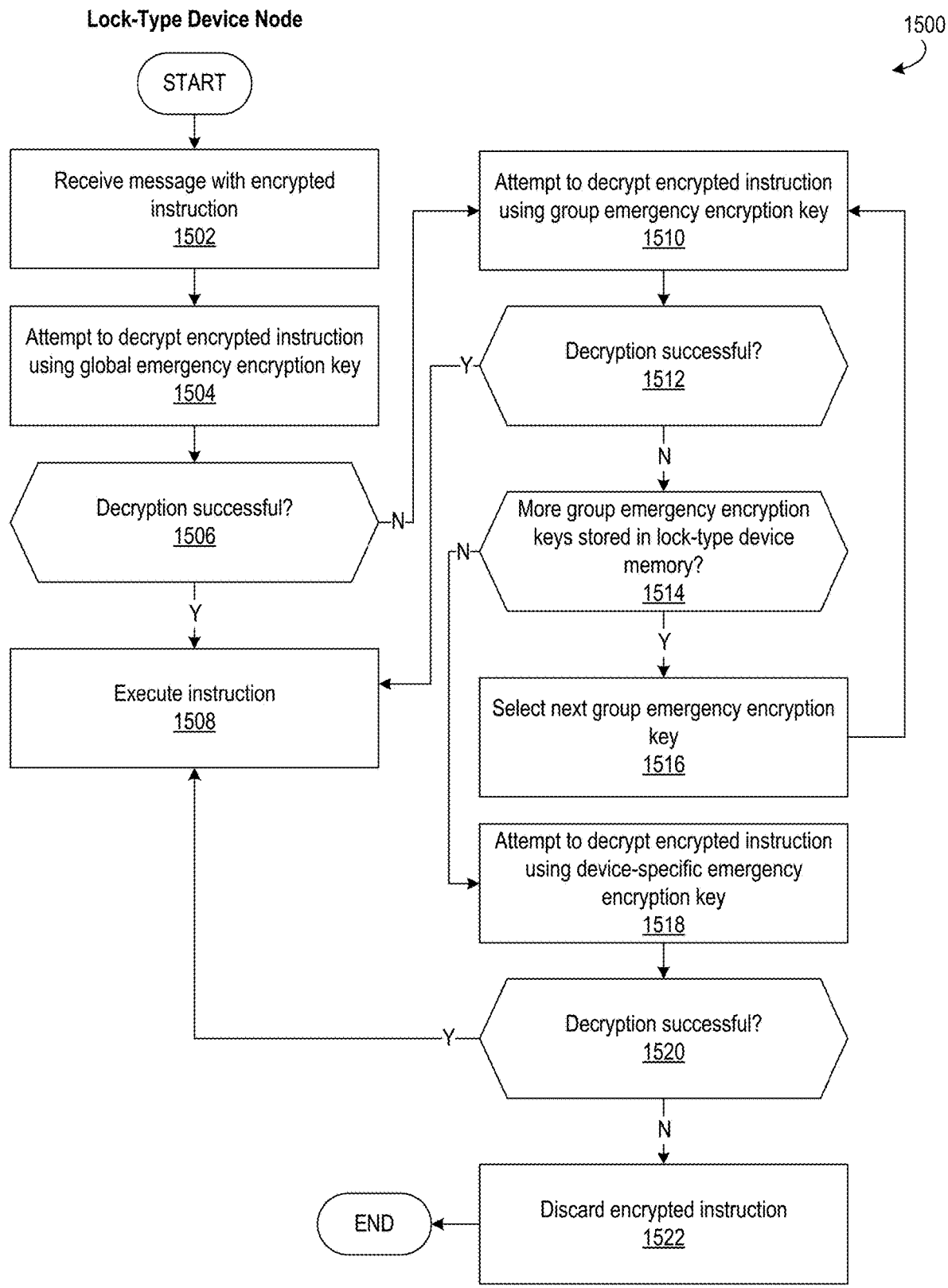
FIG. 15 depicts a flowchart of example method steps for decrypting an encrypted instruction using an emergency encryption key in accordance with aspects described herein.

In FIG. 15, a flowchart 1500 of example method steps for decrypting an encrypted instruction at a lock-type device node is shown in which the message does not indicate whether it is an emergency message or a device-specific message. More generally, the steps shown by way of example in FIG. 15 may be performed where the message does not include an indication of whether the message is intended for consumption by only the computing device (e.g., a device-specific message). Here, the lock-type device node is configured to iteratively attempt decryption using each of its encryption keys in sequence. In this example, the lock-type device is configured to first attempt decryption using its global emergency encryption key followed by its group emergency encryption keys, and finally with its device-specific encryption key. Starting with the global emergency may be advantageous where it is desirable to execute the instruction as fast as possible.

To begin, the lock-type device node receives a message with an encrypted instruction (1502). The lock-type device node then attempts to decrypt the encrypted instruction using the global emergency encryption key it possesses (1504). If decryption is successful using the global emergency encryption key (1506:Y), then the lock-type device executes the instruction (1508). If decryption is unsuccessful using the global emergency encryption key (1506:N), then the lock-type device attempts to decrypt the encrypted instruction using one of the group emergency encryption keys it possesses (1510). Again, if decryption is successful using the group emergency encryption key (1512:Y), then the lock-type device executes the instruction (1508). If decryption is unsuccessful using the selected group emergency encryption key (1512:N), the lock-type device may determine whether it possesses any additional group emergency encryption keys (1514). If so (1514:Y), the lock-type device node may select the next group emergency encryption key (1516) to attempt decryption with. If no group emergency encryption keys remain (1514:N), the lock-type device attempts to decrypt the encrypted instruction using its device-specific encryption key (1518). If decryption is successful using the device-specific encryption key (1520:Y), then the lock-type device executes the instruction (1508). If the lock-type device node cannot decrypt the encrypted instruction using its device-specific key (1520:N), then the lock-type device may simply disregard the encrypted instruction (1522).

It will be recognized that the lock-type device node may not possess any group emergency encryption keys, in which case the lock-type device node may attempt decryption using its device-specific key if decryption fails using the global emergency encryption key. It will also be appreciated that the lock-type device node may be configured to attempt decryption using an alternative sequence of encryption keys. For example, a device node may be configured to first attempt decryption using its device-specific encryption key, followed by its group emergency encryption key(s), and finally with its global emergency encryption key. In other examples, a device node may be configured to attempt decryption using additional and alternative sequences of its encryption keys. In addition, where a device node is assigned to multiple device groups, the corresponding group emergency encryption keys the device node possesses may be prioritized. The network administration device, for example, may thus enable the administrator to assign priorities to the device groups selected for a device node or otherwise arrange the selected device groups according to priority. The device management server may store the priority information, e.g., in the device group profiles, and provide the priority information to the device node with the group emergency encryption key, e.g., in the same message that includes the group emergency encryption key or a different message. In turn, the device node may be configured to attempt decryption using its group emergency encryption keys according to their priority, e.g., starting with highest priority and finishing with lowest priority or vice versa. It will further be appreciated that the steps for decrypting an encrypted instruction may similarly be employed where the encryption keys possessed by the device node are general encryption keys (rather than emergency encryption keys), e.g., a general global encryption key, a general group encryption key, and the like. Finally, the sequence of the encryption keys a device node employs when attempting decryption may be a configurable setting on a local network-wide basis and/or a device-by-device basis.

Figure 16:
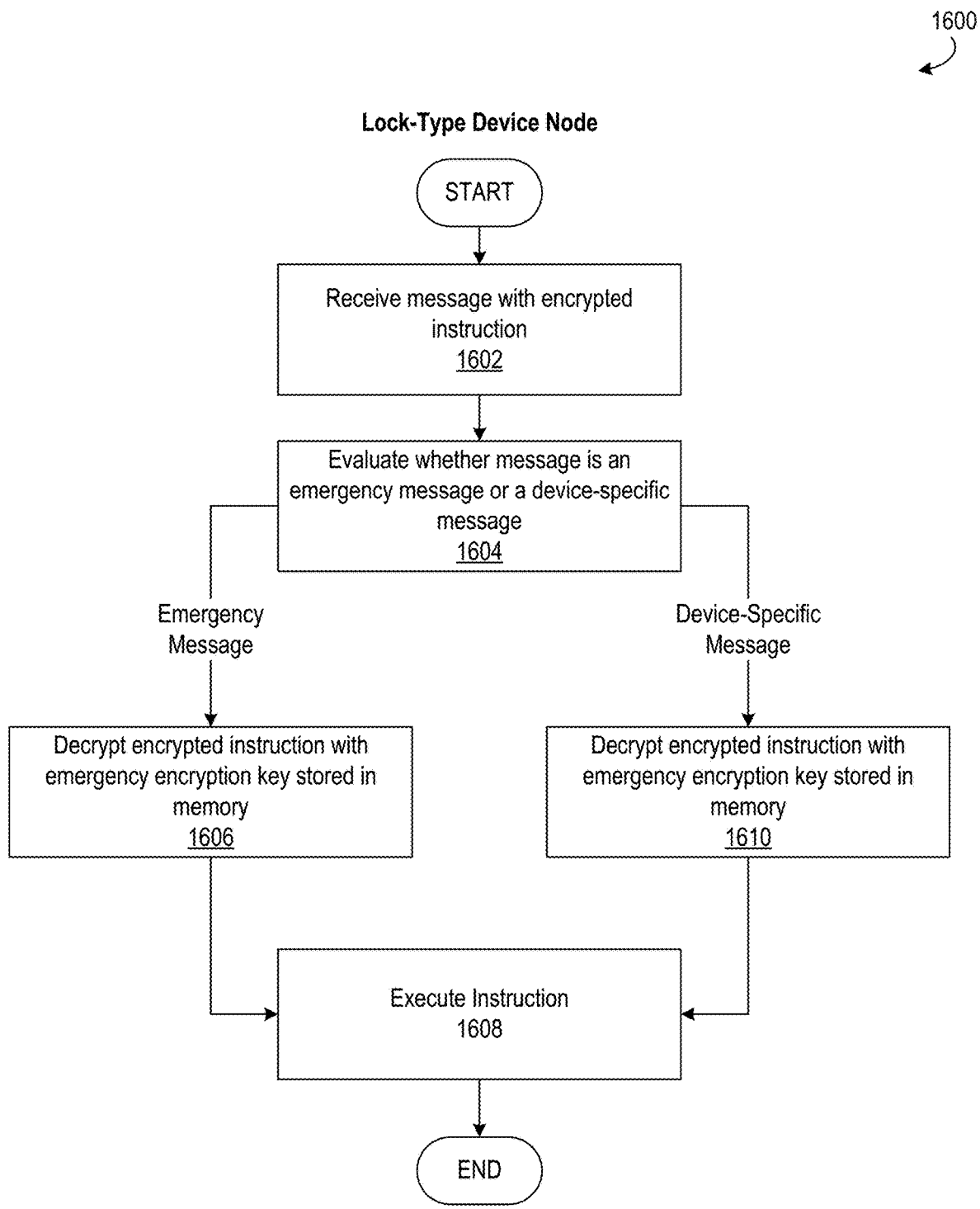
FIG. 16 depicts a flowchart of example method steps for decrypting an encrypted instruction in accordance with aspects described herein.

In FIG. 16, a flowchart 1600 of example method steps for decrypting an encrypted instruction at a lock-type device node is shown in which the message does indicate whether it is an emergency message or a device-specific message. More generally, the steps shown by way of example in FIG. 16 may be performed where the message does include an indication of whether the message is intended for consumption by only the computing device (e.g., a device-specific message). Here, the lock-type device is configured to processes the message received and select the appropriate encryption key based on the indication of the message type (e.g., "emergency" or "device-specific"). To begin, the lock-type device node receives a message with an encrypted instruction (1602) and evaluates the message to determine whether the message is an emergency message or a device-specific message (1604). In this example, if the message is an emergency message (1604:Emergency Message), then the lock-type device node may decrypt the encrypted instruction with the emergency encryption key stored in its memory (1606), and execute the instruction (1608). If, however, the message is a device-specific message (1604: Device-Specific Message), then the lock-type device node may decrypt the encrypted instruction with the device-specific encryption key stored in its memory (1610), and execute the instruction (1608).

An emergency message received by a device node may further indicate whether the message is a global emergency message or a group emergency message. More generally, a message may include an indication of whether the message is intended for consumption by only those device nodes included in a device node group (e.g., a group-specific message). In addition, a group emergency message received by a device node may also indicate which device group the message is associated with (e.g., by indicating a group name or group ID). It will also be recognized that a message may more generally indicate whether the message is a general global message or a general group message, in which case a device node may utilize a general global encryption key or a general group encryption key.

Referring now to FIGS. 17A-E, example user interfaces for controlling device nodes in a local network of interconnected devices is shown. The interfaces depicted in these figures may be presented on the user-operated devices (e.g., the network administration device) and receive input from a user (e.g., a network administrator). In FIGS. 17A-E, the user-operated device is depicted as including a touchscreen in which the user input is provided as touch input at the touchscreen.

Figure 17A:
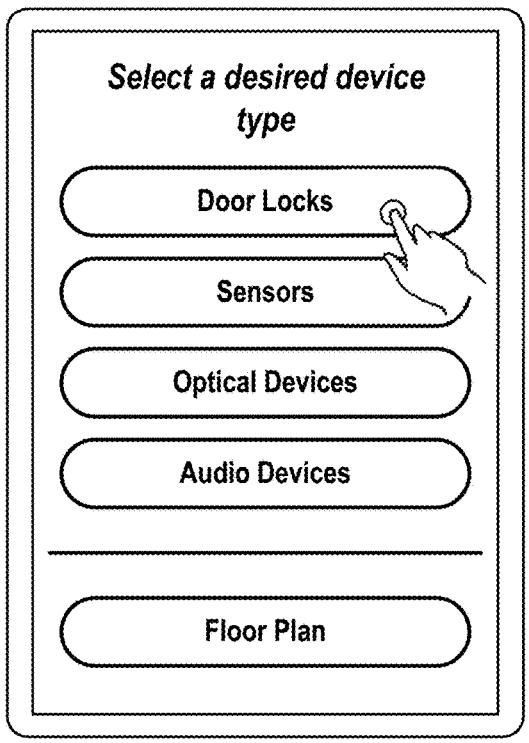
FIG. 17A depicts an example of an implementation of a first user interface for controlling lock-type device nodes of a local network of interconnected devices in accordance with aspects described herein.

In FIG. 17A, a user interface for selecting a desired type of device node is shown. As seen in FIG. 17A, the user interface includes options for selecting the various types of device nodes of a local network of interconnected devices including, in this example, lock-type devices, sensor-type devices, optical-type devices, and audio-type devices. The user interface in FIG. 17A also includes an option for viewing a floorplan that illustrates the installation locations of the device nodes of the local network in a building. The floor plan will be discussed in further detail below with reference to FIG. 17E. To illustrate the operation of the user-operated device, FIG. 17A is shown as receiving user input at the "Door Locks" option.

Figure 17B:
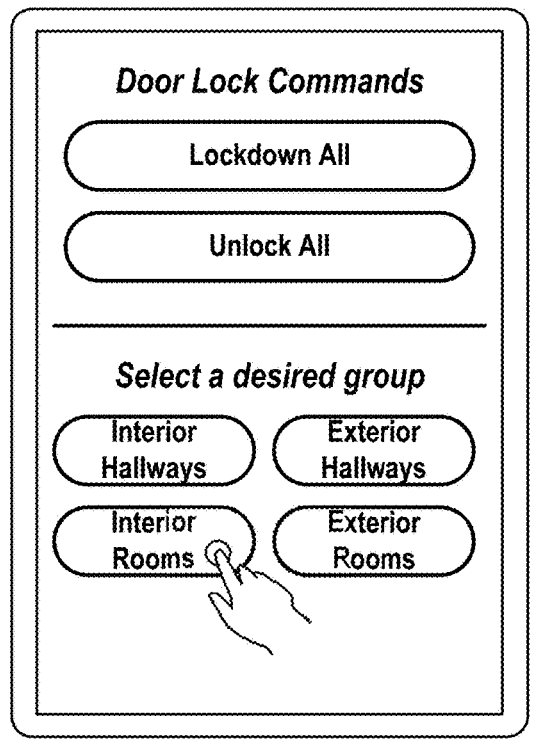
FIG. 17B depicts an example of an implementation of a second user interface for controlling lock-type device nodes of a local network of interconnected devices in accordance with aspects described herein.

FIG. 17B shows the user interface presented at the user-operated device, in this example, in response to selection of the "Door Locks" option in FIG. 17A. The user interface in FIG. 17B includes commands for controlling the lock-type devices of the local network, e.g., a "Lockdown All" command to toggle all lock-type device nodes to a lock state and an "Unlock All" command to toggle all lock-type device nodes to an unlock state. The user interface in FIG. 17B also includes options to select various device groups that have been defined for the lock-types devices of the local network, e.g., an "Interior Hallways" device group, an "Exterior Hallways" device group, an "Interior Rooms" device group, and an "Exterior Rooms" device group. In FIG. 17B, the user interface is shown as receiving user input at the "Interior Rooms" device group option.

Figure 17C:
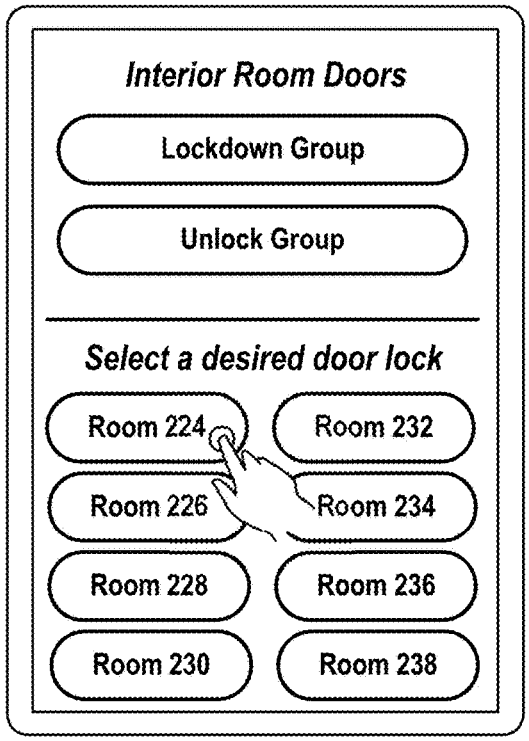
FIG. 17C depicts an example of an implementation of a third user interface for controlling lock-type device nodes of a local network of interconnected devices in accordance with aspects described herein.

FIG. 17C shows the user interface presented at the user-operated device, in this example, in response to selection of the "Interior Rooms" option in FIG. 17B. The user interface in FIG. 17B includes commands for controlling the lock-type devices of the "Interior Rooms" device group. The user interface in FIG. 17C includes commands for controlling the lock-type devices of the "Interior Rooms" device group, e.g., a "Lockdown Group" command to toggle all lock-type devices installed at interior room doors to a lock state and an "Unlock Group" command to toggle all lock-type devices installed at interior room doors to an unlock state. The user interface in FIG. 17C also includes options to select the various lock-type devices that belong to the "Interior Rooms" device group, e.g., "Room 224," "Room 226," etc. In FIG. 17C, the user interface is shown as receiving user input at the "Room 224" option.

Figure 17D:
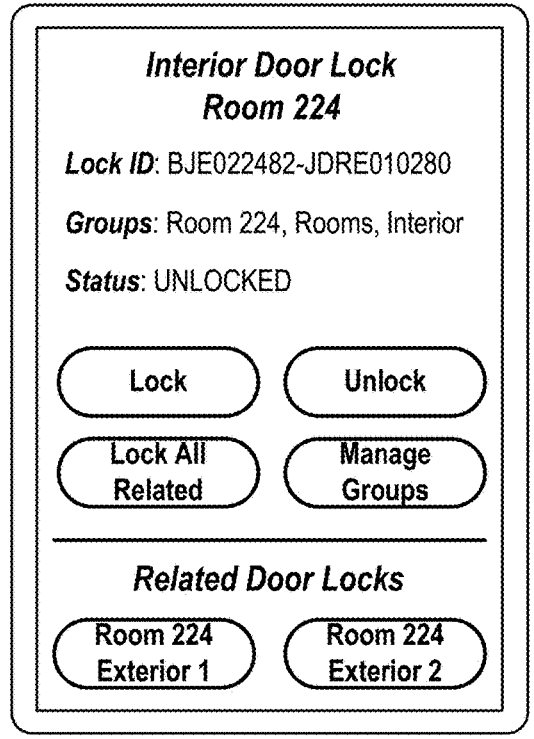
FIG. 17D depicts an example of an implementation of a fourth user interface for controlling lock-type device nodes of a local network of interconnected devices in accordance with aspects described herein.

FIG. 17D shows the user interface presented at the user-operated device, in this example, in response to selection of the "Room 224" option in FIG. 17C. The user interface in FIG. 17D includes information about the lock-type device installed at an interior door for "Room 224." The information, in this example, includes the unique identifier for the lock-type device node (e.g., the serial number), the device groups the lock-type device node belongs to (e.g., the "Room 224," Rooms," "Interior" device groups). In addition, the user interface in FIG. 17D includes options for selecting related lock-type devices which, in this example, includes two related lock-type devices installed at exterior doors of "Room 224," e.g., a "Room 224 Exterior 1" option and a "Room 224 Exterior 2" option. Finally, the user interface in FIG. 17D also includes commands for controlling the selected lock-type device node, e.g., a "Lock" command to toggle the lock-type device node to a lock state, an "Unlock" command to toggle the lock-type device node to an unlock state, a "Lock All Related" command to toggle any related lock-type device nodes to the lock state, and an "Unlock All Related" command to toggle any related lock-type device nodes to the unlock state.

Figure 17E:
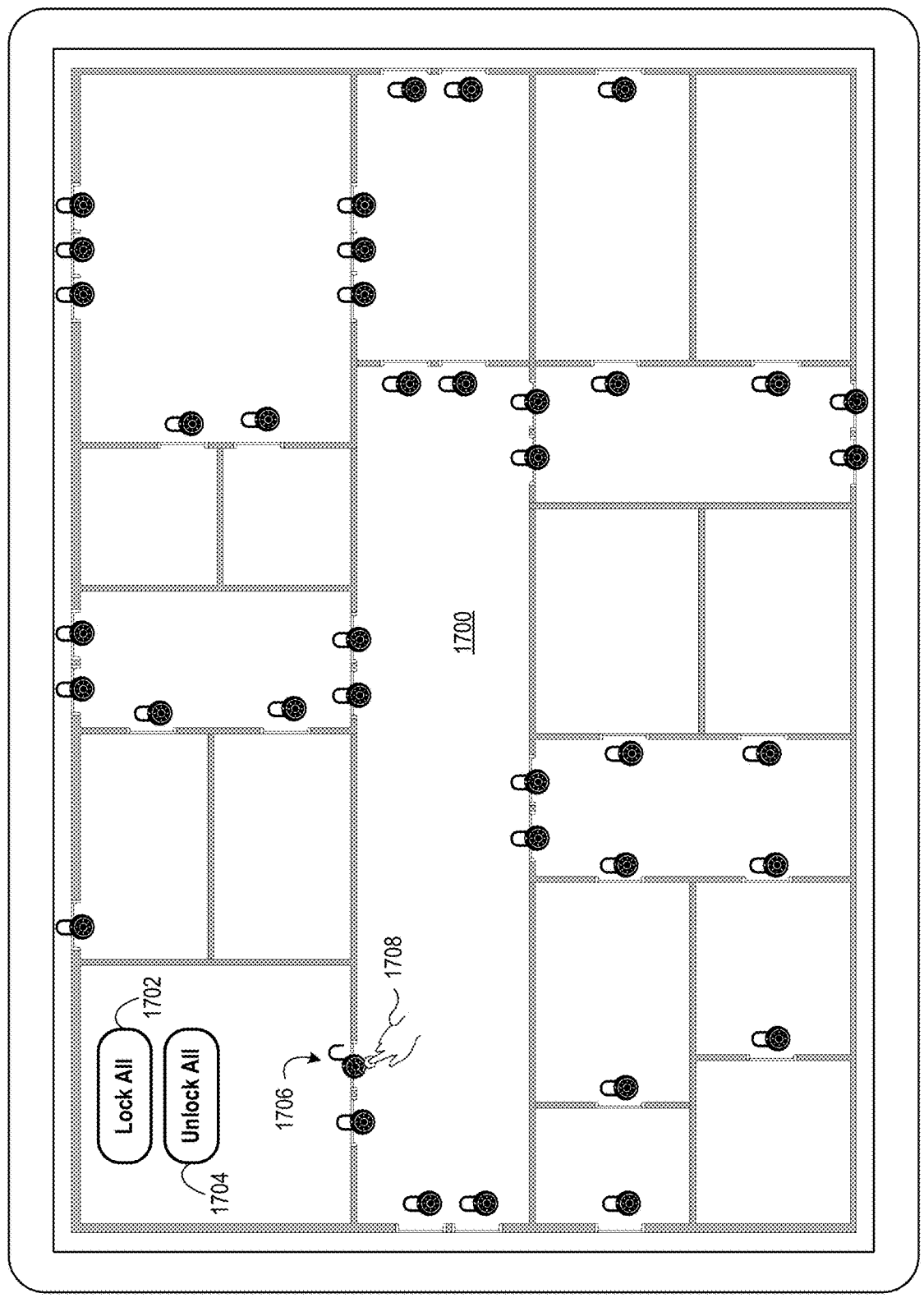
FIG. 17E depicts an example of an implementation of a fifth user interface for controlling lock-type device nodes of a local network of interconnected devices in accordance with aspects described herein.

Referring now to FIG. 17E, a user interface 1700 for controlling the lock-type devices installed throughout a building is shown. As seen in FIG. 17E, the user interface includes an interactive floor map corresponding to the floor map discussed above with reference to FIG. 10. The user interface may be configured to receive user input associated with a variety of tasks for managing and controlling the lock-type devices installed throughout the building. For example, a user may indicate the locations at which lock-type devices have been installed in the building by selecting a corresponding location on the interactive floor map. The interactive floor map, in this example, presents icons at those locations that have been selected as installation sites for the lock-type devices. The icons, in this example, are lock/unlock icons that indicate the current state of the lock-type devices (e.g., locked or unlocked). As seen in FIG. 17E, a lock icon is used to indicate the corresponding lock-type device node is in a locked state, and an unlock icon is used to indicate the corresponding lock-type device node is in an unlocked state. In addition, a user may issue lock/unlock commands via the user interface in FIG. 17E. Here, the user interface includes a selectable "Lock All" option 1702 to issue a "lockdown-all" command to the lock-type devices of the local network as well as a selectable "Unlock All" option 1704 to issue an "unlock-all" command to the lock-type devices as described above. The icons may also be selectable so as to enable the user to selectively issue lock and/or unlock commands to individual lock-type device nodes. In this regard, an icon 1706 is shown in FIG. 17E as having received touch input 1708 so as to toggle the corresponding lock-type device from a locked state to an unlocked state. It will be recognized that the user interface depicted in FIG. 17E may include additional and alternative options for controlling the lock-type devices nodes installed throughout the building, e.g., selectable options respectively corresponding to the device node groups defined for the local network for issuing lock/unlock commands to a selected device group option. In addition, the user interface in FIG. 17E may be configured to present a contextual menu for a lock-type device node when the corresponding icon receives user input (e.g., a press-and-hold touch gesture). The contextual menu may include selectable options for issuing the lock/unlock commands as described above as well as commands to enable/disable the lock-type device, assign it to a define device node group, issue a status update command, remove it from the local network of interconnected devices, and other commands that will be appreciated with the benefit of this disclosure.

Example Computing Environment

Figure 18:
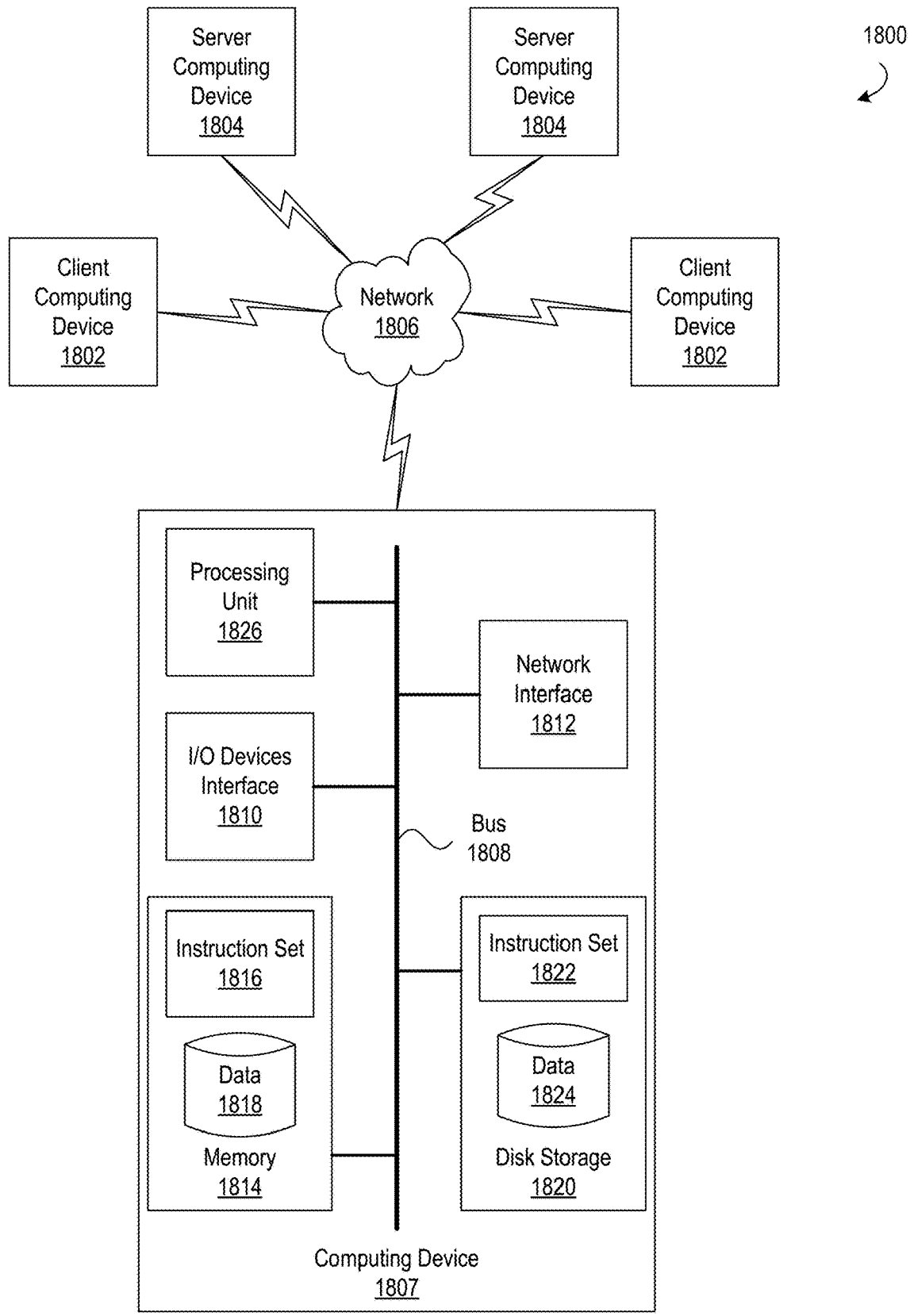
FIG. 18 depicts an example of an implementation of a computing environment in which aspects of the present disclosure may be implemented.

Referring now to FIG. 18, an example of an implementation of a computing environment 1800 in which aspects of the present disclosure may be implemented is shown. The computing environment may include both client computing devices 1802 and server computing devices 1804. The client computing devices 1802 and server computing devices 1804 may provide processing, storage, input/output devices, application programs, and the like. Client computing devices 1802 may include, e.g., desktop computers, laptop computers, tablet computers, palmtop computers, smartphones, smart televisions, and the like. Client computing devices 1802 may also be in signal communication to other computing devices, including other client devices computing devices 1802 and server computing devices 1804 via a network 1806. The network 1806 may be part of a remote access network, a wide area network (e.g., the Internet), a cellular network, a worldwide collection of computers, local area networks, and gateways that currently use respective protocols (e.g., FTP, HTTP, TCP/IP, etc.) to communicate with one another. Other electronic device architectures and computer network architectures may be selectively employed.

FIG. 18 also depicts a block diagram of one of a computing device 1807 of the computing environment 1800. The computing device 1807 contains a bus 1808 the computing device utilizes to transfer information among its components. The bus 1808 connects different components of the computing device 1807 (e.g., processor, disk storage, memory, input/output ports, network ports, etc.) and enables the transfer of information between those components. An I/O device interface 1810 is connected to the bus 1808. The I/O device interface 1810 connects various input and output devices (e.g., keyboard, mouse, microphone, camera, displays, printers, speakers, etc.) to the computing device 1807. A network interface 1812 is also attached to the bus 1808 and allows the computing device 1807 to connect to various other devices attached to a network (e.g., network 1806). The memory 1814 provides volatile storage for one or more instruction sets 1816 and data 1818 used to implement aspects described herein. Disk storage 1820 provides non-volatile storage for one or more instruction sets 1822 (e.g., an operating system) and data 1824 used to implement various aspects described herein. The processing unit 1826 is also attached to the bus 1808 and executes the instructions stored in the memory 1814 and/or the disk storage 1820. The instruction sets 1816 and 1822 as well as the data 1818 and 1824 include a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. At least a portion of the instructions may also be downloaded via the network 1806. As noted above, computer-readable media include all non-transitory computer-readable media and do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as, e.g., HTML, XML, JavaScript, and the like. The executable instructions may be stored on a computer readable medium such as a hard disk, optical disk, removable storage media, solid state memory, RAM, ROM, etc. The functionality of the program modules may be combined or distributed as desired in various embodiments. In addition, the functionality may be embodied in whole or in part in firmware or hardware equivalents such as integrated circuits, field programmable gate arrays (FPGAs), and the like. Various data structures may be used to more effectively implement one or more aspects of the disclosure, and such data structures are contemplated to be within the scope of the executable instructions and computer-usable data described herein.

Additional Disclosures

While the disclosures provided above are discussed in the context of emergency situations, it should be appreciated that the techniques described may be employed in any situation whereby a message needs to be delivered to multiple devices of a local network of interconnected devices. In addition, the techniques described above may be utilized with other types of device nodes beyond lock-type devices nodes. For example, the techniques described herein may be employed to broadcast or multicast commands to light-type device nodes to toggle to an on state or an off state, e.g., when approaching/entering or leaving/exiting a room or structure.

Various types of interfaces may be selectively employed to issue commands to the device nodes of the local network of interconnected devices. For example, in addition to issuing commands from a mobile application installed at a mobile phone or tablet computing device, a user may also issue commands via a web portal presented in a web browser. The device management server may provide the web portal and thus also function as a web browser. Alternatively, a separate web server may provide the web portal to the user's web browser and be in signal communication with both the device management server and the user's web browser to facilitate an exchange of communications between the user and the device management server via the web portal.

Additional security measures may also be employed to protect the emergency encryption key stored at the device nodes of the local network of interconnected devices. For example, in response to receipt of an emergency encryption key (or general encryption key) from the device management server, a device node may encrypt the emergency encryption key received using the device-specific encryption key of the device node prior to storing it in memory. In this way, the emergency encryption key stored in the memory of the device node is protected while stored. In implementations where a device node encrypts the emergency encryption key stored in its memory using its device-specific encryption key, subsequently using the emergency encryption key when attempting to decrypt an encrypted instruction may thus include an initial step of decrypting the encrypted emergency key using the device-specific encryption key.

A lock-type device node may also include features that enhance its decryption capabilities. For example, in some implementations, a lock-type device node may include multiple processors that each attempt decryption of one of the encryption keys stored at the lock-type device node in a simultaneous fashion. In one example, a lock-type device node may include two processors, one each for attempting simultaneous decryption of an encrypted instruction using an emergency encryption key and a device-specific encryption key. In another example, a lock-type device node may include three processors, one each for attempting simultaneous decryption of an encrypted instruction using a shared global encryption key, a shared group encryption key, or a device-specific encryption key.

A local network of interconnected devices may be controlled by multiple authorized users. For example, in the context of a school building, the users authorized to control the lock-type device nodes deployed throughout the building may include a principal, one or more teachers, staff members, security guards, and the like in addition to a network administrator. Accordingly, each authorized user may possess a user-operated device (e.g., a mobile phone, a tablet computer) to issue lock/unlock commands to various lock-type devices nodes. Furthermore, some authorized users may be limited by the specific device nodes they can issue commands to. For example, teachers may be limited to issuing commands to only those devices installed at their associated rooms, hallways, or wings of the school building whereas a more senior level user (e.g., a principal or security administrator) may be authorized to issue commands to all device nodes of the local network. The device management server may maintain (e.g., in its device profiles and/or user profiles) indications of which device nodes respective users are authorized to control.

In some example implementations, the total number of logical groupings of device nodes may be limited per account. In turn, the total number of emergency keys associated with that account may likewise be limited. If, for example, the total number of logical groupings of device nodes were limited to 64 logical groupings, then the total number of group emergency encryption keys may be limited to 64 group emergency encryption keys. Limiting the total number of group emergency encryption keys advantageously provides an upper limit to the time required to decrypt a group-specific message using one of the group emergency encryption keys. Continuing the example of an implementation limited to 64 logical groupings with 64 group emergency encryption keys, in a worst-case scenario where a lock-type device node must attempt decryption using all 64 group emergency encryption keys (i.e., in which decryption is successful with the $64^{th}$ group emergency encryption key attempted), the upper limit to the time required to successfully decrypt a group-specific message may be the cumulative time needed to attempt decryption using all 64 group emergency encryption keys. More generally, the upper limit to the time required for successful decryption of a group specific message may be the cumulative time needed to attempt decryption with the total number of group emergency encryption keys. Accordingly, limiting the total number of logical groupings may be advantageous to guarantee a maximum decryption latency in example implementations with service-level requirements in this regard. The limit to the number of logical groupings may depend on the particular requirements of a given implementation. The limit to the number of logical groupings may be a configurable parameter on an account-by-account basis. Accordingly, the device management server may, in some example implementations, store—e.g., in an account record and for each local network of interconnected device—a parameter indicating the total number of logical groupings that may be configured.

Aspects of the disclosure have been described in terms of illustrative embodiments thereof. While illustrative systems and methods as described herein embodying various aspects of the present disclosure are shown, it will be understood that the disclosure is not limited to these embodiments. Modifications may be made particularly in light of the foregoing teachings. For example, the steps illustrated in the illustrative figures may be performed in other than the recited order, and one or more steps illustrated may be optional in accordance with aspects of the disclosure. It will also be appreciated and understood that modifications may be made without departing from the true spirit and scope of the present disclosure. The description is thus to be regarded as illustrative instead of restrictive on the present disclosure.

What is claimed is:

1. A system comprising:
an electronic lock storing a unique encryption key specific to the electronic lock;
a gateway computing device in signal communication with the electronic lock; and
a server computing device in signal communication with the electronic lock through the gateway computing device;
wherein the server computing device is configured to:
transmit a shared encryption key to the electronic lock and at least a second electronic lock,
encrypt an instruction using the shared encryption key to obtain an encrypted instruction, wherein the instruction is either a locking instruction or an unlocking instruction, and
transmit the encrypted instruction to at least the gateway computing device;
wherein the gateway computing device is configured to transmit the encrypted instruction to at least the electronic lock; and
wherein the electronic lock stores the shared encryption key and is configured to:
attempt, following receipt of the encrypted instruction, decryption of the encrypted instruction using the shared encryption key, and
execute the instruction based on successful decryption of the encrypted instruction to toggle to either a lock state or an unlocked state based on the instruction.

2. The system of claim 1, wherein the second electronic lock stores:
a second unique encryption key specific to the second electronic lock, and
the shared encryption key; and
wherein the second electronic lock is configured to:
attempt, following receipt of the encrypted instruction, decryption of the encrypted instruction using the shared encryption key, and
execute the instruction based on successful decryption of the encrypted instruction to toggle to either a lock state or an unlocked state based on the instruction.

3. The system of claim 2, wherein:
the gateway computing device is in signal communication with the second electronic lock and is further configured to transmit, to the second electronic lock, the encrypted instruction.

4. The system of claim 2, further comprising:
a second gateway device in signal communication with the second electronic lock;
wherein the server computing device is further configured to transmit, to the second gateway device, the encrypted instruction; and
wherein the second gateway device is configured to transmit, to at least the second electronic lock, the encrypted instruction.

5. The system of claim 2, wherein:
the shared encryption key is a shared group encryption key associated with a lock group that includes the electronic lock and includes the second electronic lock.

6. The system of claim 5, wherein:
the server computing device is further configured to transmit, to the electronic lock, to the second electronic lock, and to a third electronic lock that is not included in the lock group, a shared global encryption key.

7. The system of claim 6, wherein:
a second lock group includes the third electronic lock; and
the server computing device is further configured to transmit, to the third electronic lock, a second shared group encryption key associated with the second lock group.

8. The system of claim 1, wherein:
the electronic lock is further configured to attempt, following receipt of a second encrypted instruction received from the server computing device, decryption of the second encrypted instruction using the unique encryption key.

9. The system of claim 8, wherein:
the electronic lock is configured to attempt the decryption of the second encrypted instruction using the unique encryption key based on unsuccessful decryption of the second encrypted instruction using the shared encryption key.

10. The system of claim 8, wherein:
the electronic lock is configured to attempt decryption of the second encrypted instruction using the shared encryption key based on unsuccessful decryption of the second encrypted instruction using the unique encryption key.

11. The system of claim 1, wherein:
the electronic lock is further configured to:
- receive, from the server computing device, a message comprising a second encrypted instruction, wherein the message indicates whether the message is a lock-specific message intended for consumption by only the electronic lock;
- attempt, based on determining the message is not a lock-specific message, decryption of the second encrypted instruction using the shared encryption key, and
- attempt, based on determining the message is a lock-specific message, decryption of the second encrypted instruction using the unique encryption key.

12. The system of claim 1, wherein:
the gateway computing device is configured to use a wireless mesh networking protocol to route the encrypted instruction from the gateway computing device to the electronic lock through a computing device that is in signal communication with the gateway computing device or the electronic lock.

13. The system of claim 1, wherein:
the shared encryption key is a symmetric encryption key.

14. An apparatus comprising:
one or more processors;
a network interface configured for communication with one or more gateway computing devices and configured for communication with a plurality of electronic locks through the one or more gateway computing devices, wherein each electronic lock of the plurality of electronic locks stores a unique encryption key specific to that electronic lock;
memory storing instructions that, when executed by the one or more processors, cause the apparatus to:
- transmit, via the network interface and to the plurality of electronic locks, a shared encryption key,
- encrypt, using the shared encryption key, an instruction to obtain an encrypted instruction, wherein the instruction is either a locking instruction or an unlocking instruction, and
- transmit, via the network interface and to the plurality of electronic locks through the one or more gateway computing devices, the encrypted instruction; and
wherein receipt of the encrypted instruction by one of the electronic locks of the plurality of electronic locks causes that electronic lock to attempt decryption of the encrypted instruction using the shared encryption key.

15. The apparatus of claim 14, wherein:
the instructions, when executed by the one or more processors, further cause the apparatus to generate the instruction based on receipt of a command from a user-operated device, wherein the command is either a lock command or an unlock command.

16. The apparatus of claim 14, wherein:
the instructions, when executed by the one or more processors, further cause the apparatus to:
- generate a second shared encryption key for a lock group that includes a first electronic lock of the plurality of electronic locks and includes a second electronic lock of the plurality of electronic locks,
- transmit, via the network interface and to the first electronic lock and to the second electronic lock, the second shared encryption key,
- encrypt, using the second shared encryption key, a second instruction to obtain a second encrypted instruction, and
- transmit, via the network interface and to the plurality of electronic locks through the one or more gateway computing devices, the second encrypted instruction;
wherein receipt of the second encrypted instruction by the first electronic lock causes the first electronic lock to attempt decryption of the second encrypted instruction using the second shared encryption key and receipt of the second encrypted instruction by the second electronic lock causes the second electronic lock to attempt decryption of the second encrypted instruction using the second shared encryption key.

17. An electronic lock comprising:
one or more processors;
a network interface configured for communication with a gateway computing device and configured for communication with a server computing device through the gateway computing device;
a data store storing a unique encryption key specific to the electronic lock;
memory storing instructions that, when executed by the one or more processors, cause the electronic lock to:
- store, in the data store, a shared encryption key received from the server computing device, wherein the shared encryption key is an encryption key shared with the electronic lock and at least a second electronic lock,
- receive, via the network interface and from the server computing device, an encrypted instruction,
- attempt, using the shared encryption key, decryption of the encrypted instruction, and
- execute an instruction obtained upon successful decryption of the encrypted instruction to toggle to either a lock state or an unlock state based on the instruction.

18. The electronic lock of claim 17, wherein:
the shared encryption key is a shared global encryption key; and
the instructions, when executed by the one or more processors, further cause the electronic lock to:
- store, in the data store, a shared group encryption key received from the server computing device, wherein the shared group encryption key is associated with a lock group that includes the electronic lock,
- receive, via the network interface and from the server computing device, a second encrypted instruction,
- attempt decryption of the second encrypted instruction using the shared group encryption key, and
- execute a second instruction obtained upon successful decryption of the second encrypted instruction to toggle to either a lock state or an unlock state based on the second instruction.

19. The electronic lock of claim 18, wherein:
the instructions, when executed by the one or more processors, further cause the electronic lock to:
- attempt initial decryption of the second encrypted instruction using the shared global encryption key;
- attempt the decryption of the second encrypted instruction using the shared group encryption key based on unsuccessful decryption of the second encrypted instruction using the shared global encryption key; and attempt decryption of the second encrypted instruction using the unique encryption key based on unsuccessful decryption of the second encrypted instruction using the shared group encryption key.

20. The electronic lock of claim 18, wherein:

the instructions, when executed by the one or more processors, further cause the electronic lock to:

receive, via the network interface and from the server computing device, a message comprising a third encrypted instruction, wherein the message indicates whether the message is a group-specific message intended for consumption by each electronic lock included in the lock group;

attempt decryption of the third encrypted instruction using the shared group encryption key based on determining the message is a group-specific message, and attempt decryption of the third encrypted instruction using either the shared global encryption key or the unique encryption key based on determining the message is not a group-specific message.

21. The electronic lock of claim 17, wherein:

the instructions, when executed by the one or more processors, further cause the electronic lock to:

receive, via the network interface and from the server computing device, a message comprising a second encrypted instruction, wherein the message indicates whether the message is a lock-specific message intended for consumption by only the electronic lock, attempt decryption of the second encrypted instruction using the shared encryption key based on determining the message is not a lock-specific message, and attempt decryption of the second encrypted instruction using the unique encryption key based on determining the message is a lock-specific message.

22. The electronic lock of claim 17 wherein:

the electronic lock is an electronic door lock.

23. A method comprising:

in a network comprising a server computing device, one or more gateway computing devices, and a plurality of electronic locks, wherein each electronic lock stores a unique encryption key specific to that electronic lock, and wherein each electronic lock is in signal communication with the server computing device through one of the one or more gateway computing devices:

transmitting, by the server computing device and to the plurality of electronic locks, a shared encryption key, encrypting, by the server computing device, an instruction using the shared encryption key to obtain an encrypted instruction, wherein the instruction is either a locking instruction or an unlocking instruction, and transmitting, by the server computing device and to the plurality of electronic locks through the one or more gateway computing devices, the encrypted instruction; and wherein receipt of the encrypted instruction by one of the electronic locks of the plurality of electronic locks causes that electronic lock to attempt decryption of the encrypted instruction using the shared encryption key.

24. The method of claim 23, wherein the shared encryption key is a shared global encryption key, the method further comprising:

generating, by the server computing device, a shared group encryption key for a lock group that includes at least two electronic locks of the plurality of electronic locks;

transmitting, by the server computing device and to the at least two electronic locks, the shared group encryption key;

encrypting, by the server computing device, a second instruction using the shared group encryption key to obtain a second encrypted instruction; and transmitting, by the server computing device and to the plurality of electronic locks through the one or more gateway computing devices, the second encrypted instruction;

wherein receipt of the second encrypted instruction by one of the at least two electronic locks causes that electronic lock to attempt decryption of the second encrypted instruction using the shared group encryption key.

25. The method of claim 24, further comprising:

including, by the server computing device, the second encrypted instruction in a message that indicates the message is a group-specific message intended for consumption by each electronic lock included in the lock group.

26. The method of claim 23, further comprising:

including, by the server computing device, the encrypted instruction in a message that indicates whether the message is a global message intended for consumption by each electronic lock of the plurality of electronic locks or whether the message is a group-specific message intended for consumption by each electronic device in a lock group.

27. A method comprising:

in a network comprising a server computing device, one or more gateway computing devices, and a plurality of electronic locks, wherein each electronic lock stores a unique encryption key specific to that electronic lock, and wherein each electronic lock is in signal communication with the server computing device through one of the one or more gateway computing devices:

storing, by each electronic lock of the plurality of electronic locks, a shared encryption key received from the server computing device, receiving, by each electronic lock, an encrypted instruction from the server computing device, attempting, by each electronic lock, decryption of the encrypted instruction using the shared encryption key, and executing, by each electronic lock, an instruction, obtained upon successful decryption of the encrypted instruction, by toggling to either a lock state or an unlock state based on the instruction.

28. The method of claim 27, wherein the shared encryption key is a shared global encryption key, the method further comprising:

storing, by an electronic lock of the plurality of electronic locks, a shared group encryption key received from the server computing device, wherein the shared group encryption key is associated with a lock group that includes the electronic lock, and wherein each electronic lock included in the lock group stores the shared group encryption key;

receiving, by the electronic lock, a second encrypted instruction from the server computing device;

attempting, by the electronic lock, decryption of the second encrypted instruction using the shared group encryption key; and executing, by the electronic lock, a second instruction obtained upon successful decryption of the second encrypted instruction by toggling to either a lock state or an unlock state based on the second instruction.

29. The method of claim 28, wherein:

the second encrypted instruction is included in a message that indicates the message is a group-specific message intended for consumption by each electronic lock included in the lock group.

30. The method of claim 28 further comprising:

receiving, by the electronic lock, a third encrypted instruction from the server computing device;

attempting, by the electronic lock, initial decryption of the third encrypted instruction using the shared global encryption key;

attempting, by the electronic lock, decryption of the third encrypted instruction using the shared group encryption key based on unsuccessful decryption of the third encrypted instruction using the shared global encryption key; and attempting, by the electronic lock, decryption of the third encrypted instruction using the unique encryption key based on unsuccessful decryption of the third encrypted instruction using the shared group encryption key.

31. The method of claim 27, further comprising:

attempting, by each electronic lock, decryption of the encrypted instruction using the unique encryption key specific to that electronic lock based on unsuccessful decryption of the encrypted instruction using the shared encryption key.

32. The method of claim 27, wherein:

the encrypted instruction is included in a message that indicates the message is a global message intended for consumption by each electronic lock of the plurality of electronic locks.

* * * * *